(12) United States Patent
DeMattei

(10) Patent No.: US 10,313,279 B2
(45) Date of Patent: Jun. 4, 2019

(54) LIVE VIDEO-CHAT FUNCTION WITHIN TEXT MESSAGING ENVIRONMENT

(71) Applicant: RCS IP, LLC, Waco, TX (US)

(72) Inventor: Mark A DeMattei, Greensboro, GA (US)

(73) Assignee: RCS IP, LLC, Waco, TX (US)

(*) Notice: Subject to any disclaimer, the term of this patent is extended or adjusted under 35 U.S.C. 154(b) by 0 days.

(21) Appl. No.: 15/465,546

(22) Filed: Mar. 21, 2017

(65) Prior Publication Data

US 2019/0124021 A1 Apr. 25, 2019

Related U.S. Application Data

(63) Continuation-in-part of application No. 14/807,260, filed on Jul. 23, 2015, now Pat. No. 9,639,861, which is a continuation-in-part of application No. 13/712,252, filed on Dec. 12, 2012, now Pat. No. 9,424,334.

(60) Provisional application No. 61/569,367, filed on Dec. 12, 2011, provisional application No. 62/394,181, filed on Sep. 13, 2016, provisional application No. 62/401,876, filed on Sep. 29, 2016.

(51) Int. Cl.
*G06F 17/30* (2006.01)
*H04L 12/58* (2006.01)
*G06F 3/0481* (2013.01)

(52) U.S. Cl.
CPC ............ *H04L 51/04* (2013.01); *G06F 3/0481* (2013.01); *H04L 51/10* (2013.01); *G06F 2203/04803* (2013.01)

(58) Field of Classification Search
CPC ......... G06F 2203/04803; G06F 3/0481; H04L 51/10; H04L 51/04; H04L 12/581; H04L 65/403; H04L 12/1813; H04L 51/32; H04N 21/4788; H04N 21/41407
USPC .......................................................... 707/730
See application file for complete search history.

(56) References Cited

U.S. PATENT DOCUMENTS

| 7,124,149 B2 | 10/2006 | Smith et al. |
| 7,571,495 B2 | 8/2009 | Emeth |
| 8,122,047 B2 | 2/2012 | Kanigsberg et al. |
| 8,285,643 B2 | 10/2012 | Isaacson et al. |

(Continued)

FOREIGN PATENT DOCUMENTS

| JP | 2004-118737 | 4/2004 |
| KR | 10 2006 0125333 | 12/2006 |
| KR | 10 2008 0078431 | 8/2008 |

OTHER PUBLICATIONS

PCT Notification of Transmittal of the International Search Report and the Written Opinion of the International Search Authority, or the Declaration, completed on Mar. 15, 2013 and dated Mar. 18, 2013 from the Korean Intellectual Property Office.

*Primary Examiner* — Evan Aspinwall
(74) *Attorney, Agent, or Firm* — Knobbe, Martens, Olson & Bear, LLP

(57) ABSTRACT

A messaging platform operates as a mobile device environment giving the user the ability to search for and add content into text message as well as to gain access to other applications and functionality. The messaging platform presents a user interface for construction messages and a trey that includes a wide variety of selectable elements including movies, photos, etc. The messaging platform enables live video chatting within the text GUI.

12 Claims, 42 Drawing Sheets

(56) References Cited

U.S. PATENT DOCUMENTS

| | | |
|---|---|---|
| 8,463,674 B2 | 6/2013 | Hurst |
| 8,510,655 B2 | 8/2013 | Lee et al. |
| 8,521,629 B2 | 8/2013 | Abifaker |
| 8,566,403 B2 | 10/2013 | Pascal et al. |
| 8,577,715 B2 | 11/2013 | Ranta |
| 8,589,267 B2 | 11/2013 | Hurst |
| 8,661,046 B2 | 2/2014 | King et al. |
| 2004/0117367 A1 | 6/2004 | Smith |
| 2006/0085392 A1 | 4/2006 | Wang et al. |
| 2006/0195506 A1 | 8/2006 | Deng |
| 2009/0013265 A1* | 1/2009 | Cole ............... H04L 51/04 715/758 |
| 2009/0042622 A1 | 2/2009 | Tsui et al. |
| 2009/0077027 A1 | 3/2009 | King |
| 2009/0179074 A1 | 7/2009 | Hurst |
| 2009/0182663 A1 | 7/2009 | Hurst |
| 2009/0210318 A1 | 8/2009 | Abifaker |
| 2009/0327065 A1 | 12/2009 | Mayblum |
| 2010/0159883 A1 | 6/2010 | Pascal et al. |
| 2010/0223095 A1 | 9/2010 | Ranta |
| 2010/0318423 A1 | 12/2010 | Kanigsberg et al. |
| 2011/0106698 A1 | 5/2011 | Isaacson et al. |
| 2011/0225539 A1 | 9/2011 | Lee et al. |
| 2013/0055099 A1* | 2/2013 | Yao ............... G06Q 10/101 715/739 |
| 2013/0055113 A1* | 2/2013 | Chazin ............ H04L 12/1822 715/758 |
| 2013/0162750 A1* | 6/2013 | Nerst ............... G06Q 10/107 348/14.02 |
| 2014/0012694 A1 | 1/2014 | Abifaker |
| 2014/0025663 A1 | 1/2014 | Pascal et al. |
| 2014/0195933 A1* | 7/2014 | Rao DV ........... H04L 51/046 715/758 |
| 2015/0358582 A1* | 12/2015 | Zhou ............... H04N 7/15 348/14.07 |
| 2017/0324624 A1* | 11/2017 | Taine ............... H04L 67/22 |

* cited by examiner

Solution Architecture

LIVE VIDEO-CHAT FUNCTION WITHIN TEXT MESSAGING ENVIRONMENT

CROSS-REFERENCE TO RELATED APPLICATIONS

This disclosure is related to the following U.S. applications and/or patents, each of which is hereby incorporated by reference:

U.S. Pat. No. 9,424,334 issued on Aug. 23, 2016;

U.S. patent application Ser. No. 14/807,260 filed on Jul. 23, 2015;

U.S. Provisional Application 61/569,367 filed on Dec. 12, 2011;

U.S. Provisional Application for Patent 62/394,181 filed on Sep. 13, 2016; and

U.S. Provisional Application for Patent 62/401,876 filed on Sep. 29, 2016.

BACKGROUND

This disclosure relates to mobile communications and, more particularly to the provision of a video-chat window within the environment of a texting user interface.

Generally, mobile communication devices include a texting app and maybe a video chatting app. Some texting applications will also allow a user to initiate a call to the other use of a texting session. However, such systems pull the user out of the texting environment and into the mobile phone environment during the call. Further, the state of the art does not include the ability to make video calls or open video chat sessions from a texting environment. What is needed in the art is a texting environment or a text operating system that enables a video chat session resident within the texting environment.

BRIEF SUMMARY

Various embodiments of a messaging platform or a messaging operating system are presented within this disclosure along with various functionalities, capabilities and features that can be implemented or enhanced through the use of the messaging platform. One such functionality presented herein is the inclusion of a live video chat function within the messaging environment. In general, a messaging platform or messaging operating system running on a device, such as a smart phone, provides the capability for a messaging focused centralized platform to operate as the overall operating system of the device or as a stand-alone application to provide enhanced messaging services while maintaining access to other applications and capabilities of the device.

A mobile smartphone is basically a computer and a two-way radio combined into one device. As such, the mobile smartphone operates as a cellular telephone and a small, handheld, feature rich mobile computer. Yet, for many people, the mobile smartphone has primarily being used as a messaging tool, such as text, SMS, MMS, IM (Instant Messaging), email, direct messaging, etc. Thus, the smartphone, with regards to these users, can be viewed as a feature enriched messaging device. Throughout this disclosure, the term text messaging, SMS, MMS, direct messaging, instant messaging, etc. can be used interchangeably unless otherwise noted and the term text based or text message is used to generically refer to each of these messaging types even if the message does not necessarily include text.

In general, the present disclosure presents various embodiments of a messaging platform or a messaging operating system, as well as features and aspects thereof, and is directed towards providing a solution to deliver media enriched messages, content, financial transactions, lottery tickets and payout, tickets, purchases, gift and prepaid cards, greeting cards, text response, drug prescriptions, government subsidy payouts, coupon, invitations, social networking, personal management (posting to or accessing google calendar, apple calendar, etc.), application management, search engine functions as well as other functions all through a centralized communications messaging interface such as a text messaging system, SMS, MMS, IM, etc.

The messaging platform or messaging operating system (referred to in the figures and the description as textOS and tOS) may exist in a variety of forms within a mobile device. For instance, it may be an app that is down loaded and then executed on a mobile device, it may be a built in app that can be executed, it may operate as a launcher or a theme running on top of the underlying operating system, it may be incorporated into the operating system, it may serve as the operating system, it may operate as an add-on that can be physically or functionally integrated with various apps running on the mobile device as well as other techniques.

In some embodiments, the textOS is manifested as a tool bar that is accessible in applicable apps to provide the textOS functionality within the environment of those apps. In addition, it is manifested as a texting or messaging interface that provides access to other features, apps, content, etc. As such, the textOS is not only a messaging platform that provides access to features, content, apps, etc., and that incorporates itself into other apps, but it is also a platform in which rich texting and messaging capabilities can be implemented.

As such, throughout this description the overall textOS system is described along with deeper dives into various inventive aspects and features that may reside within embodiments of the textOS.

Some aspects of some embodiments include the feature or capability of incorporating multi-media content into a text message. When a user is composing a message, such embodiments operate to include multi-media content that is searched for and presented as available to the user based on certain triggers, such as the actual content or keywords of the message. The multi-media content may include a prepaid gift card, banking transaction, or, in addition to the multi-media content, the user may be presented with the option to select and send a greeting card or invitation to an occasion. More specifically, some embodiments comprise an application that is executed on a smart phone platform that may be accessed through an API plug-in for third party developers, a downloadable application, or as an operating system or portion thereof that is built into the home system of the device hardware or software and in some embodiments may be a universal toolbar. The application operates to present a window on the display of the smart phone. The window includes functionality for the entering, transmission, receiving and display of messages between a sender and a recipient. Further, the application identifies a trigger, such as key words by utilizing contextual searching for the sender of content within a text passage, which may typically be at least a portion of one or more of the messages between the sender and the recipient. The application then conducts a search for multi-media or any other content related to the Trigger. The search may include internal files, a database of files, external files such as google, bing, yahoo or other searchable items as known in the art.

Once one or more multimedia contents are discovered, the content is presented on a user interface of the smart phone such that a particular multi-media content item can be selected. The multimedia content item may be a video, audio, data, URL, slide show, etc. as well as a greeting card, invitation or prepaid gift card or bank to consumer transactions or government to consumer. Thus, in some embodiments a gift card may be selected directly while in other embodiments a gift card may be selected after selection of a greeting card.

The various embodiments may also include an enhancement of text messages and multi-media text message by the inclusion of an option to invoke an electronic commerce transaction to purchase a gift card or send a product from an internet based retailer. Thus, the enhancement could be deployed within a system that provides for text messaging or instant messaging over mobile devices; and, more particularly, within a system and method for decoding and/or encoding such messages to search for and determine key words within the message or being typed into the senders messaging/search bar, and select video and/or audio, data, applications, indicia, news, articles or any other content relating to the senders typed key words and transmitting the selected content to the recipient of the text message.

In this latter embodiment, the application receives a selection of a greeting card or invitation multi-media content item and in response, the application may include an access element within the content of a message to be transmitted. The access element may related to the selected greeting or invite item. The application may then present an option for the sender to include a prepaid gift card or retail product along with the greeting card. The application receives a selection of a prepaid gift card or product request. Further, the application may receive the identification of a value to be associated with the gift card or product, or, it may default to a specific value. In addition, the application may receive a selection of a merchant for the gift card or it may default to a specific merchant or retailer or select a merchant or retailer based on triggers. Finally, the message along with the greeting card or invitation and the activated gift card or product is transmitted to the recipient. Further, it should be appreciated that rather than selecting a particular value, an open loop card like a Visa, Master Card which may be redeemed at card approved merchants or banks may also be selected. As a non-limiting example, the card may be associated with a particular bank account or simply a credit account provided by the underwriting company (Visa, Master Card, etc.). Thus, the delivery of such instrument to the mobile device through a text message in essence enables the user's mobile phone to be their credit card. For instance, an open loop card can be selected and sent to a user, or to oneself via an SMS message. The electronic credit card may be represented by a graphic image portraying the company providing the credit or some other image. Or the card may simply be represented by a bar code, QR code or other readable code. The user can pull the readable code up on the screen of the mobile device and it can be read by a scanner. In addition, the phone may operate with a wireless interface to merchant equipment for the payment of items. Such embodiments may include security measures such as PIN codes, finger print scanning, retina scanning, facial recognition, etc.

Another feature that can be incorporated into the various embodiments is a resident video chat or video call capability that is presented to the user within the messaging interface. This functionality allows a user to place a video call to another user in the midst of a messaging session and then engage with each other with live audio and video that is presented within the messaging environment and still giving the users the full functionality of the messaging environment. Thus, the text video chatting can be implemented using an iframe type technology that basically opens a port into a window in the text feed into which a streaming video can be dumped and then the app enables the camera and microphone and streams that video into an iframe type technology in another instance of the textOS or to the resident apps on the target device (i.e. FACETIME on an iphone). A user can receive texts from others and bounce to those message streams, and the can receive text from the current video chat and in some embodiments the iframe type structure scrolls up but in other embodiments, it remains on the screen and the other messages scroll up past it. iframes are generally for HTML environments, and as such an HDML environment could be used in a mobile texting app but other porting capabilities may also be employed. Thus, although the embodiment is describes as utilizing an iframe type technology, it will be appreciated that any implementation that opens a box or window for receiving the video feed and feeding the audio to the speaker/headphones is anticipated by this disclosure as long as it is an open port for receiving streaming video. Further, the application may also stream multiple users to conference in to the same iframe (like Skype). In such embodiments, the screen of the mobile device, or a portion of the screen or a portion of the screen within the texting interface may show multiple video participants simultaneously that is viewable over multiple devices running separate operating systems (such as iOS, Android, Blackberry).

It will also be appreciated that such technology may be incorporated into any texting or messaging application. The ability to stream the live video/chat may be implemented through the use of iframes or other similar technology or, may be incorporated directly within the messaging application.

Generally, mobile devices and texting applications operating on the same send text messages over the cellular network through a service called Short Messaging Service (SMS). Typically, SMS messages don't count against a user's data plan. A carrier charges for each message sent and received if text messages are not included in subscribers mobile plan. Thus, long messages can be even more costly, as each 160 characters in a message may be charged separately. In other carrier plans, unlimited texting may be included. Under these plans, the user is not charged for the number of messages sent and/or received or for the length of size of those messages.

Messages that include a photo or video use a technology called Multimedia Messaging Service MMS. Some cellular carriers may charge for MMS messages separately from SMS messages, but even so, the MMS messages do not consume the data plan and are not charged against the data plan. Further, there is no character limit for MMS messages, although a carrier may set a limit on the size of the image or video clip.

Thus, the various embodiments presented herein provide a live video feed, as well as a recorded video feed, stream or complete download directly through the messaging interface of the mobile device and the texting application. Advantageously, such service does not toll on the user's data allocations. Thus, if the user has unlimited texting, there is no additional charge for the presentment of video or live feed such as chatting through the texting interface. Thus, within the texting environment, a window can be expanded to inhabit some or all of the texting window and the video or live video can be delivered in that window. In addition, a softkey, gesture, preference or other mechanism may be used to expand the window to inhabit the whole screen. Thus, although the full screen of the device may be displaying a video feed, the mobile device is still within the texting application and exiting the full screen returns the user to the texting interface.

It should also be appreciated that as the messaging platform increases in popularity that the cellular providers may want to excluded video, pictures and other data rich media from being included in the flat fee structure of and SMS or MMS rather than to have it toll against the users data plan. For instance, carrier system may monitor the content being provided through an SMS/MSM channel and look for data that represents pictures, audio, video, streaming, etc. For instance, the data may be parsed and analyzed to identify the beginning of a video frame, audio frame, picture frame or data frame. For any frame other than a data or text frame, the size of the content transmitted can be monitored and then charged against the user's data plan although still delivered through the messaging interface. Similarly, the carrier may only charge a reduced portion of such content against the data plan or none at all. It will be appreciated by those skilled in the art that various compression techniques and protocols can enable the ability to identify the type of data in a stream to determine if it is text, video, graphics, audio etc. However, in some implementations the transmission channel may use special frames with assigned values to delineate or identify following packets or frames as being data representing a particular type of media. The carrier can thus use any of a variety of techniques to separate out text data from the data of graphics, audio, video, streaming etc., and thus bill it differently than the text messages.

DETAILED DESCRIPTION OF VARIOUS EMBODIMENTS

Figure 1:
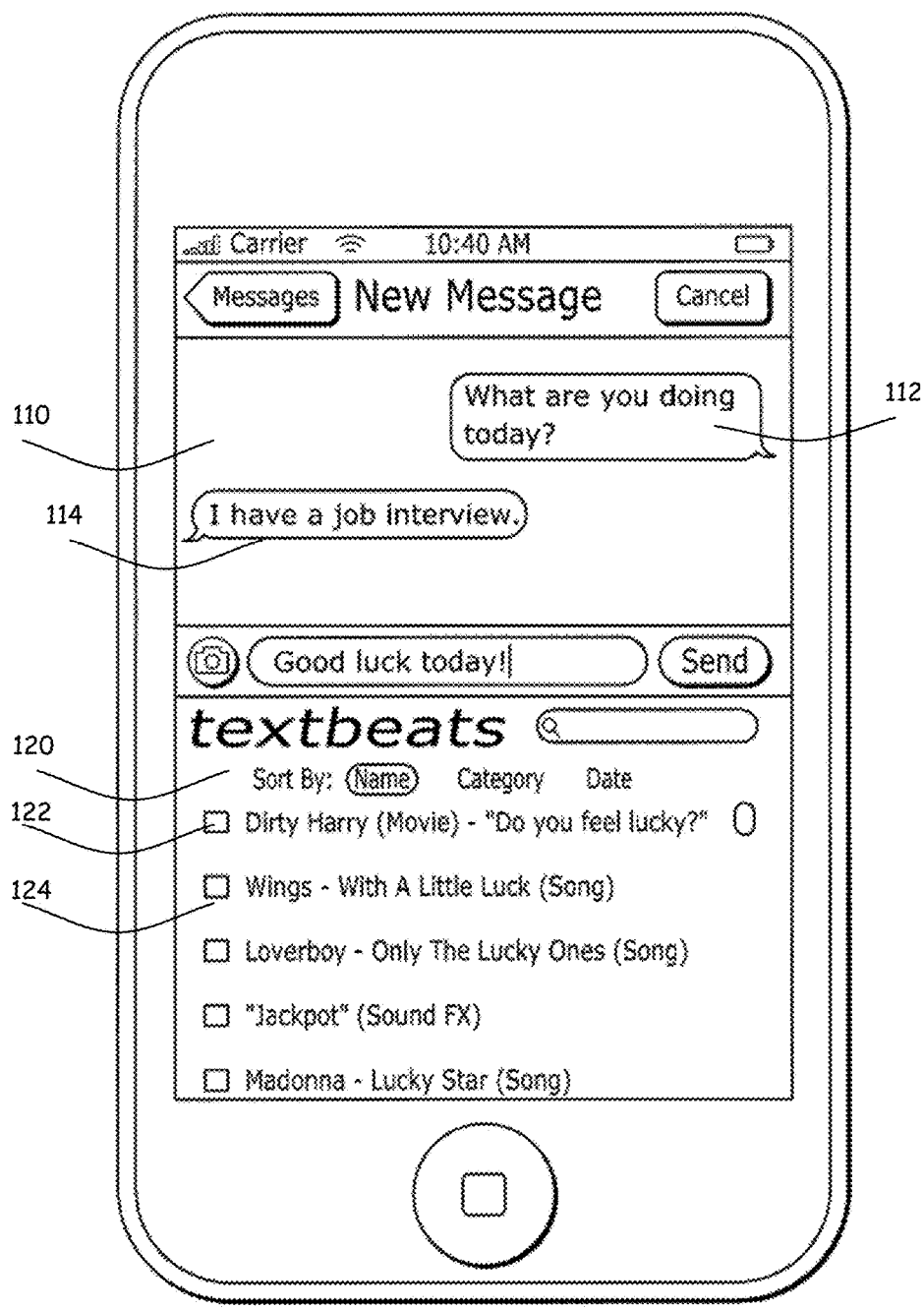
FIG. 1 is an illustration of a trading of messages where the answer by the recipient generates creation of a menu of audio and/or video content relating to the answer by the recipient.

The present disclosure presents various embodiments of a centralized messaging platform or a messaging operating system, as well as features and aspects thereof, and is directed towards providing a solution that includes a centralized mobile-based toolbar and keyboard environment for the authoring, reception and transmission of messages and data to, from and within the Internet of Things. The messages and data include, but is not necessarily limited to text, multi-media elements, indicia elements, application opening and closing elements, screen shot copying, pasting and forwarding elements, photo gallery search elements, internet URL search, copy and pasting elements, search engine elements, coupons and/or financial elements as well as other elements and other functions all through a communications messaging interface such as a text messaging system, SMS, MMS, IM, etc. Thus, one aspect of the disclosure presents a messaging platform that is referred to as the TextOS or the Text Operating System and other aspects of the disclosure focus on the novel functionality that is attained through or enabled by the use of the TextOS. It should be noted that the term TextOS is a trademark utilized to identify and mark the messaging platform as well as features thereof.

Throughout this description, the terms or phrases used to describe the messaging platform include "text operating system", "textOS", "messaging platform" and "tOS". While the messaging platform is not technically a true operating system, the messaging platform is described as an operating system in that at some levels it functions similar to an operating system. However, it should be appreciated that in some embodiments it could be a true operating system or a component of an operating system, An operating system is a set of system software that makes a computing device function or work. An operating system, or OS, is software that acts as an interface between a user or software application and the hardware. The operating system contains drivers that are used to "speak" the hardware's language, but also provides an interface, such as a graphical user interface (GUI) it a user or function calls to an application for controlling the computer. An OS can also act as an interface (from the hardware) to the other software.

Application software is the software that can be installed onto a device and run on top of the operating system. The application programs are functions elements that enable a user to do things with a computer. Applications are written in special languages to run under the various operating systems. In a computer environment, applications would include things such as spread sheets, email programs, web browsers, games, calendars, etc.

Thus, in general, the operating system of a computer is the software that allows the computer work. It provides the framework under which the applications run. The messaging platform of the present disclosure is described as an operating system in that it creates an environment in which a user can operate the underlying device and invoke other applications and functionality without ever having to leave the messaging platform environment.

General Structure

Figure 8:
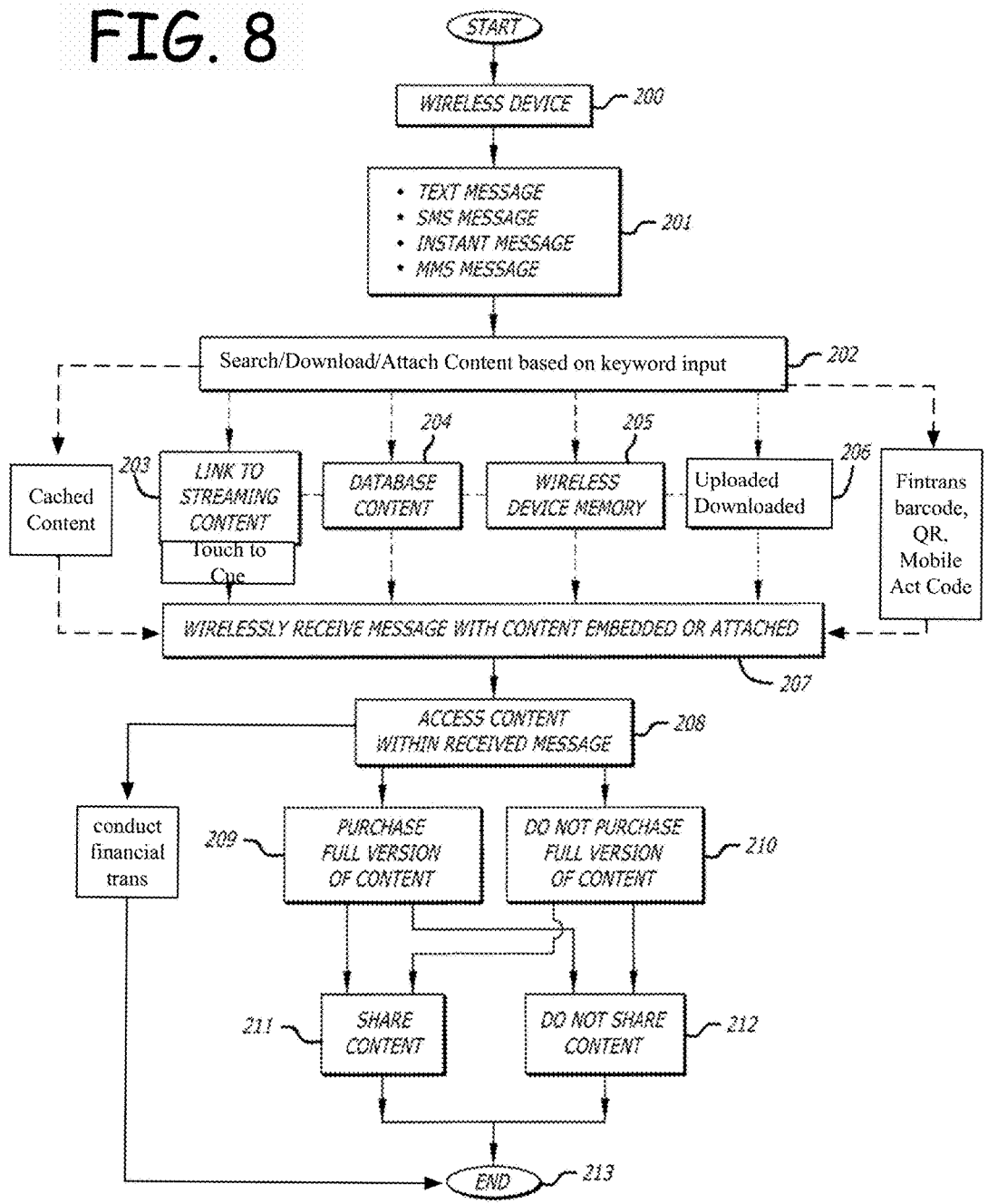
FIG. 8 is an illustration schematic block diagram of an alternative embodiment of the system of FIG. 1.

FIG. 8 is a functional relationship diagram illustrating functional components of an exemplary embodiment of a messaging platform that is implemented and running within a computer implemented system. One aspect of the messaging platform is a computer implemented system, such as a mobile device that can interface with a backend system and send and receive communications with other devices, that can accept a request from a first mobile device for a text message or instant message to be accompanied with or incorporate embedded content items, such as an audio and/or video recording, graphic images, indicia elements, greeting card, etc., associated with a trigger within the content of the text message or messages. One aspect may be to trigger an automatic generation of, or trigger an automatic process to obtain content to be included within the message or, present content to a user for selection and incorporation into a message. The trigger may be identified by the system looking at or parsing a single message to be transmitted, a single message received or a series of received, transmitted and/or to be transmitted messages. The trigger may consist of at least one or more letters of a word, a complete word or a plurality of words that are inputted in the text message or instant message as a non-limiting example. However, the trigger may also include other information such as the gist of a message, the time of day, the day of the week, the location of the mobile device onto which the message is being entered or read, the weather, current events, etc. A text messaging or instant messaging user interface can then be presented to enable the selection of content, such as recordings, from a group of content associated with the trigger, e as a non-limiting example, from an appropriate list of content, such as audio and/or video recordings as a non-limiting example, stored on a remote server, the internet, the cloud, in memory within the wireless device or in any storage location containing a plurality of audio recordings and/or video recordings that may be accessible by a wireless device. This content, such as multimedia content, audio and/or video recordings, indicia elements, internet URL's, photos, applications, financial transactions, etc., are retrieved based on the trigger (i.e. a key word or key words input within the body of the text message originating from the first mobile device user's text messaging interface as a non-limiting example). If the second, or group of mobile device users, have the system installed on their wireless device, they may also respond back to the first users wireless device using the same interface.

The functional diagram of FIG. 8 illustrates that the messaging platform is suitable for operation on a wireless or mobile device 200. Although the various embodiments provide features and capabilities that can be beneficial to a wide variety of applications, the embodiments presented herein are focused on messaging functionality, including but not limited to text messages, SMS messages, Instant messages, MMS messages, etc. 201. One aspect that can be incorporated into various embodiments is the inclusion of content within a message to augment the message. The content can be obtained, as previously pointed out, in response to a trigger that is based on the content of a message being typed, the content of a message received, the content of a message thread, etc. as well as a variety of other events and environmental states. In addition, the content can be included as the result of a direct user action, such as searching for, selecting and embedding the content 202. The content may include, but is not limited to items such as a link to streaming content wherein the link can be touched in order to invoke the playback (i.e., TOUCH TO CUE), content obtained from a database accessible by the wireless device 204, content that is stored within the wireless device 205, content that is uploaded and/or downloaded to/from the wireless device or other devices 206 and cached content. In addition, the content may be content that is selected from other application that may be invoked from the messaging interface. For instance, if the user invokes applications such as YOUTUBE, FACEBOOK, FOX NEWS, TWITTER, etc., the user can select and inject content into the message (this is referred to as a Single Click Injection or SCI).

Another aspect that can be incorporated into various embodiment is the inclusion and implementation of financial transactions within a message. For instance, this aspect may include the purchase, sending and redemption of prepaid gift cards, stored value cards, other purchased items that can be redeemed or utilized through the inclusion of barcodes, QR codes, mobile act codes, etc., such as transit tickets, lottery tickets, event tickets, coupons, access vouchers, etc.

On the receiving end, a message constructed through various embodiments of the messaging platform can be received at another device 207. The receiving user or entity can access the content within the received message 208.

In some cases, the content may include be a video clip. The video clip may be included in the message as a link to the source of the content (TOUCH TO CUE) or it may be actually embedded within the text message itself and automatically commence playback or provide a play icon to initiate the playback. In some embodiments, the receiving user may be presented with the option to purchase the full version of the video link 209 or some other product that may be related to the video clip or, the user can simply enjoy the video clip without conducting such a purchase 210. In addition, in some embodiments, the receiving user may share the received content 211 or chose to not share the content 212. Further, in some embodiments the content may be protected to prevent sharing.

In some cases, the content may include a financial instrument, such as a prepaid gift card, stored value card, coupon, ticket, transit pass, etc. In such cases, the receiving user can cause the display of a code that can be scanned for the redemption of the financial instrument or view a code and/or PIN that may be entered into another system to redeem the same.

Figure 9:
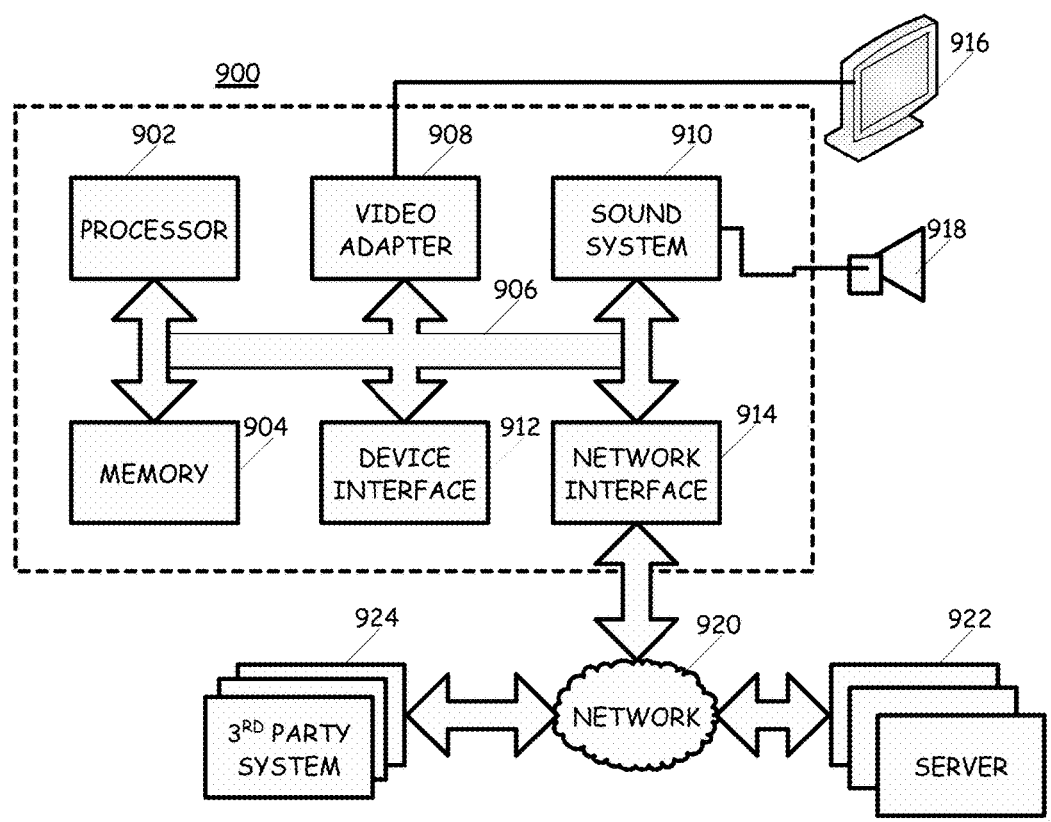
FIG. 9 is a functional block diagram of the components of an exemplary environment or platform in aspects or elements of the computer implemented system of FIG. 8 can be implemented or an application, module or routine utilizing the various embodiments can be implemented.

FIG. 9 is a functional block diagram of the components of an exemplary environment or platform in aspects or elements of the computer-implemented system of FIG. 8 can be implemented or an application, module or routine utilizing the various embodiments can be implemented. It will be appreciated that not all of the components illustrated in FIG. 9 are required in all embodiments or implementations but, each of the components are presented and described in conjunction with FIG. 9 to provide a complete and overall understanding of the components. In addition, it will be appreciated that the embodiments may be implemented in systems and/or environments that may include other components and functionality and as such, the illustrated configuration is simply a non-limiting example.

The exemplary platform 900 is illustrated as including a processor 902 and a memory element 904. In some embodiments the processor 902 and the memory element 904 may be communicatively coupled over a bus or similar interface 906. In other embodiments the processor and the memory element 904 may be fully or partially integrated with each other. The processor 902 can be a variety of processor types including microprocessors, micro-controllers, programmable arrays, custom IC's etc. and may also include single or multiple processors with or without accelerators or the like. The memory element of 904 may include a variety of structures, including but not limited to RAM, ROM, magnetic media, optical media, bubble memory, FLASH memory, EPROM, EEPROM, etc. In addition, rather than being internal to the platform 900, the memory element 904 may be external to the platform 900 and accessed through a device interface 912 or network interface 914. The processor 902, or other components may also provide sub-components or functionality such as a real-time clock, analog to digital convertor, digital to analog convertor, sensors, etc. The processor 902 also interfaces to a variety of elements including a control/device interface 912, a display adapter 908, audio adapter 910 and a network/device interface 914. The control/device interface 912 provides an interface to external devices, systems, equipment, sensor, actuators or the like. As non-limiting examples, the control/device interface 912 can be used to interface with devices or systems such as a keyboard, a mouse, a pin pad, and audio activate device, a PS3 or other game controller, as well as a variety of the many other available input and output devices or, another computer or processing device. The display adapter 908 can be used to drive a variety of visually oriented alert elements 916, such as display devices including an LED display, LCD display, one or more LEDs or other display devices. The audio adapter 910 interfaces to and drives a variety of audible or other alert elements 918, such as a speaker, a speaker system, buzzer, bell, vibrator, etc. The network/device interface 914 can also be used to interface the computing platform 900 to other devices or systems through a network 920. The network may be a local network, a wide area network, wireless network (WIFI, Bluetooth, cellular, 3G, etc.), a global network such as the Internet, or any of a variety of other configurations including hybrids, etc. The network/device interface 914 may be a wired interface or a wireless interface. The computing platform 900 is shown as interfacing to a server 922 and a third party system 924 through the network 220. A battery or power source 228 provides power for the computing platform 940.

FIG. 8 is a schematic illustration of an exemplary embodiment of the system suitable for implementing various embodiments of texting system, including without limitation, the embodiment illustrated in FIG. 1. Here, a wireless device 200, which may be any suitable message initiator, transmits a text message, an SMS message, an instant message or an MMS message or the like (collectively referred to as message or text message) (block 201) which system, as indicated in block 202, selects a keyword input at block 202, and selects content related to said keyword. There may be a link of streaming content (block 203) associated with block 202. There may be a data base content source 204 associated with block 202. Wireless device memory 205 may be associated with block 202. Uploaded content, as indicated at block 206, may be associated with block 202. In each case, the content is then embedded, associated or otherwise linked to or made accessible from the message.

The system of FIG. 8 provides for the wirelessly received message with the content embedded or attached from block 202 be received at block 207. Block 207 may also be associated with blocks 203, 204, 205 and 207. It should be appreciated that throughout this description, the content to be included in a message can be located at one or at multiple of a variety of locations. For instance, the content can be stored on the actual wireless device, the cloud, local systems in communication with the wireless device, websites accessible through the world wide web, or the like.

The content within the received message from block 207 is accessed at block 208 and transmitted to the user, who can either purchase the full version of the content, indicated by block 209, or not purchase the full version as indicated at block 210. In some embodiments, a clip can be generated from a full or longer video and/or audio file. For instance, a sliding selector can be used to select a portion of a video/audio file that will automatically capture and cut the multimedia audio or video content and add it to a text message to share.

The user may decide to share the content at full version purchase indicated in block 209 (see block 211) or not share the purchased full version (see block 212). The user may also decide not to purchase the full version but share the clip, as indicated at block 211, or not share the clip (see block 212). The process of the system of FIG. 8 ends (see block 213).

The key word or key words (which may also include text sequences, icons, emoticons, emovicons, ephotocons, graphics, URL's other content, audible commands, audio, video, etc.) that are input in the body of the text message through a first mobile user's interface may be utilized to access, index into, or form search queries into a database that can provide a select list of audio and/or video recordings, graphic images, URL's and other content based on the first mobile device user's text message content typed, selected or otherwise entered in by the first mobile device user (and second or group of users if the system is installed on their wireless device) and includes a list of content, such as audio and video recordings, indicia elements, internet URL's, photos and videos, data or content stored on the local device or the in the cloud as non-limiting examples. In should be understood that the reference to a database can include one or more of the following, but is not necessarily limited to, a database accessible by the wireless device over WIFI, Bluetooth, through the cloud, through a hard-wired link, internally to the wireless device, from another device physically or communicatively coupled to the wireless device, etc.

The method and system herein attaches and embeds the selected content (e.g. audio and/or video recording, internet URL's, photos and videos, data or content) within the text message from the first mobile device user and sends it to a receiving (second or more) mobile device. The content (e.g. audio or video file, internet URL's, photos and videos, indicia, data or content) may be accessed and uploaded into the text message or instant message or the audio or video file may be attached as a link to the audio or video that is streamed from the first mobile server to the wireless device from the receiving device or group of devices.

In exemplary embodiments, the database may comprise a library of content, such as audio and video recordings, internet URL's, photos and videos, indicia, data or content as non-limiting examples) that are categorized by key words, symbols, emoticons, emovicons, photocons or other techniques or triggers and that bears a relationship to the message to be sent, such as directly relating to the title of an audio or video recording, internet URL's, photos and videos, indicia, data, content or key words from within the body of work within the audio or video recording, internet URL's, photos and videos, indicia, data or content as non-limiting examples, each of which may be associated with titles, lyrics, categories or exact text associations to key words contained within an audio or video recording, such as "touch", "leave", "care", "kiss", "birthday", "valentine", "Christmas" and such or internet URL's, photos and videos, indicia, data or content related to or searched by key words. For example; a first mobile device user types a text message saying, "I want to kiss you". The user's mobile device accesses one or more content sources and/or databases to identify content, such as audio or video files, that may be stored in memory within the device such as iTunes (may access a plurality of data sources simultaneously) or other downloaded or cloud connected content libraries as known in the art and a list of audio recordings or video recordings appear in the mobile device display such as the following exemplary options:

"I Want To Kiss You" by Devin
"I Want to Kiss You" by Laurelyn Carter
"I Want to Kiss You" by Edward O'Connell
(I Want To) Kiss You All Over" by Dirt Merchants
"Kiss You All Over" by Exile
Applicable greeting card categories (i.e., Birthday, Christmas, Valentine, etc.)
Applicable subscriptions
Links to information regarding relevant web content (i.e, such as current related events, internet URL's)
Relevant promotional events links (i.e., relevant sales at merchants)

A first mobile device user selects a preferred recording title or content from the source(s) and it facilitates the selection and embeds or creates a link within an image to be sent or video to be streamed into the specified message to be sent to the receiving device (second mobile device or group of devices) in cooperation with the audio and/or video recording.

In some of the embodiments, the displayed order of the audio or video recording or other content may be derived from random selection, a pre-designated order, on a pay-for-position order or some other designation format such as Google Ad Words as a non-limiting example.

In some of these embodiments, the message includes text, an audio recording and/or a video recording. And in other embodiments, the software is able to cause the computer to provide a user interface that can facilitate specific requirements of the message including application opening and closing elements, screen shot copying, pasting and forwarding elements, photo gallery search elements, internet URL search, copy and pasting elements, search engine elements, coupons and/or financial elements as well as other elements.

Various preferred embodiments may include one or more media databases containing a plurality of audio and video recordings associated with selectable exact key word or key words categories, including application opening and closing elements, screen shot copying, pasting and forwarding elements, photo gallery search elements, internet URL search, copy and pasting elements, search engine elements, coupons and/or financial elements as well as other elements. Another general aspect in various embodiments is to utilize another system that interfaces to the one or more sources for receiving triggers, parameters or queries from the mobile device and then automatically searching the sources for matching or qualifying content. The sources may be any of a variety of sources including URL access from the internet, cloud based content, user device stored media or content, as well as other search or search retrieval elements. This system will be referred to as the search engine. The search engine is designed to search for information on any of a variety of platforms or sources including, but not limited to, the World Wide Web or on the users mobile device. The search results are generally presented in a line of results often referred to as search engine results pages (SERPs). The information may be a mix of web pages, videos, images, maps, shopping, news, books, flights, applications and other types of files. On the user's device it may search for applications, photo gallery images and/or videos, calendar information, or other device stored retrieval elements. The search engine may also mine data available in databases or open directories on the internet, the cloud or on the local device. The search engine may search also maintain real-time information by running an algorithm on a web crawler or device crawler. Thus, in such embodiments the search engine can be utilized to identify and provide potential content to the mobile device and the mobile device can then transmit a selected content item to the desired destination in the message or display the search results into the centralized messaging platform or the text operating system environment in the same manner it looks and feels outside of the messaging environment (like in Google, or Apple Safari's application) in a stand-alone mobile application. In other embodiment, the search engine may operate to send a transmission of a text message that includes embedded audio or video content from a cloud-based computer-implemented system to a first mobile device, second mobile device or a group of mobile devices having a unique context identification number.

In any of the embodiments, utilization of the search engine to send a wireless transmission in response to a text message that is received and includes embedded or links that may include streaming audio or video content, including application opening and closing elements, screen shot copying, pasting and forwarding elements, photo gallery search elements, internet URL search, copy and pasting elements, search engine elements, coupons and/or financial elements as well as other elements direct to a first, second or a group of wireless mobile device communication from a search engine accessible database containing automated answers to a plurality of questions asked by a text message or instant message user that is catalogued by specific categories or individuals such as Presidents, Dignitaries, Religious Figures, Professional Athletes, Celebrities, Character's or other persons, whether imaginary, animated, living or deceased all based on key words.

The Text App

Reference is made to FIGS. 1 to 7 as a non-limiting example of how to carry out the operations that may be implemented in various embodiments. FIG. 1 shows an exemplary user interface of a text messaging application embedded within and operating on the platform of a mobile phone. In the dialog box 110 of the texting application, an inquiry is shown as having been made by the first user of a phone ("What Are You Doing Today?") 112. This message was directed to a recipient, the user of the other phone (recipient), who replies with the answer: "I have a job interview," 114 (shows up on first phone—FIG. 1). In the illustrated example, the sender decides to answer "Good luck today!" Based on this input, the system searches the database and selects available (in the illustrated example 5) audios and/or videos or other content relating to the concept of "Lucky". The available content is presented in the TEXTBEATS window 120. The user of the first phone selects one of the listed items displayed in the TEXTBEATS menu window 120.

Figure 2:
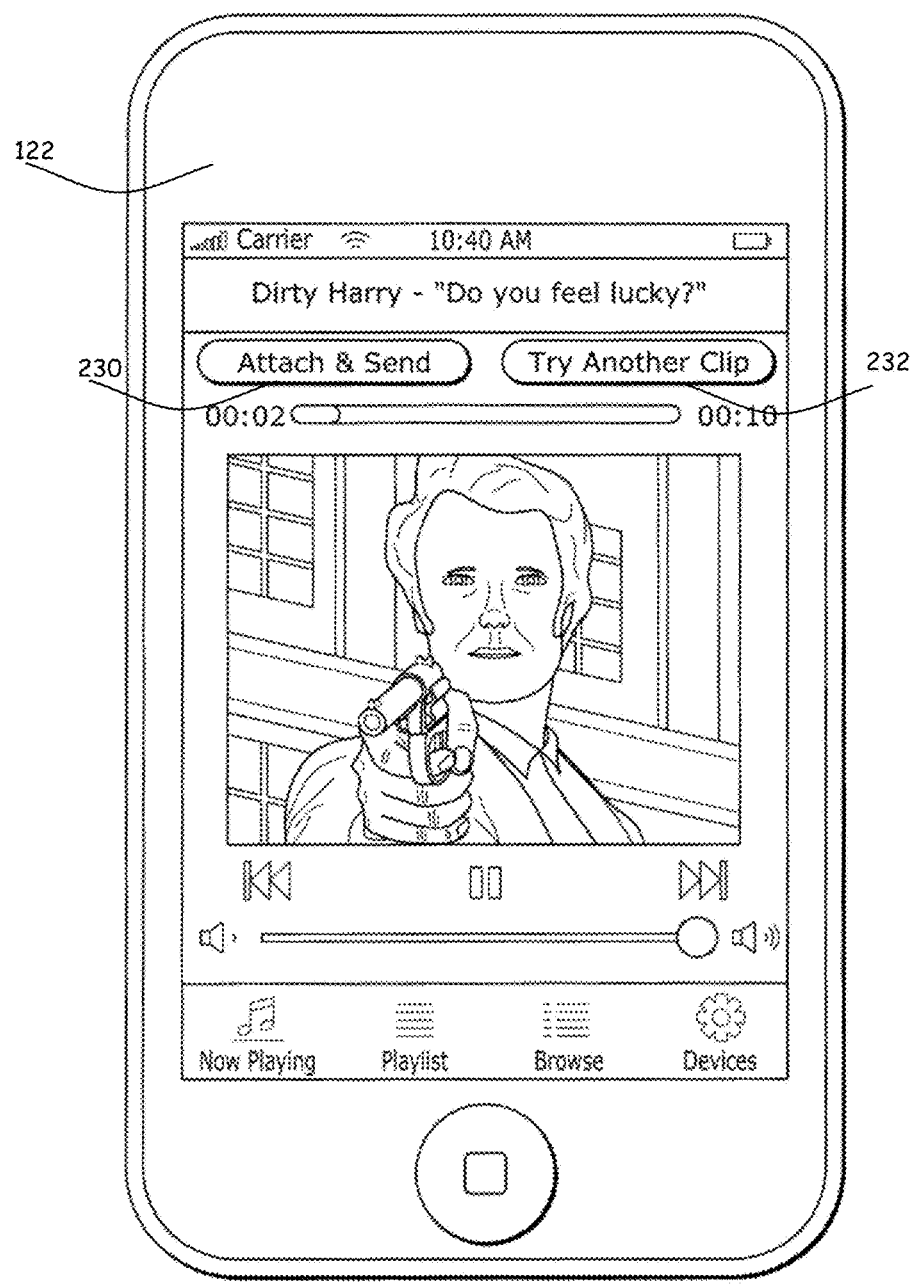
FIG. 2 is an illustration of one of the menu selections of FIG. 1 which can be attached and sent to the recipient.

In the illustrated example, the user has selected the first item displayed in the TEXTBEATS window 120, the clip of Dirty Harry saying "Do you feel lucky" 122. FIG. 2 illustrates an exemplary user interface screen presented after the user's selection. The selected audio/video 122 shows up on the sender's phone (FIG. 2) where the sender has various options as shown, including the presentment of a player device for previewing the content. One of the options is to attach and send the content selection 230, such as including the content in the text message that was being created. Another option is for the user to try another clip or content 232. If the user selects the latter option, the menu of FIG. 1 is re-displayed allowing the user to make an alternative selection. It will be appreciated that other content may also be included as enumerated herein, such as but not limited to, greeting cards, links, gift cards, subscriptions etc.

Figure 3:
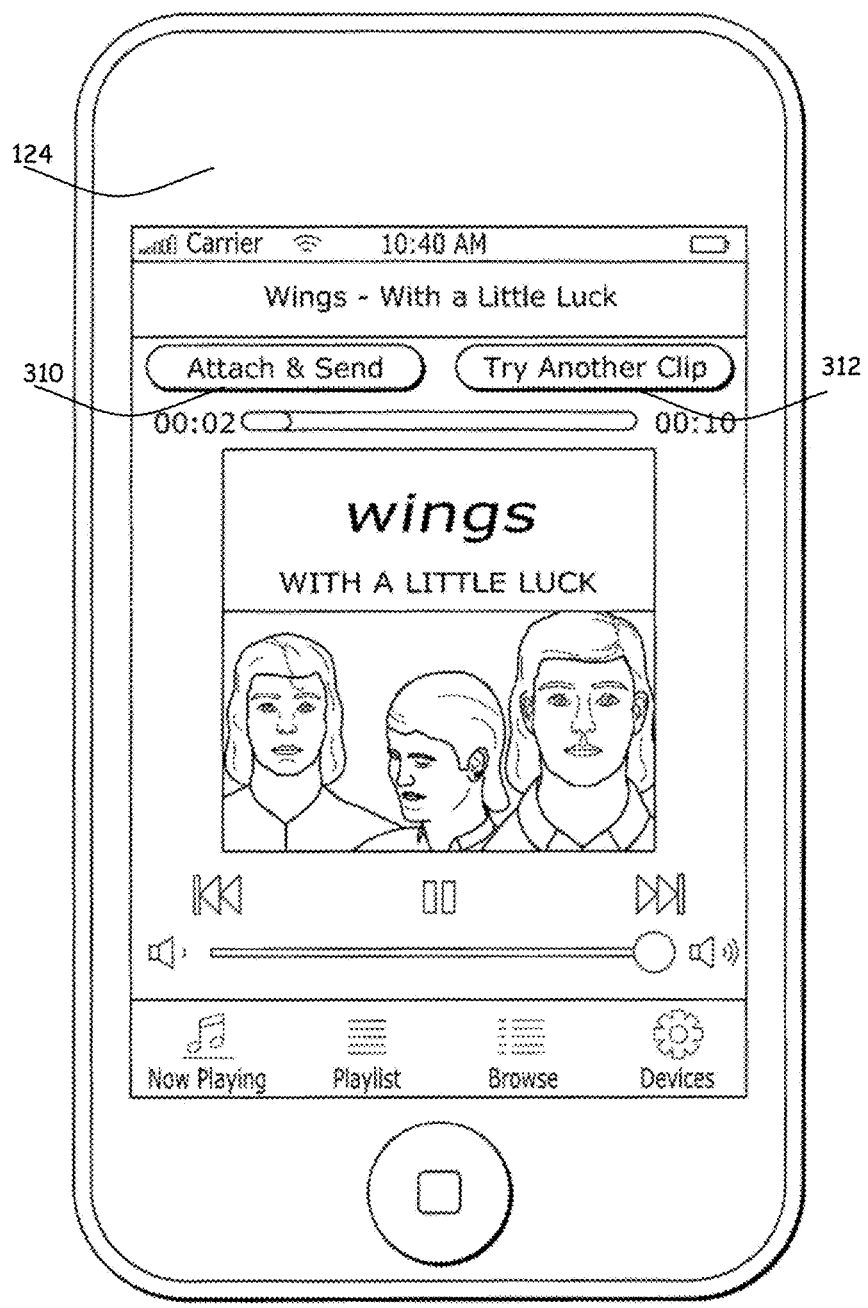
FIG. 3 is an illustration of an alternate menu selection which can be attached and sent to the recipient.

In the illustrated example, FIG. 3 shows the results of a user having selected content item 124 Wings "With a Little Luck" either initially or after the user actuates the Try Another Clip 232 option. In either case, the sender is shown as having selected the alternate audio/video clip and again, the user can select to attach and send 310 the clip or try another clip 312. After the content has been selected, the message with the embedded, linked to or otherwise associated content can be sent to the recipients cell phone.

Thus, the greeting card may include a music audio of video clip. At the end of playing the clip, the TOUCH TO CUE or CUE TO VIEW may direct the recipient to a subscription at iTUNES, Spotify etc. and cue that song or video into the recipients playlist if the subscription and the textOS feature are linked together through the Application Developer.

Figure 4:
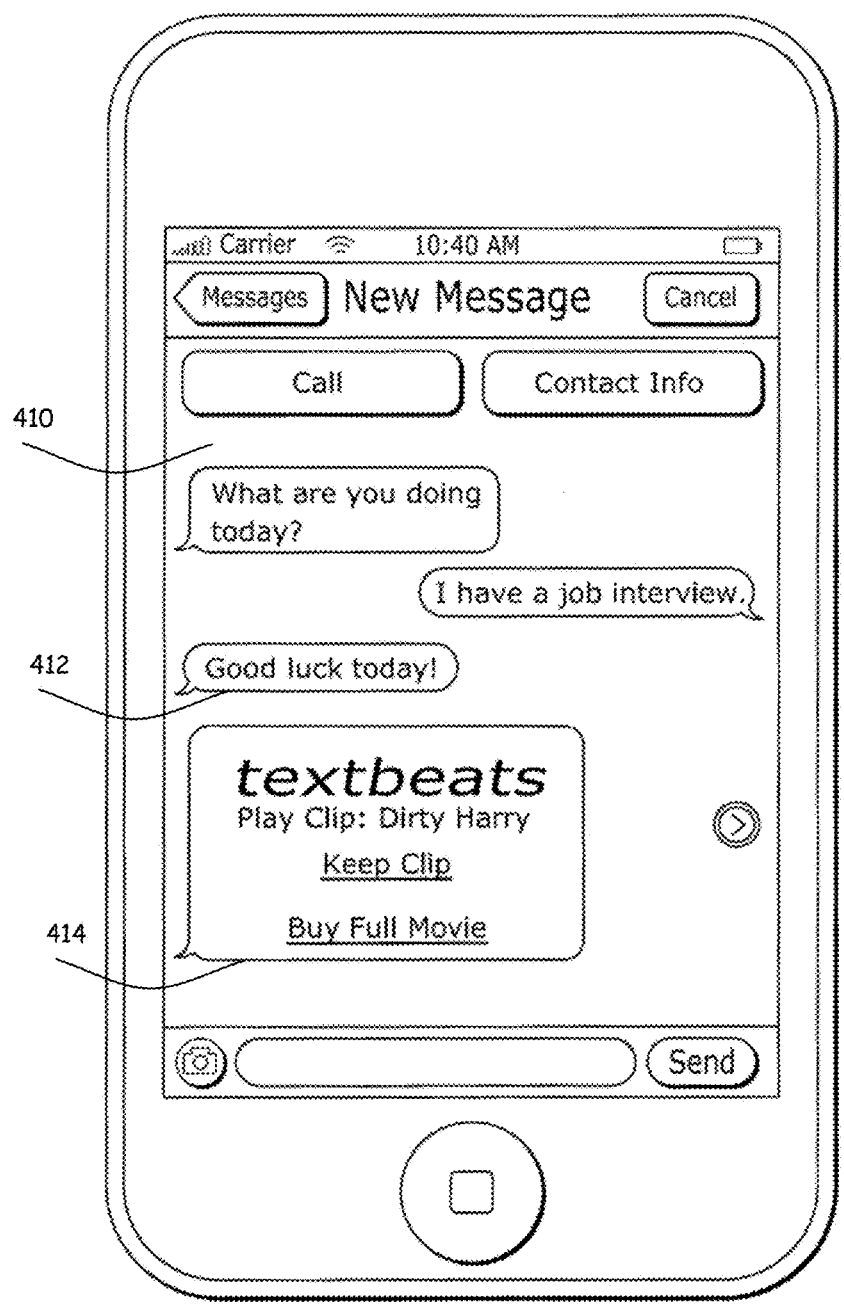
FIG. 4 is an illustration of the recipient's receipt of the menu selection of FIG. 2 enabling the recipient to play the audio and/or video clip.
Figure 5:
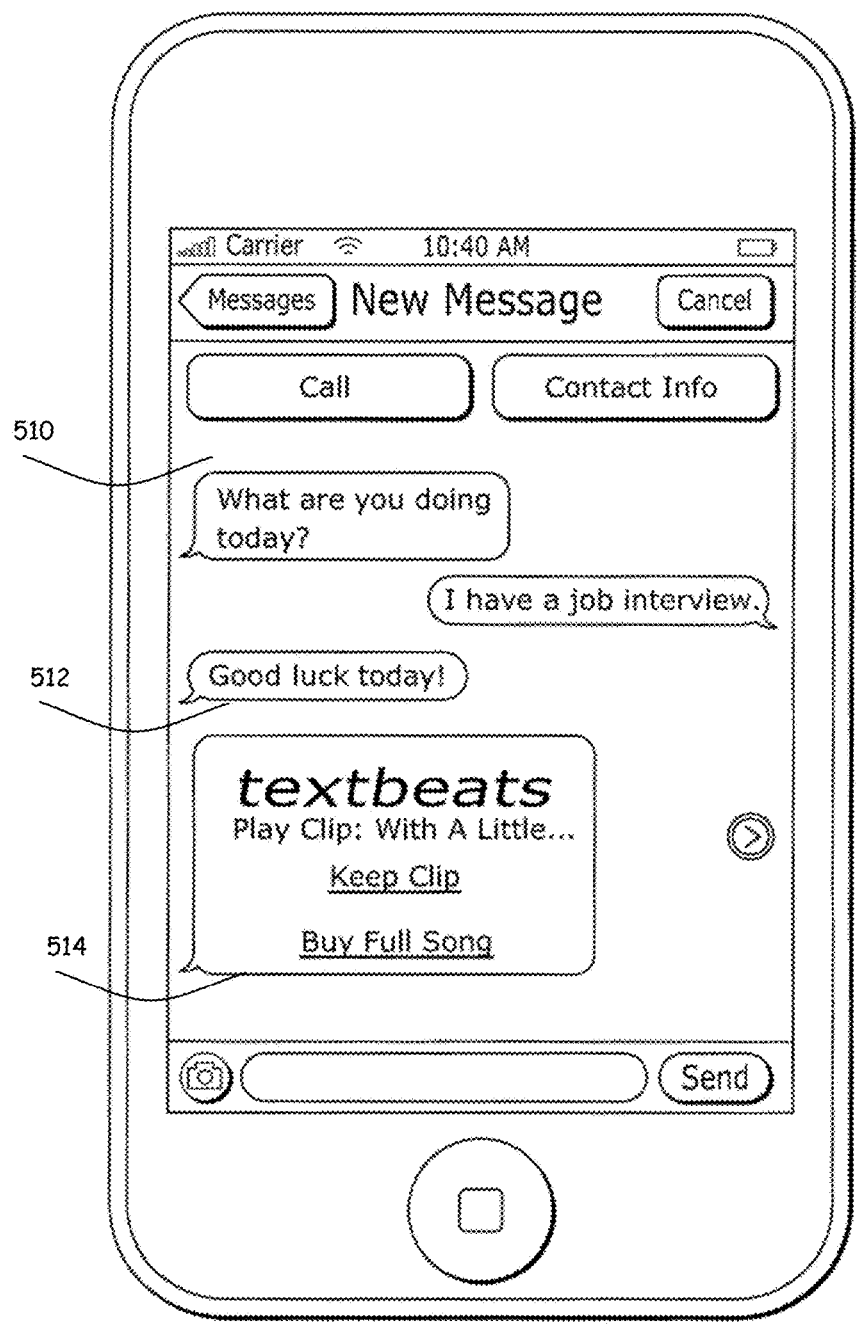
FIG. 5 is an illustration of the recipient's receipt of the menu selection of FIG. 3 enabling the recipient to play the audio and/or video clip.

FIG. 4 shows an exemplary user interface presented on the display of the recipient's cell phone after the message 122 has been selected, sent and delivered. In the illustrated example, the recipient's screen illustrates the text messaging window 410, which now includes message "Good Luck Today!" 412 and another text element, referred to as the TEXTBEATS element, which presents options to the recipient regarding the received content. For instance, the recipient can elect to play the selected audio/video clip or content, keep or save the content or buy a full version of the content if available (e.g., the album, a movie, the entire song, a book, etc.). FIG. 5 is similar to FIG. 4 and displays the alternate selection of Wings' "With a Little Luck" in the text screen 510 within the TEXTBEATS entry 514 below the message 512. Here, "With a Little Luck" is available for playback, saving or purchasing the full version or related items.

Figure 6:
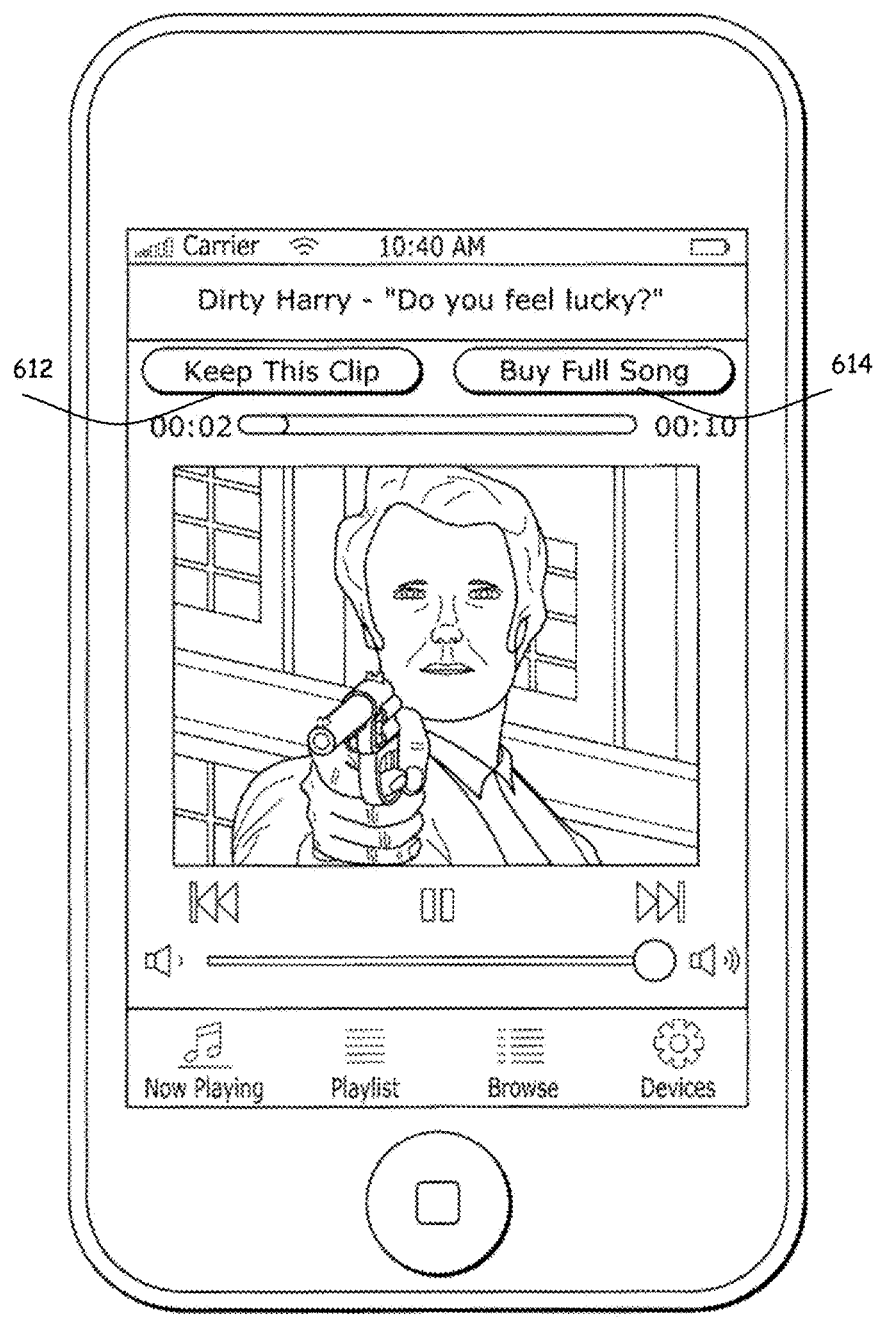
FIG. 6 is an illustration of the recipient's choices for either keeping the clip of FIG. 4 or purchasing the complete movie relating to the clip.
Figure 7:
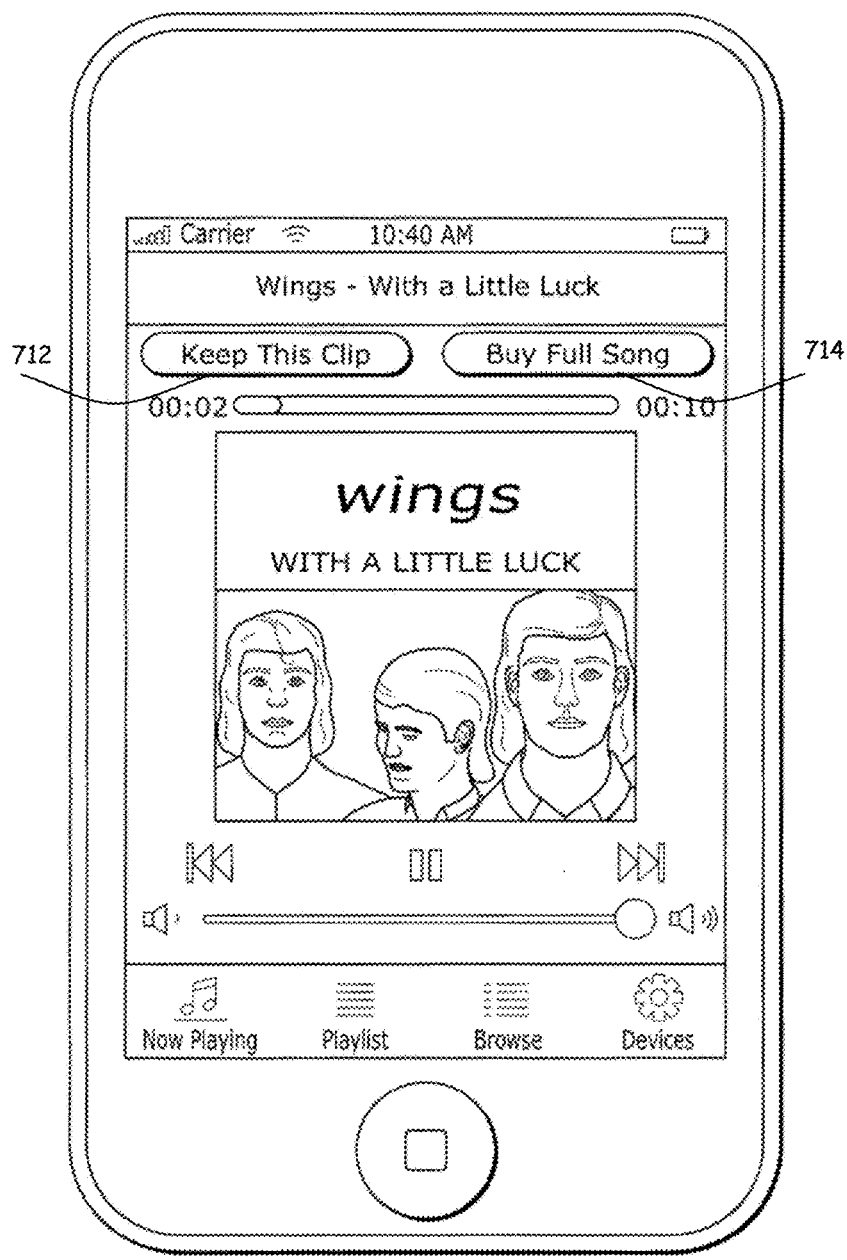
FIG. 7 is an illustration similar to FIG. 6 where the recipient has the choice of keeping the alternate audio and/or video clip of FIG. 5 or purchasing the complete song relating to the audio and/or video clip.

FIG. 6 illustrates the play mode presentment on the recipient's cell phone of the selected and delivered clip 122 from FIG. 1 along with the presented options of keeping the clip 612 or buying the full song or content 614. Thus, the content shown in FIG. 4 can be stored or the recipient can buy the full movie from which it came. FIG. 7 illustrates the play mode presentment on the recipient's cell phone of the selected and delivered clip 124 from FIG. 1 along with the presented options of keeping the clip 712 or buying the full song or content 714. Thus, the content shown in FIG. 5 can be stored or the recipient can buy the full song from which it came. It should be appreciated that the content may include restriction, such as digital licensing rights, that would prevent the content from being forwarded to others. In addition, the content may be set up such that it can only be viewed or shown for a limited time or a limited number of times (i.e., one time view only) then it will delete out of the message with no storage on the device. This is similar to the SNAPCHAT technology and operates to protect and prevent the content from re-distribution. "Clip" as used herein can be an audio clip, a video clip, sound effect clip, or a combination of audio and video and, in some contexts may even include graphics, a playback of multiple graphics such as a slide show or other forms of indicia, etc.

Thus, there is disclosed a text messaging and instant messaging computer-implemented system and method for providing embedded multi-element content (text message and the inclusion of additional content such as recorded audio or video as non-limiting examples) by authenticating a wireless device compatible with multiple transport technologies (such as cellular networks, satellite networks, cloud based networks, internet networks, Bluetooth networks, near field communication networks or any other peer to peer network as used in the art) and operable to render a text message with an integrated audio or video embedded message or a link that connects to a streaming audio or video file within a text message originating from a first mobile device, second mobile user, a group of mobile users, Instant Messaging, SMS (Short Message Service) or MMS (Multimedia Message Service) in a manner consistent with the capabilities of the recipient device (second mobile device). The system and method includes: transmission of a text message that includes embedded audio and/or video content having a context identification number from a first mobile device to a second mobile device. This may include a mobile station (MS) receiving a wireless message. A judgment may be made whether the received message is a general SMS message or an SMS message for an MMS. The message may be directly stored if the received message is a general SMS message. The recipient may then be informed of a message reception.

The message initiator may also begin the message by utilizing the said method. The audio or video content may be accessed through the content that is stored on the wireless device or through a remote cloud or Internet connected database.

In various preferred embodiments, the first authenticating is provided at a mobile device compatible with multiple transport technologies (such as 4G, 5G, LTE M2M networks) and operable to render an integrated audio or video embedded message within a text message originating from a first mobile device. Authentication can take place through a satellite and/or peer to peer. A second mobile device is enabled to respond to the first device message and an instant response will be provided based on the content of the message sent or received.

Figure 10:
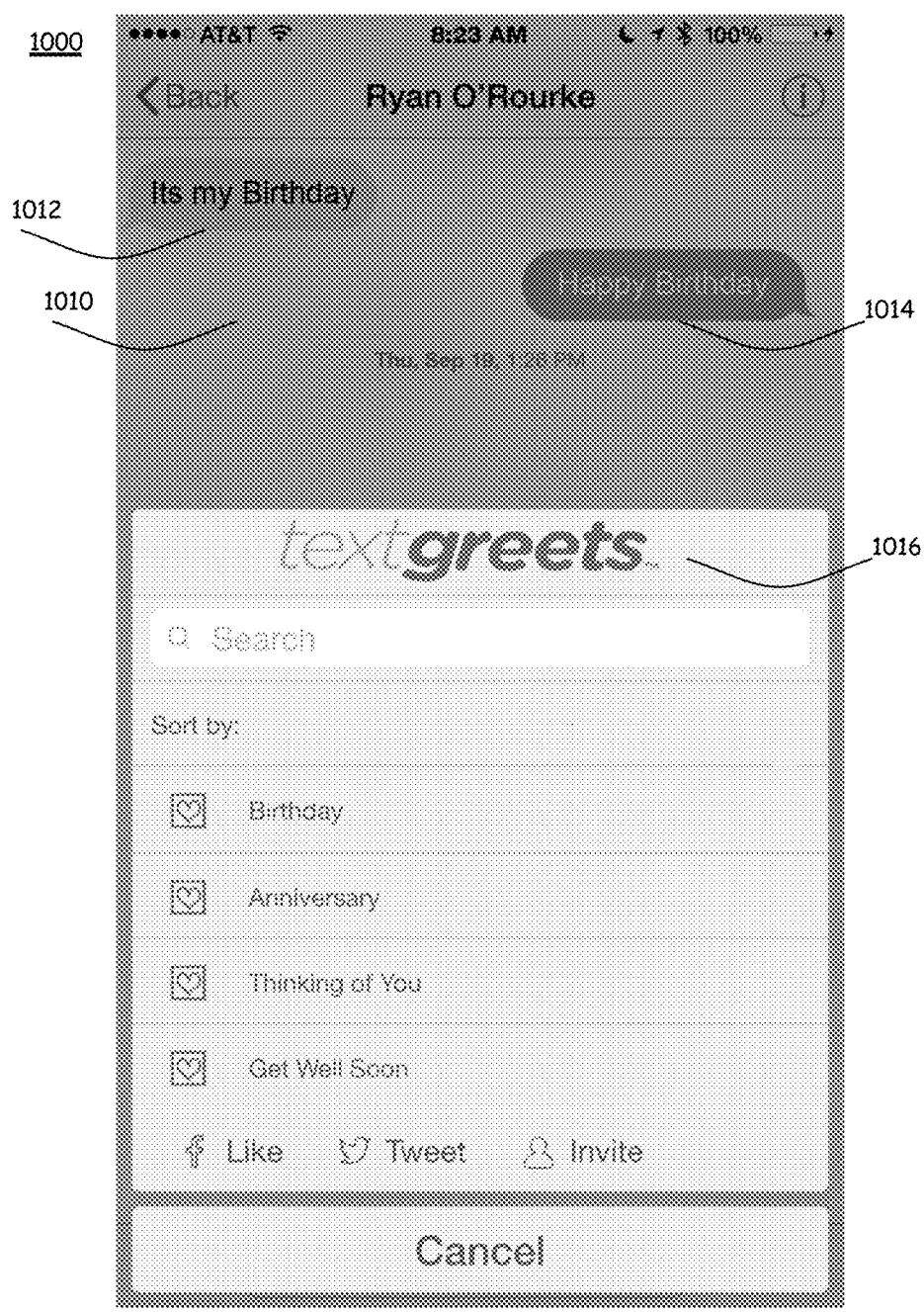
FIG. 10 is an exemplary user interface screen for a texting application that incorporates the greeting card feature.

Another aspect or feature that may be incorporated into various embodiments is the inclusion of prepaid gift cards as content to be searched for, selectable and embeddable within the text messages. FIG. 10 is an exemplary user interface screen for a texting application that incorporates the greeting card or invitation card feature. In the illustrated embodiment, the screen 1000 includes a texting area 1010. In the illustrated texting area, the user has received a message from Ryan O'Rourke saying "Its my Birthday" 1012. In response, embodiments may search the received text and automatically pull up a list of content with which the user may respond and may even automatically generate the displayed response message "Happy Birthday" 1014. Further, it should be understood that in any of the embodiments, the key word searching, contextual searching, etc. can be performed on the messages to be transmitted, the messages received and a combination of both, as well as other information such as the user's calendar, time of day, day of week, current events, weather, holidays, location, etc. Thus, many factors may be taken into consideration when obtaining suggested or available content to be included in a message. In addition, a query engine maybe implemented to interface to one or more trigger sources and from the information obtained, heuristically generate queries for content. For instance, the query engine can pull up content based on contextual input (typing) so that upon typing in a character (such as an emoticon, emovicon or after any characters), it immediately will begin pulling up relevant content based on the characters. As a non-limiting example, if a user enters an emoticon with a smiley face with a birthday hat on it, it will pull up birthday greeting cards/clips etc. If the user types BIR, the system may operate to it will do the same thing. Similarly, the current events may also be inputs to the query engine. For example, if it is Valentines Day, and user types in Hap (for Happy), it will assume that Valentines is the default for that day however will bring up a list related to Happy (like Birthday) as well as Valentines Day wishes.

Thus, in some embodiments, upon receiving a message, such as "Its my Birthday" 1012, the application may generate the response "Happy Birthday" 1014 and then pull up a list of greeting cards that can be included in the message or, a list of categories that can be further searched for a greeting card. Such a list of categories is presented in window 1016 of the screen 1000. In some embodiments, greeting cards can be presented along with the other types of content.

Another aspect that may be incorporated into various embodiments includes the provision of gift cards. In general, this aspect refers to including a gift card within a text, SMS or instant message that is being sent to another party. For instance, a sending party may send a birthday, anniversary, get well soon, etc., greeting to another party and desire to include a gift card along with the greeting. This feature or functionality, which may be incorporated in various embodiments, would allow the sending user to select a greeting card to be sent to the recipient.

Figure 11:
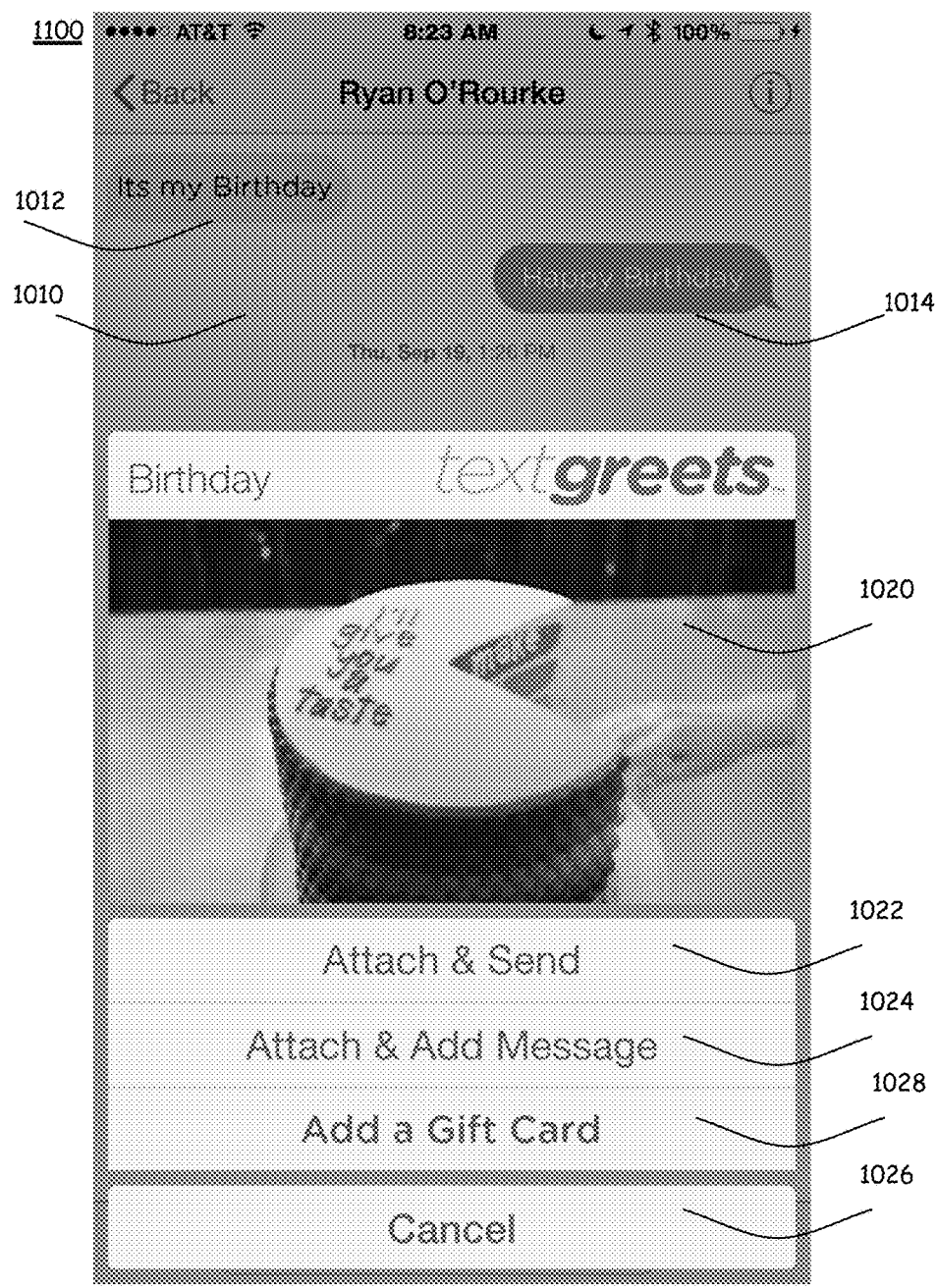
FIG. 11 is an exemplary user interface screen for the embodiment described in FIG. 10 after the user selects a greeting card.

FIG. 11 is an exemplary user interface screen for the embodiment described in FIG. 10 after the user selects a greeting card. As illustrated in screen 1100, the text area includes a message from the recipient saying "Its my Birthday" 1012 and a response from the sending "Happy Birthday" 1014. Further, the sender has selected to the illustrated greeting card 1020 and now in the illustrated embodiment, the sender has the option to attach and send the card 1022, attach the card and add a message 1024 or cancel 1026. Further, in some embodiments an additional feature including add a gift card 1028 may also be made available to the sender. The selected greeting card may be an image, an audio file, an image with an audio file, a video, a slide show, indicia, or any of the other variety of content mentioned herein as well as other content.

Figure 12:
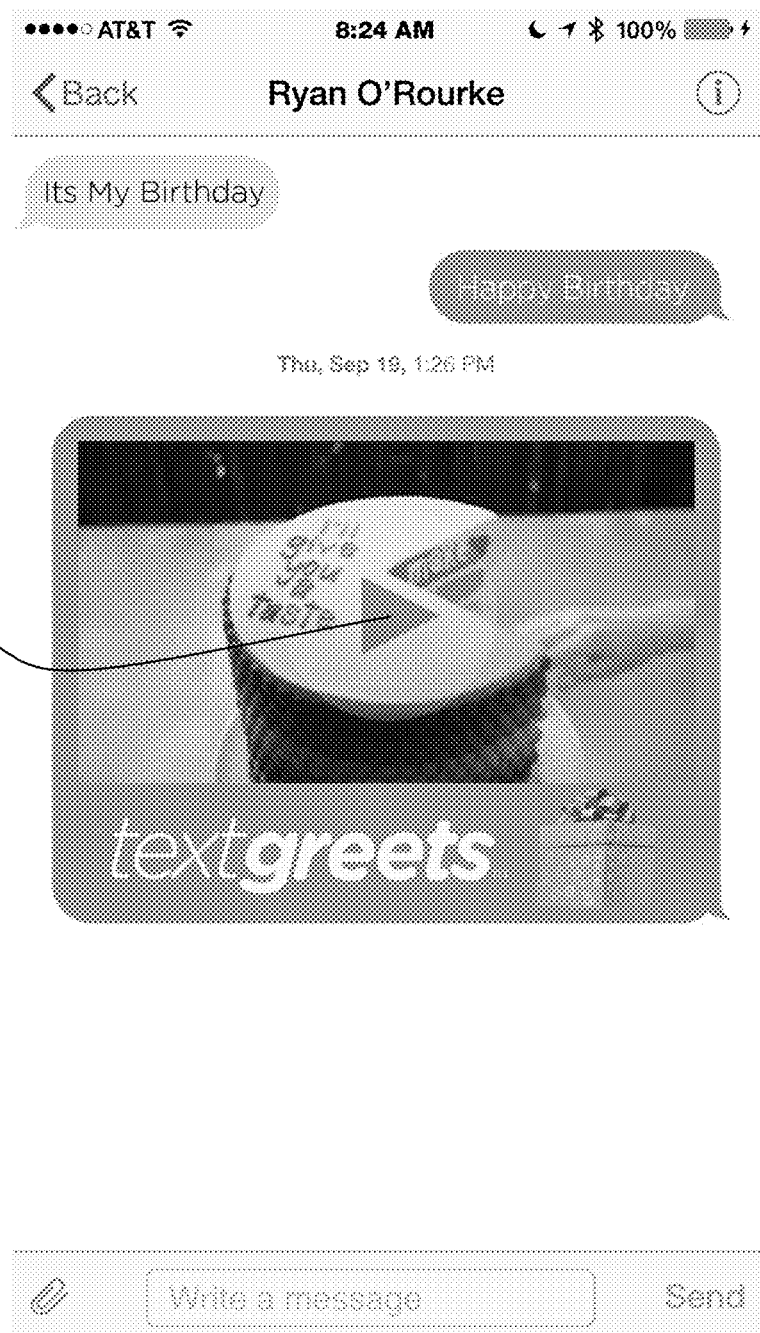
FIG. 12 is a illustration of the screen once the greeting card has been attached.

FIG. 12 is an illustration of the screen once the greeting card has been attached. The recipient can select the card, which in this case includes a play button 1202 that can be actuated to commence playback or rendering of the greeting card, such as a video, slide show, audio or indicia.

Returning to FIG. 11, the sender has the option to also add a gift card 1028. This feature includes the addition of a redeemable gift card that can be incorporated into and sent along with the message to the recipient. The recipient can instantly utilize the gift card, once received. For instance, the gift card may be a mobile action code (such as a QR code or a barcode and pin code transaction. It may also be a financial institution, government entity or lottery payment delivery from Business to Consumer, or an electronic credit that goes to the recipient's PAYPAL account or other account utilized for making payments to physical stores and/or online stores or financial institutions. It may also be a coupon that is deliver to a device user from a retailer or product manufacturer The electronic credit may also simply be stored on the smart phone and redeemed directly from the smart phone from either the text message bubble (body) or stored to a mobile wallet (such as Apple Wallet or Google Wallet) at a point of sale purchase retailer or online purchase. Further, the gift card could operate as an E-Card, and operate similar to the Delta Airline Mobile Tickets. Even in some embodiments the gift card could be redeemed by printing it out and handing it to a merchant and the value associated with an identification number on the print out can be reduced as necessary. Those skilled in the art will appreciate that a variety of other techniques may also be used for the delivery and redemption of such gift cards. A consumer may also walk-in to a retail location (such as a convenience store) and load a cash payment onto the text platform or text operating system to be sent as a transaction to be sent in the future (like Western Union). Thus, customers that are unbankable or that want to send money instantly to other, such as a Western Union transfer, can send funds to any geographical location and currency through the messaging interface. Further, because this is a centralized text platform, a device user may store one payment method on file and it would apply to all transaction (including Application purchase like Amazon, Delta, Ebay) without having to share payment information with multiple Application transaction).

It should also be appreciated that aspects of the messaging system may also be incorporated into other devices besides a mobile smartphone. For instance, a cash machine or ATM may include the messaging interface. In such an embodiment, a user can log into an ATM and rather than extracting cash, the user could have the system construct a message to send a value directly to the user's wireless device. Thus, the incoming message could then be directly accessed at point of sale terminals or other locations and operate as a prepaid debit card or a PAYPAL account etc. Further, rather than sending a message, the cash machine or ATM may directly connect with the user's device to load the funds. It should also be appreciated that the funds are transferred to an account that is accessible by a Mobile Action Code, Google Wallet or Apple Wallet, etc. Similarly, the user can compose and send messages to a bank to make a deposit.

Embodiments of the messaging system may also be used to generate and send a wireless E-Card, such as a Delta Airline mobile ticket. Print out would be last line of activation.

Figure 13:
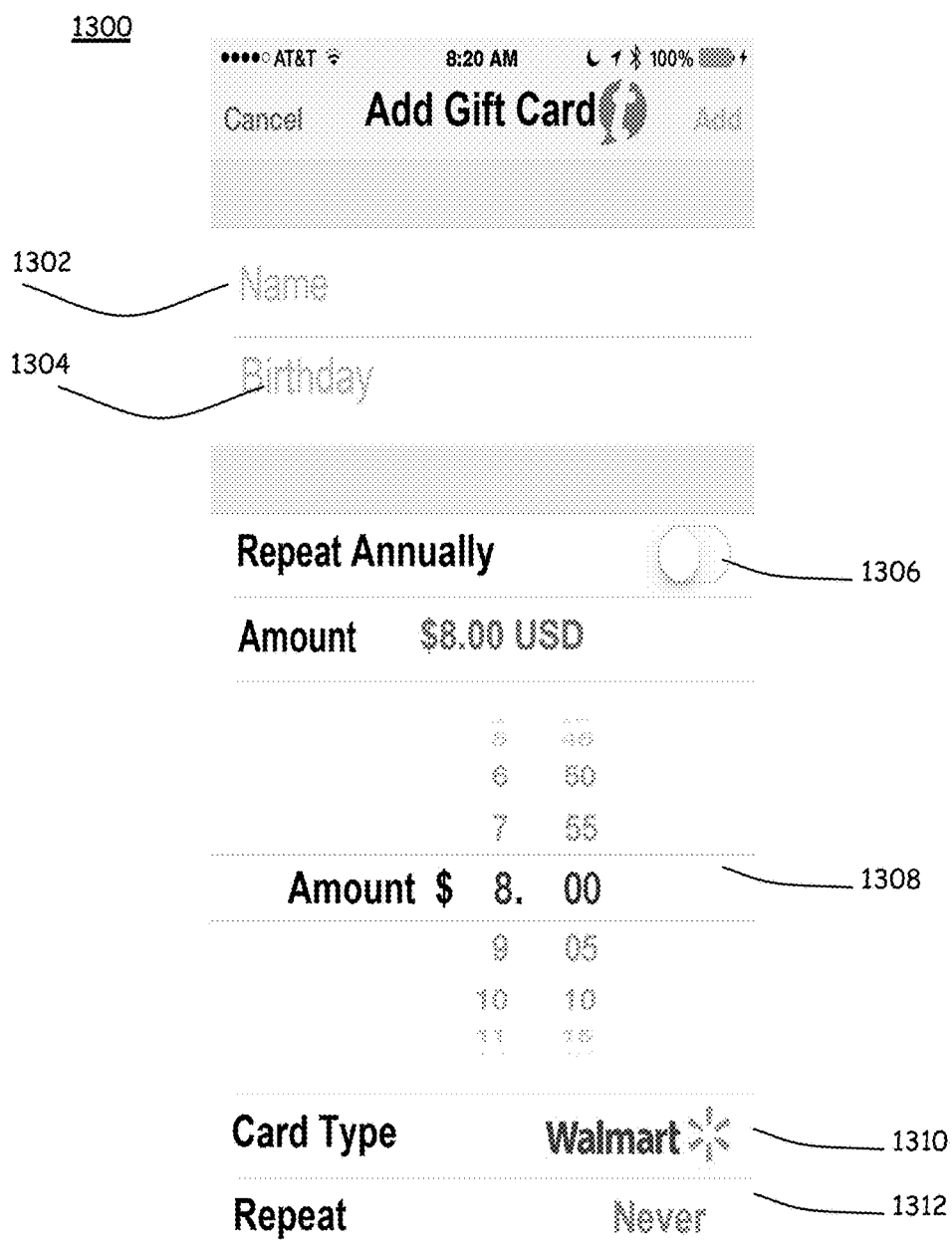
FIG. 13 is a user interface screen illustrating an exemplary interface for the creation of a gift card to be sent to a recipient.

FIG. 13 is a user interface screen illustrating an exemplary interface for the creation of a gift card to be sent to a recipient. For instance, the illustrated screen 1300 may be presented in response to a user actuating the add gift card 1028 option of FIG. 11. Although embodiments may vary, in the illustrated embodiment, the gift card screen 1300 includes a text window to place the name of the recipient 1302 and a text window to type in the occasion or memo regarding the gift card 1304. For instance, it could say happy birthday, congratulations, just thinking of you, etc. The user also is presented with a switch 1306 for enabling the gift card to be an annual event. In the illustrated embodiment, sliding the switch to the right will enable the gift card to be an annual event. Thus, the gift card could automatically be sent again next year or, the application may prompt the user to either send or modify the gift card for being sent on or near the anniversary date. The illustrated embodiment also includes a spinning wheel window 1308 for selecting the amount of the gift card. In the illustrated embodiment, the current value is set at US$8.00. The value to be credited with the gift card can be obtained from the sending party in a variety of manners. The sender may be prompted to enter credit card information or, if previously entered, the sender may be prompted to authorize the charge against the credit card. Further, the value may be credited or prepaid through the "in OS keyboard" provider or in a stand-alone app. Other techniques may also be utilized such as PAYPAL, financial institutions, Federal Government business to user transactions or other third party deposit accounts in which the user has previously deposited funds. In addition, payment could be made through apps such as the APPLE STORE, GOOGLE STORE, AMAZON, etc. The "keyboard", "tray" or "deck" may also be used in the generation of a message, such as allowing the user to select content, applications, search photos, copy, paste, forward or search the internet or the local device directly with the keyboard (i.e., add a video, add a picture, add an emoticon, etc.).

The user interface may also include a card type field 1310 in which the user can select the applicable merchant and/or merchants the card may apply. In the illustrated example, the merchant WALMART is shown as being selected. However, it will be appreciated that other merchants as well as general gift cards may be used (such as a digital Visa open-loop gift-card, etc.). In addition, when the user selects the add gift card function, in some embodiments, the textual content can be parsed and searched to identify triggers to use as search criteria for particular gift cards. For instance, if the text content indicates it is the recipient's birthday and the age of the recipient is determined from a source such as the text, the contact information, FACEBOOK, Google Plus, or other social media profiles, etc., then gift card suggestions for age appropriate, gender appropriate, etc. stores may be presented in a menu from which the sender can select or optionally search for other stores or merchants. In addition to the Repeat Annually switch, the user interface may also give the ability for the user to repeat the gift at other intervals, such as every month, every week, etc. by selecting or entering a value in text window 1312. In some embodiments, the repeat text window 1312 may be used to select the interval and the slide switch 1306 may simply be used to enable or disable the repeating of the gift. Otherwise, the switch may default to once a year and the repeat field used to modify the frequency to a different interval of time. In other embodiments, the receiver may be prompted a question like "Would you like to send a Thank You card"

Figure 14:
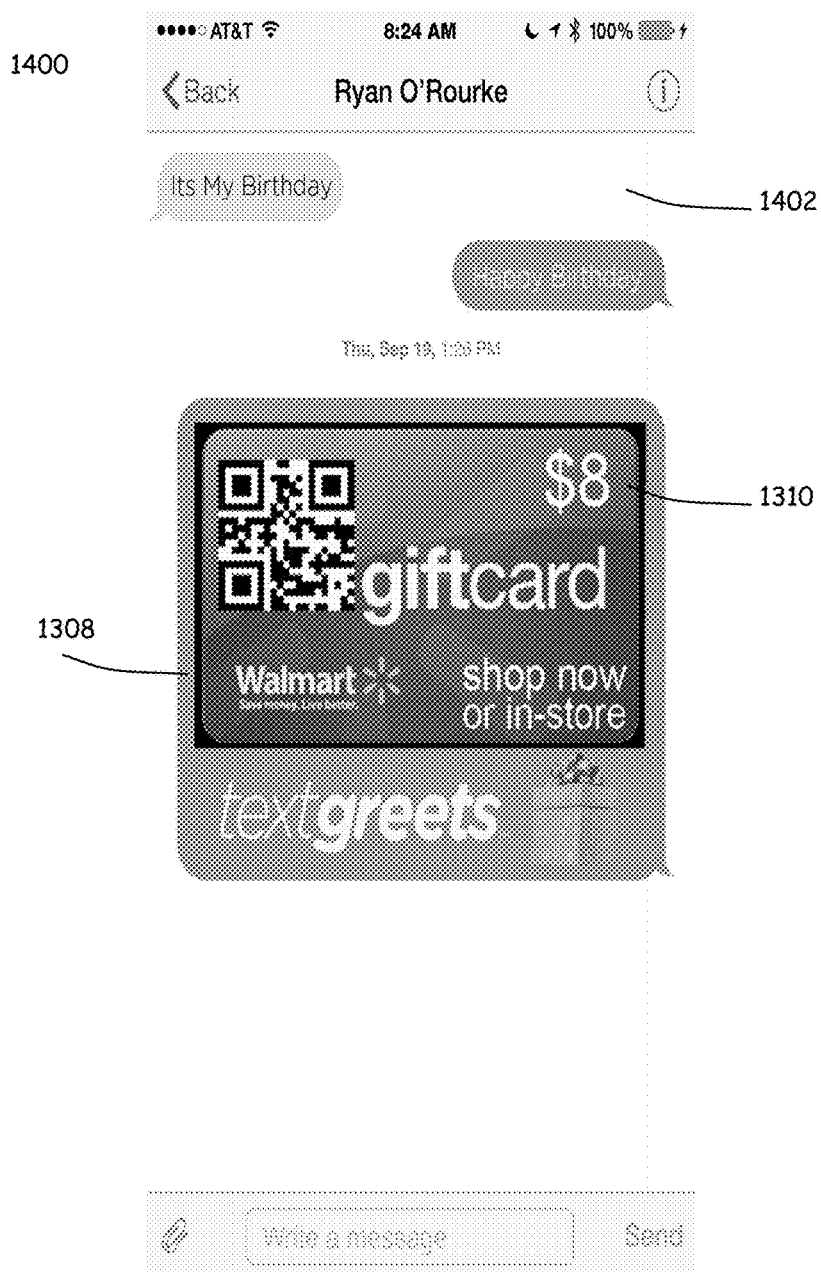
FIG. 14 is an exemplary user interface screen that could be displayed to a recipient after having played the greeting card or, having simply received the gift card.

FIG. 14 is an exemplary user interface screen that could be displayed to a recipient after having played the greeting card or, having simply received the gift card. In the illustrated embodiment, the screen 1400 includes a text window 1402 for sending and displaying received and sent text messages. In addition, the electronic gift card 1404 is presented to the recipient of the message. In the illustrated example, the recipient is shown as having received an $8.00 gift card. The gift card indicates that it can used for shopping online or for an in store purchase. The gift card can be invoked in a variety of manners depending upon the embodiment. For video content, in some embodiments the video content could be displayed over the entire screen or just a portion of the screen. Further, in some embodiments the playback of the video content is restricted within the "bubble" of the text message. As such, a thumb nail of the video, or some other icon is presented in the bubble to the text message and touching the thumb nail results in the play back of the video being rendered in that current location (i.e., within the area habited by the thumb nail. The video may be downloaded onto the devices storage or may be streaming video accessed from the internet or cloud based servers.

In some embodiments, after the greeting card is presented (i.e., the video is completed for a video greeting card as a non-limiting example) the gift card is displayed and it can be invoked by touching the screen where the gift card is displayed. In other embodiments, the greeting card and gift card may be delivered simultaneously in separate "bubble containers within the body of the message. Once the message is delivered, there may be a call to action built within the video, image or within the messaging delivery frame. This is referred to under the trademark TOUCH TO CUE or CUE TO VIEW. Thus, in this embodiment, touching or "tapping" the gift card may cause a browser session to open for the merchant or merchants associated with the gift card or open an app that enables the user to shop from the represented merchant(s), or direct a user to an internet URL or other location (the cloud or a location stored in the device). The TOUCH TO CUE or CUE TO VIEW technology may also be set up such that once touched, funds are automatically transferred into the recipient's account, such as a PAYPAL account, an AMAZON PRIME account, NETFLIX or a financial services banking account etc. In some embodiments the recipient may be prompted to select a destination and to provide information identifying the destination (i.e., account number or name, bank routing information, etc.). In addition or in lieu of the TOUCH TO CUE or CUE TO VIEW feature, a mobile action code (similar to a QR or Barcode and PIN code) as illustrated can displayed on the electronic gift card or some other code can also be used. Where compatible, this mobile action code can be scanned to identify the current balance associated with the gift card and apply it accordingly. Thus, at a point of sale terminal, the mobile action code can be scanned to invoke use of the gift card. Upon use of the gift card, the value associated with the gift card can be decreased and the displayed current value 1310 may also be augmented. In other embodiments, TOUCH TO CUE or CUE TO VIEW may be linked to a user account such as NETFLIX, CRACKLE, HULU, AMAZON VIDEO account and add the title of the movie received from the sender to the receivers subscription account to "CUE" the movie to be watched either now, or in the future.

Figure 15:
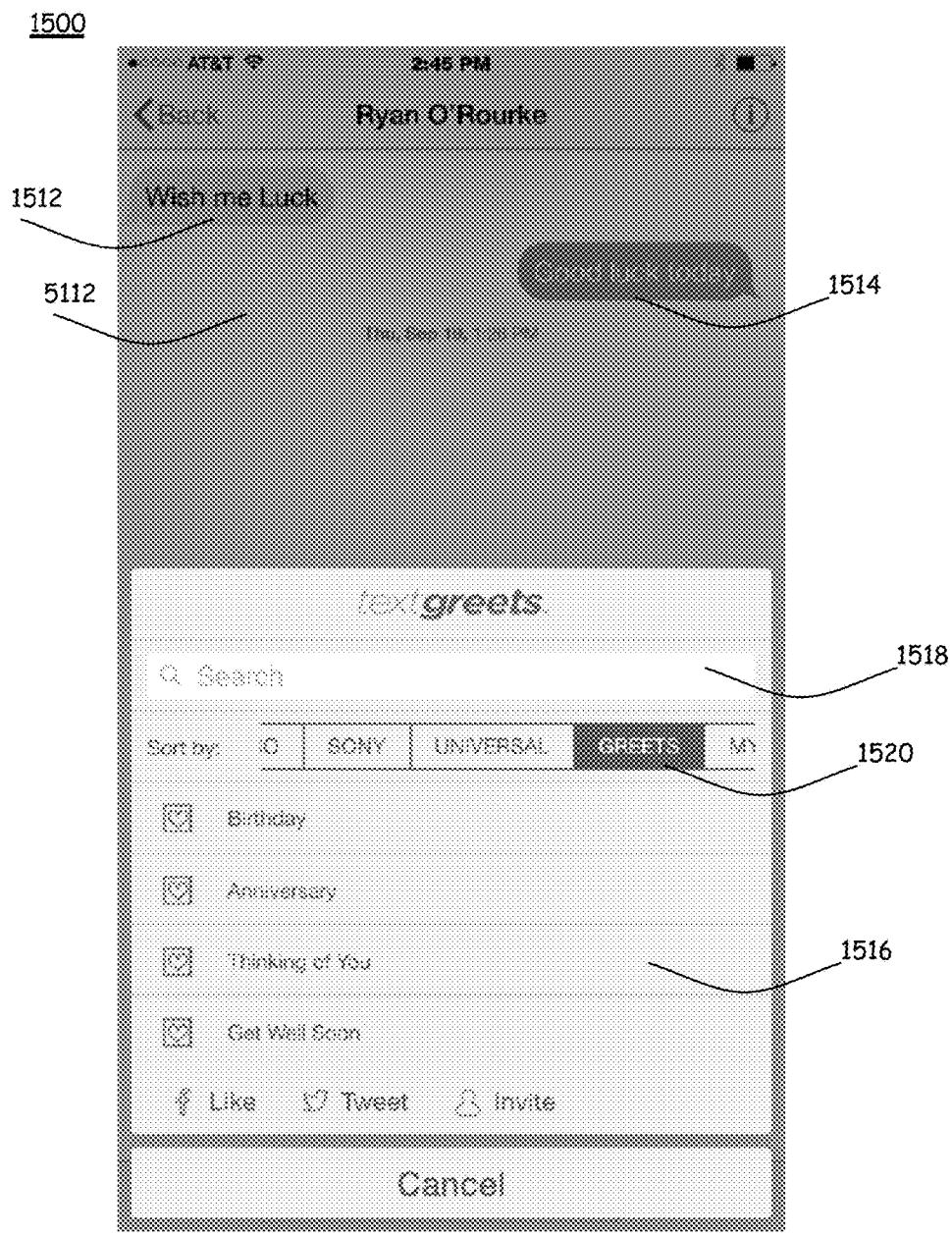
FIG. 15 is an exemplary user interface screen for a texting application that incorporates the greeting card feature with a sorting slide selector.

FIG. 15 is an exemplary user interface screen for a texting application that incorporates the greeting card feature with a sorting slide selector. In the illustrated embodiment, the screen 1500 includes a texting area 1510. In the illustrated texting area, the user has received a message from Ryan O'Rourke saying "Wish me Luck" 1512. In response, embodiments may search the received text and automatically pull up a list of content with which the user may respond and may even automatically generate the displayed response message "Good luck today" 1514. Further, it should be understood that in any of the embodiments, the key word searching, contextual searching, etc. can be performed on the messages to be transmitted, the messages received and a combination of both, as well as other information such as the user's calendar, time of day, day of week, current events, weather, holidays, location, etc. Thus, many factors may be taken into consideration when obtaining suggested or available content to be included in a message.

Thus, in some embodiments, upon receiving a message, such as "Wish me Luck" 1512, the application may generate the response "Good luck today" 1514 and then pull up a list of greeting cards (or gift cards when appropriate) that can be included in the message or, a list of categories that can be further searched for a greeting card. Such a list of categories is presented in window 1516 of the screen 1500. In some embodiments, greeting cards can be presented along with the other types of content. Further, the interface may include a search window 1518 to allow the user to enter other or alternate search criteria for obtaining recommended greeting cards, invitations or gift cards. For instance, the text presented in the search box 1518 can be used along with content in the text window 1512 or in lieu of such content. For example, the system or preference setting could be set to handle either case. Even further, a sorting slider 1520 may be used to filter and/or sort the available greeting card, invitation gift cards or the like.

Figure 16:
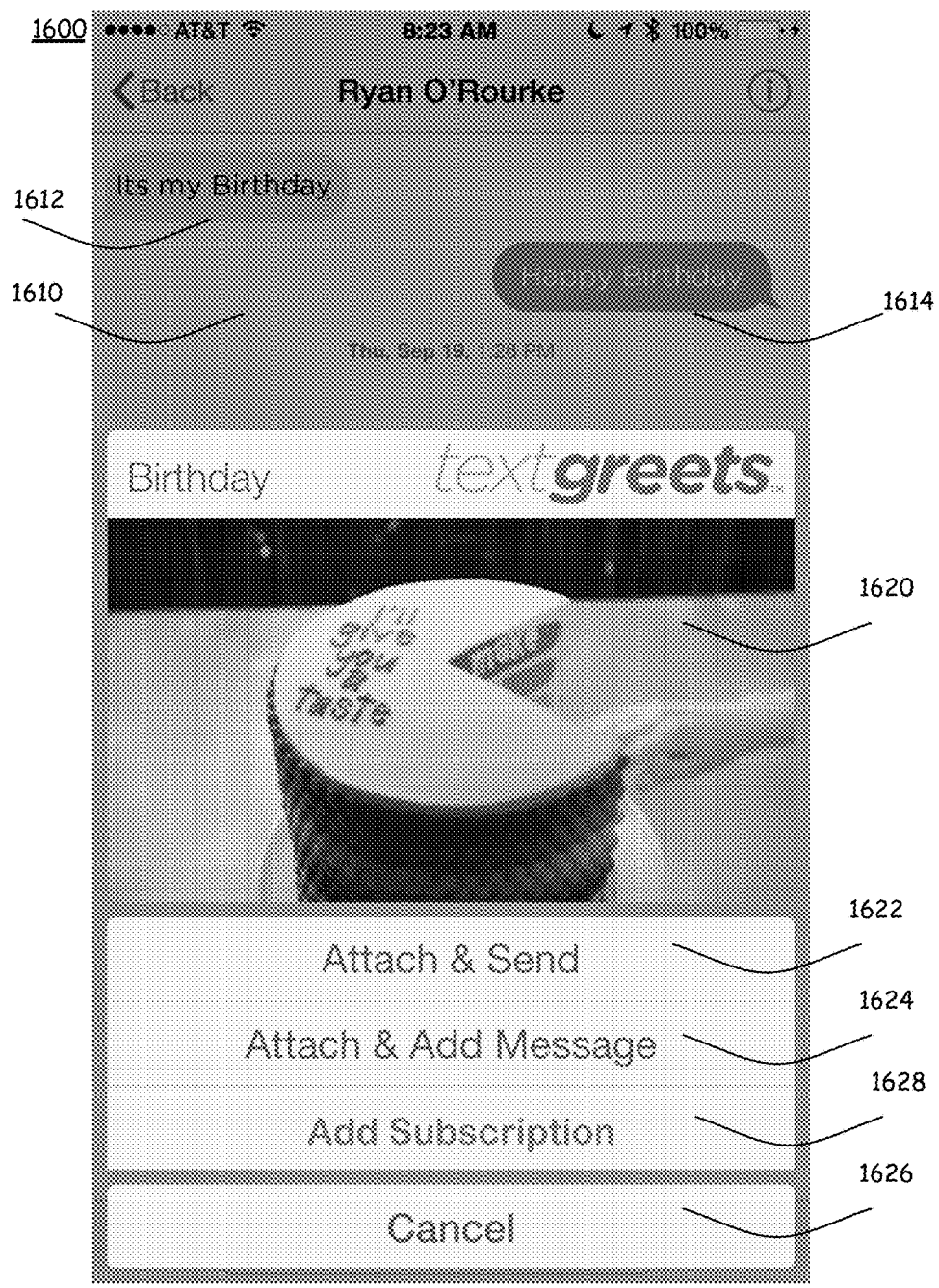
FIG. 16 is an exemplary user interface screen for an embodiment that includes the ability to send a subscription.
Figure 17:
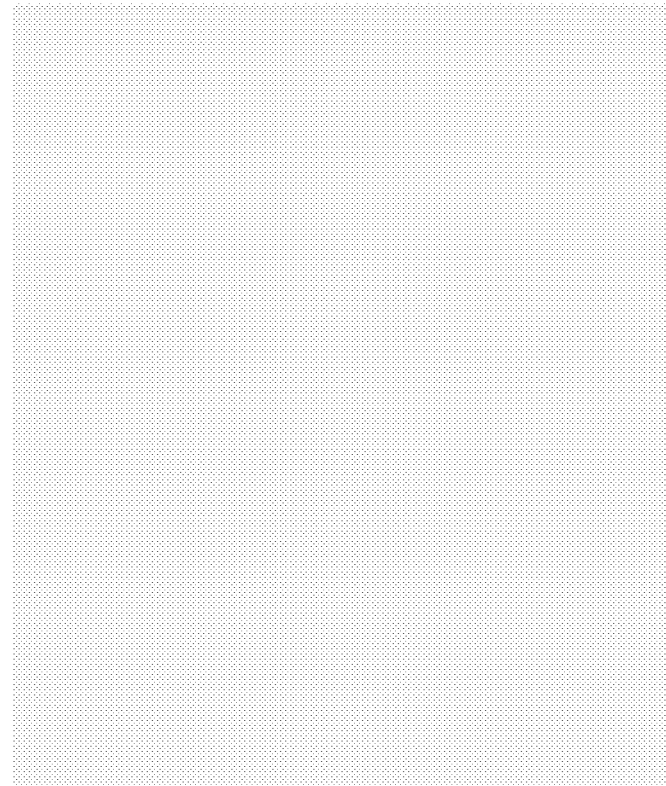
FIG. 17 is an exemplary screen that may be presented on the mobile device after the user selects the option to add a subscription (element 1628 of FIG. 16).

FIG. 16 is an exemplary user interface screen for an embodiment that includes the ability to send a subscription or a product. As illustrated in screen 1600, the text area includes a message from a first party to a second party saying "Its my Birthday" 1612 and a response from the second party saying "Happy Birthday" 1614. Further, the second party has selected to include the illustrated greeting card 1620 and now, in the illustrated embodiment, the second party has the option to attach and send the card 1622, attach the card and add a message 1624 or cancel 1626. It should also be understood that the second party could be presented an option to attach or include the greeting card 1620, or invitation in a to be prepared, already prepared, or being prepared text message. Thus, the greeting card could be anywhere in the body of a text message similar to an emoticon.

Further, in some embodiments an additional feature including the ability to add and transmit a subscription 1628, a product, or a call to action may also be made available to the second party. In such embodiments, the party sending the message has the option to also add a subscription 1628 and may include a product, or a call to action. This feature may include a subscription to a service, such as an online service (iTunes, Hulu, NETFLIX, HBO GO, KINDLE, etc.), a product, such as a magazine, a cosmetic, beauty item, or any other of a wide variety of products, or a combined product and service, or a coupon. The subscription can be sent along with the message to the recipient. The recipient can utilize the subscription, once received. For instance, the subscription may be an electronic credit that goes to the recipient's PAYPAL account or other account utilized for making payments to physical stores and/or online stores or financial institutions. In addition, a gift card or subscription may also be pre-loaded and activated to use immediately—Apple Pay and other techniques could also be utilized. The subscription may simply be a notice to the recipient that he has been subscribed to the product and/or service and the details of the delivery of the same. In other embodiments, the subscription may be a shopping invite that enables the recipient to shop for and select his or her own choice for the subscription. The subscription may provide a list of available options or simply provide a ceiling on the periodic fee for the subscription and the recipient can shop for a select a subscription within that price range and/or have the option to pay additional fees to obtain a more expensive subscription (as such the subscription notice acts as a subsidy to the recipient's actual subscription). The subscription may be defined in terms of duration (i.e., one year subscription), total cost (i.e, provided until a certain amount of funds have been depleted), a particular number of deliverables (i.e, ten provisions of product and/or service), etc.

The subscription can be invoked or received by the TOUCH TO CUE or CUE TO VIEW technology described in relation to the gift cards. The electronic credit may also simply be stored on the smart phone and redeemed directly from the smart phone at a point of sale purchase or online purchase. The gift card may also be redeemed as a mobile ticket similar to the Delta Airline App with the ticket residing on the user's phone. Further, in some embodiments the gift card could be redeemed by printing it out and handing it to a merchant and the value associated with an identification number on the print out can be reduced as necessary. Those skilled in the art will appreciate that a variety of other techniques may also be used for the delivery and redemption of such gift cards.

In the illustrated screen 1700, the user is presented with the options of sending subscriptions to NETFLIX, HBONOW and APPLEBEATS. As with other content, the available subscriptions can be searched for and presented to the sender based on the content of the text messages and/or other search criteria or triggering information. In the illustrated embodiment the user has selected a subscription to NETFLIX 1710.

Figure 18:
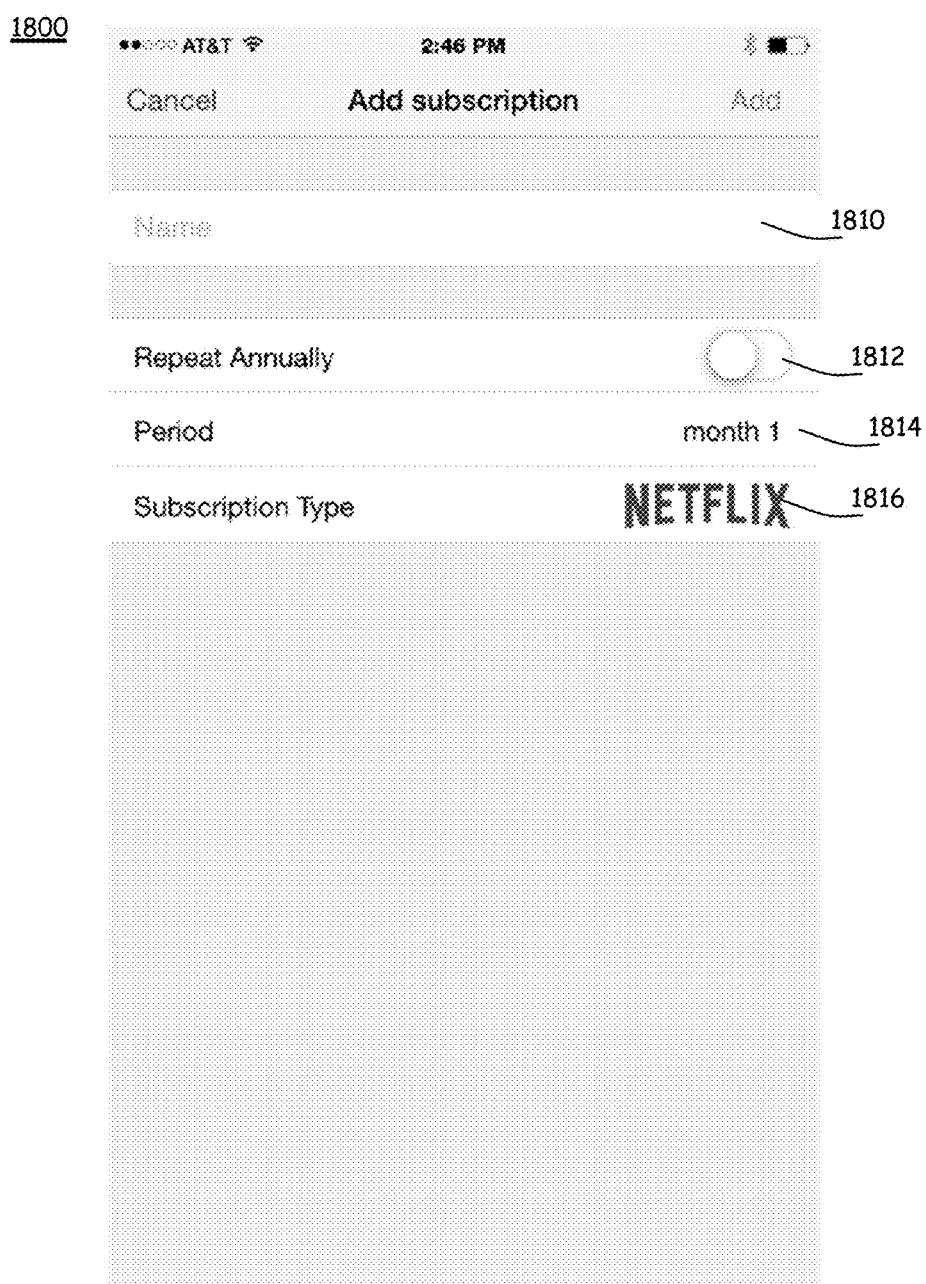
FIG. 18 is an exemplary screen shot showing potential options that the sender can select when adding a subscription.

FIG. 18 is an exemplary screen shot showing potential options that the sender can select when adding a subscription or coupon. The illustrated screen 1800 shows a few non-limiting actions or configurations such as a field to enter the name of the subscription 1810, a switch 1812 to actuate if the subscription is to be renewed or repeated annually or for some other interval of time 1812. A field to enter a period of time 1814 and a field to show the subscription type, which in the example is NETFLIX 1816.

Thus, some embodiments may include the gift card feature, some embodiments may include the subscription feature and some embodiment may include both and or other features. Thus, not all features are required for each embodiment and some features may be utilized in multiple embodiments.

It should also be appreciated that the value of the gift card may also be increased or "topped up" as an industry term. For instance, the sender may send additional values to be associated with the card. Further, if the sender sends a gift card, the associated merchant may also add value to a gift card that is owned by the sender as an incentive or award for sending the gift card.

Having now described various embodiments, as well as aspects and features thereof, the implementation technology is now presented. Referring again to FIG. 8 and FIG. 9, the various embodiments may be implemented in a variety of manners. As a non-limiting example, various embodiments may be implemented as a down loadable application that can be identified at a application store, such as the APPLE app store or the GOOGLE app store as well as third party suppliers, and then downloaded and installed on a computer platform, such as a smart phone. The application can then serve as the user's texting interface thereby replacing or operating in lieu of other applications such as MESSENGER, HANGOUTS, CIRCLES etc. As such, the user can access an app store, identify the application, keyboard or multitasking toolbar, download the application, install the application and then invoke the application to begin texting. Once invoked, the user's phone may include an interface as presented in FIG. 1-FIG. 7 as a non-limiting example.

The TextOS

Thus far, the messaging platform has predominately been described in the embodiment of an app that can be loaded into a mobile device.

In other embodiments, the application may be implemented as a plug-in that is compatible with existing texting applications. Thus, the user may download the plug-in (or the plug-in may be pre-installed on the platform) and the operation of various texting or SMS applications may be augmented by the plug-in such that they can present one or more embodiments of the present application. In this scenario, the user may be prompted to load the application within the TextOS keyboard (similar to how you access emoji's today) within the keyboard through Single Click Injection and may also be accessed from the text platform multitasking toolbar.

In yet other embodiments, the application may come pre-installed or as an integral part of the operating system or system software of a smart phone or other computer platform. In such an embodiment, the application is resident within the platform and can be invoked for sending text messages as per any of the various embodiments. Embodiments that take this latter form will be the main focus of the remainder of this description. However, it should be appreciated that the features, functions and aspects that are presented above are equally capable of being incorporated into the operating system class embodiments and, the features, functions and aspects describe in connection with the operating system class embodiments may also be implemented in the previously described embodiments.

Attention is now drawn to a higher level system that can serve as the messaging platform for the above-presented features and functions. The overall text operating system will be presented followed by unique and novel capabilities that can be implemented and incorporated into a mobile platform specifically enabled by the novel text operating system or messaging platform. It should be appreciated that the terms "text operating system", "textOS", "tOS" and "messaging platform" can be used interchangeably in this disclosure.

Figure 19:
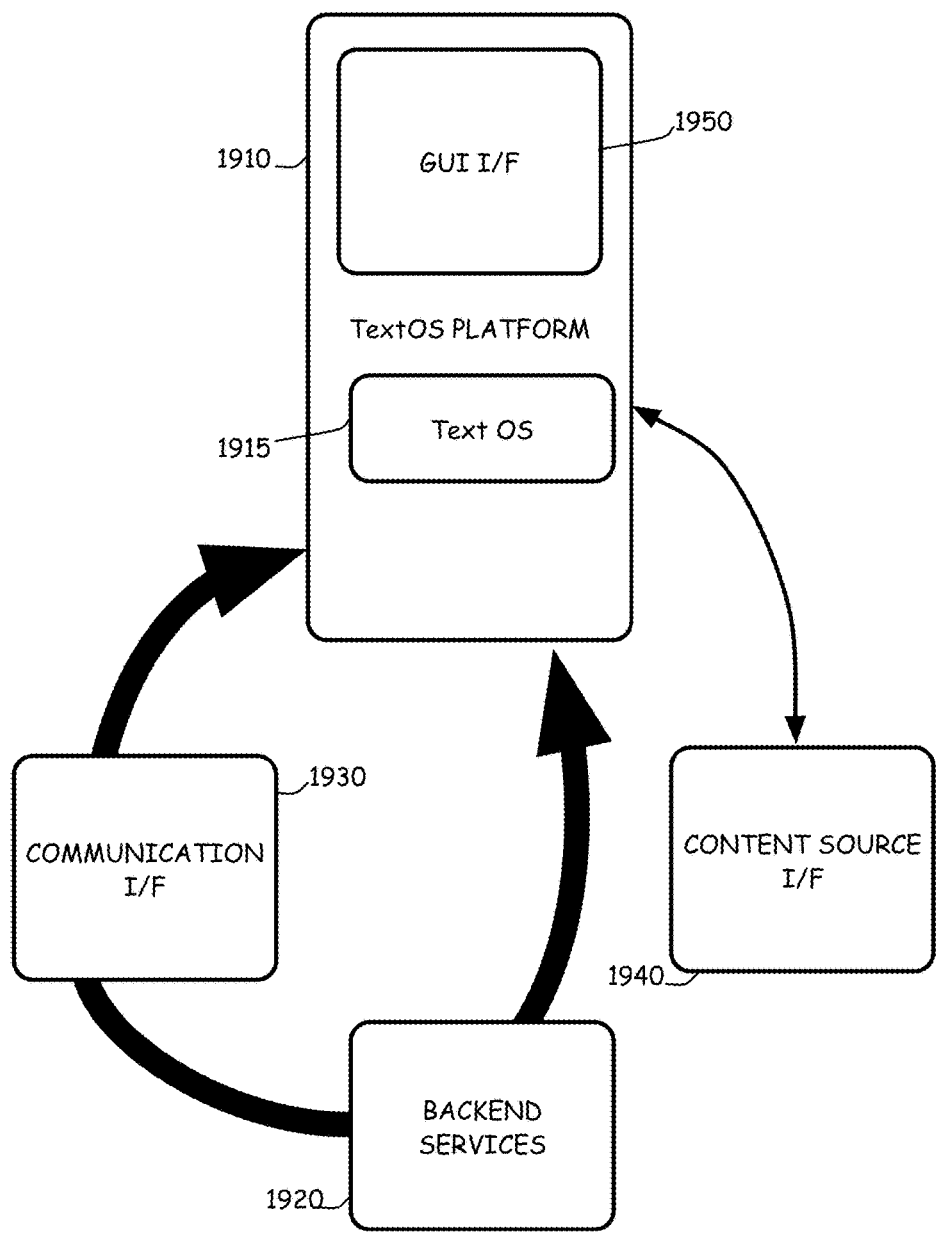
FIG. 19 is a functional block diagram illustrating the interaction of the components of an exemplary system including the mobile device with textOS and the backend support.

FIG. 19 is a functional block diagram illustrating the interaction of the components of an exemplary system including the mobile device with textOS and the backend support. The textOS platform 1910 may be any smartphone, tablet, pad or other computing devices including APPLE products and ANDROID based products as a few non-limiting examples. The textOS 1915 gets loaded into the device in any of a variety of manners, including but not limited to, being provisioned within the device at the time of sale, being incorporated into the system software or main operating system and being downloaded similar to an application or app, through a SDK developers kit that architects applications, or integrated into existing applications through an API. Once the textOS is launched it provides and drives a GUI interface 1950. The textOS 1915 operates in conjunction with a communication I/F 1930 and backend services 1920 as well as driving a content source interface 1940. It should be appreciated that when aspects, features, functionality, etc. of the various embodiments are presented in block diagram form, such as FIG. 19, that the illustrated blocks are simply to delineate functionality and are not necessarily characteristic of the implementation of the various embodiments.

Figure 20:
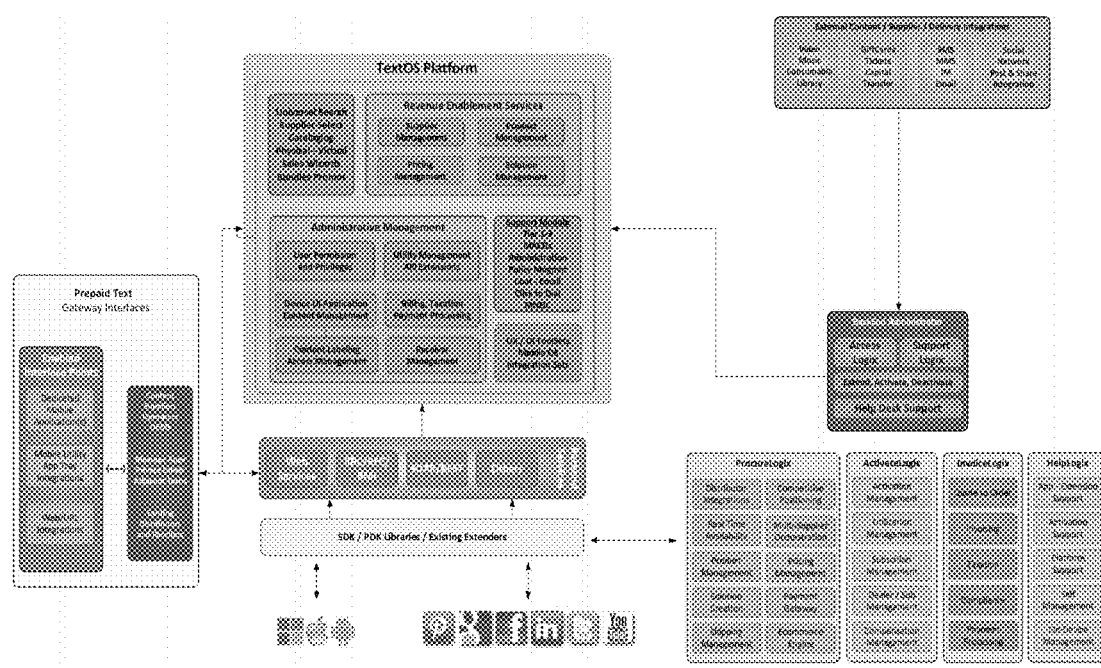
FIG. 20 provides greater detail with regards to the various interfaces and functional blocks to support the various embodiments.

FIG. 20 provides greater detail with regards to the various interfaces and functional blocks to support the various embodiments. In general, it should be understood that a software component is embedded within and operating on a mobile device platform to provide the messaging platform. The textOS enabled mobile device then interfaces through a backend system (in the illustrated embodiment) to enable a wide variety of functionality and, the textOS makes all of the functionality available at the fingertips of a user and all within the context of the messaging platform. For instance, as a few non-limiting examples, the textOS enables the user to access, include, provision, incorporate and transmit within the body of a text message, a gift card. In addition to the user interface aspects to enable this capability, the textOS also must interface with a third party system in the provisioning of the gift card. Similarly, to include multimedia content such as audio and/or video into the body of a text message, the textOS interfaces to a content source for such items. Thus, a complex and robust backend system provides underlying support for the operation and functionality of the textOS. The backend system, in some embodiments, is a provisioning system that can gain access to various merchants, banking institutes, etc. for performing actions such as completing financial transactions, transferring financial instruments, conducting ACH transfers, etc., all in a highly redundant, robust and secure manner.

Figure 21A:
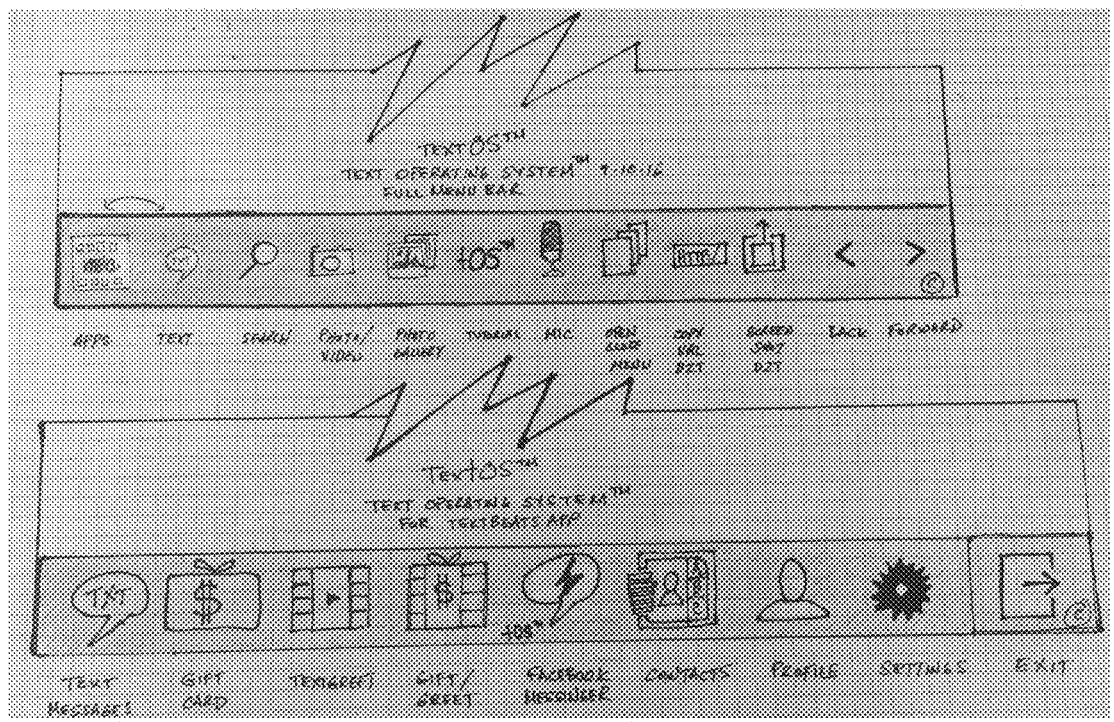
FIG. 21A is conceptual drawing illustrating one potential implementation of a user interface presented by the TextOS on a mobile device.

FIG. 21A is conceptual drawing illustrating one potential implementation of a user interface presented by the TextOS on a mobile device. A multitask toolbar is presented to the user by the textOS. The trey may be always visible and tied to a specific location on the screen, it may be floated on the currently active screen, it may float across screen, it may be hidden and only activated by certain actions, such as user gestures, or the like, as well as other techniques or combinations thereof. In some embodiments, the display of the multitask toolbar can be selected in a configuration setting to by any of or any subset of the above listed configurations or others.

Figure 21B:
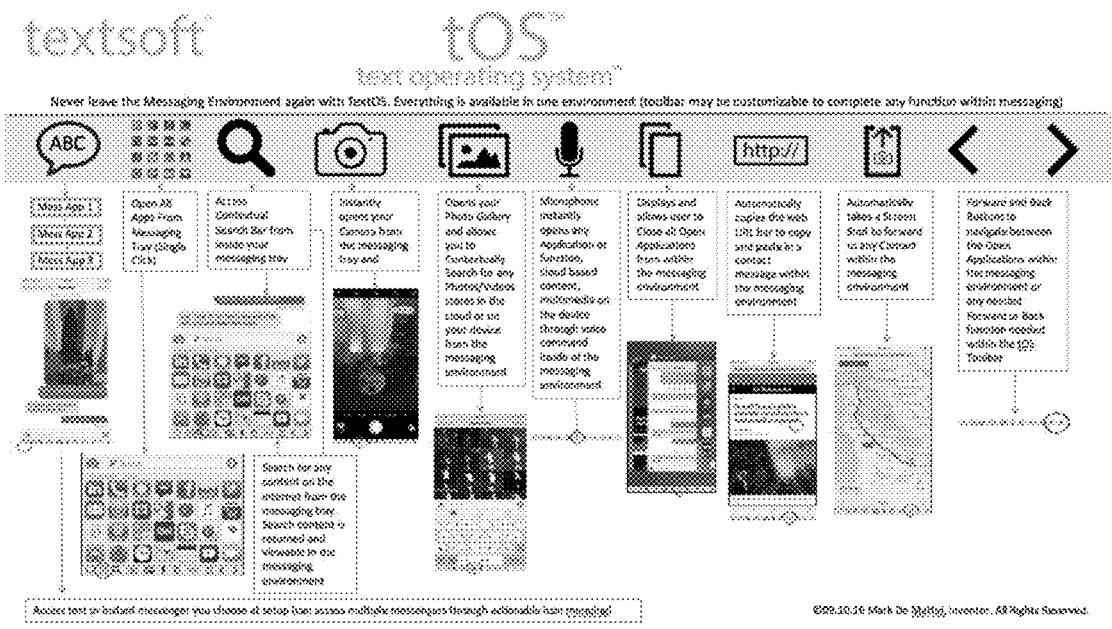
FIG. 21B is conceptual drawing illustrating one potential implementation of a user interface presented by the TextOS on a mobile device.

In the illustrated example of FIG. 21A, also illustrated in FIG. 21B with further detail, the toolbar shows a variety of icons that represent various access points to further functionality within the messaging environment. For instance, from left to right, the full menu toolbar illustrated in FIG. 21A includes an icon for TEXT to initiate the creation of a text message, APPS to gain access to the apps on the device or a selected subset thereof, SEARCHING to look for content, apps, contacts, emails, files, etc. on the device, PHOTO/VIDEO to gain access to the camera of the device to take pictures or record video of gain access to live audio/video for streaming, PHOTO GALLERY to gain access to and to be able to search for previously created (or tagged) pictures and/or videos, MIC to gain access to audio and/or music files, command the opening of applications or "ask to do" functions within the device or in the cloud, and/or to gain access to the microphone of the device for recording audio to include in a text message or receiving audio commands to perform certain functions (i.e. search for and include a particular picture in a text message), OPEN/CLOSE MENU to easily control open applications, COPY URL D2T (direct to text) for capturing the URL address that is associated with content that is presently displayed on the device display and store in the clipboard memory, such as in a browser window, and copy the URL directly to a text message, SCREEN SHOT D2T to instantly capture and store in the clipboard memory the content that is presently presented on the screen of the device or a portion thereof and embed that content into a text message, such as one that is currently being authored or opening up a new text message, BACK and FORWARD navigation functions to provide contextual movement, such as moving back and forth in the menu, moving to the previous or next page of a PDF file being displayed, moving to the previous or next email message, moving to the previous or next open application, moving to the previous or next photo or video etc. In addition, the illustrated multitask toolbar includes a "tOS" icon. Selection of this icon could cause various actions such as presenting a tutorial on the features, capabilities and how to use the textOS or, it could provide a simple help screen or an index to help videos. Further a MIC icon is also presented in the multitask toolbar. The MIC icon can be used to generate audio to include in a text message or it can be used to generate search terms for identifying content or items to include in a text message, application actions such as "OPEN or CLOSE", call to action for functions that are enabled in applications or actions related to the devices functionality. The MIC may also be used to access any content including and not limited to searching for content stored on the device, in the internet (URL'S etc) or in the cloud. Thus, a user could hit the MIC icon and audible request a VISA prepaid card at a value of $50 be sent to a particular contact via text messaging in which the call to action would be prepared from the voice commands.

FIG. 21A also illustrates exemplary menu changes when a user selects the APPS icon in the Full Menu Bar. Selecting the APPS icon presents an exemplary messaging platform APP interface. It should be appreciated that in the textOS, the icons presented on any of the menus may have combinatorial capabilities. For instance, if a user selects the SEARCH icon in the Full Menu Bar and slides it over and drops it onto the PHOTO GALLERY icon, then a search window of the photo gallery will be opened.

The messaging app menu includes icons to invoke various activities. The TEXT MESSAGES icon can be used to initiate the creation of a text message and/or to gain access to a text messaging interface (such as the default texting interface of the device or a resident texting interface like FACEBOOK MESSENGER, What's APP or SNAPCHAT) accessed within the textOS actionable icons depending on the embodiment and/or user configurations). The GIFT CARD icon can be used to invoke the purchasing of a gift card to be sent to a user via a text a message (it should be noted that a user can send items to himself or herself as well). Tapping the GIFT CARD icon can result in presentment of another menu to allow a user to select from a list of available gift cards, vendors, categories of gift cards, search for gift cards, etc. The user can then select a particular gift card and the monetary value associated there with and then initiate the inclusion of the gift card into a text message. The TEXTGREET icon can be used to present options for the user to include various multi-media content or indicia into a text message. For text messages that are being composed or that are parts of a thread, the textOS can parse the entered text as mentioned earlier, to gain knowledge about the contents of the text and/or thread and search for and retrieve relevant multimedia content. Thus, as illustrated earlier, the TEXTGREET icon can be used to initiate a search for content based on user input, textual content or both as well as other relevant parameters such as the day, proximity to holidays, profile information of the user and the intended receiver of the text (i.e., if the sender is Irish and the current date is near St. Patrick's day or if the receiver is Jewish and Chanukah is approaching as non-limiting examples). In some embodiments a GIFT/GREET icon can be used to generate a combination of sending a gift card with the GIFT CARD icon and sending a GREETING with the TEXT-GREET icon. Or, as previously mentioned, the GIFT CARD icon can be dragged to the TEXTGREET icon, or vice versa to trigger the same action. An exemplary embodiment may include a FACEBOOK MESSENGER icon to open up and give the user access to the direct messaging or actual posting on FACEBOOK through the control of the textOS. For example, the FACEBOOK MESSENGER application and be invoked to ride on top of the textOS and thus, the textOS can enable additional functionality for sending messages or presenting posts in FACEBOOK. As a non-limiting example, a user can actuate the FACEBOOK icon and then select the GIFT CARD icon to send a gift card to another person via FACEBOOK messenger. Similarly, as described earlier, a user can select and drag the GIFT CARD icon to the FACEBOOK MESSENGER icon, or vice versa, to accomplish this same action. Thus, in this example the textOS operates as the driver for FACEBOOK to enable the inclusion of other items in the FACEBOOK messenger or post through the power of the textOS and thus, gaining access to the wide array of features and functionality available through the textOS.

The menu may also include a CONTACTS icon. The CONTACTS icon can be selected to gain access to the user's contacts. The CONTACTS icon can be configured to pull contacts that are resident on the device or that are stored on the cloud or in other apps that include contacts such as GOOGLE CONTACTS, YAHOO, contacts stored on the device etc. In addition, items can be dragged to the CONTACTS icon to initiate other actions. For instance, dragging the GIFT CARD icon to the CONTACTS will open up a window to select a particular one or more contacts to which to send the GIFT CARD. If a text message is open, dragging the CONTACTS icon into the text message can present the user with the options of adding the current people engaged in the displayed texting session to the contact list or, allowing the user to select one or more contacts to include in the text message body.

In the illustrated embodiment, the multitask toolbar also includes a PROFILE icon to present an interface to allow the user to enter and/or modify a user profile. In addition, a SETTINGS icon enables the user to configure various elements of the textOS and control the operation. Finally, an EXIT icon is used to enable a return to the previous application or home screen.

In some embodiments, for an app to gain the full benefit of the textOS capabilities, the app may need to be modified. In such situations, an application provider may be required to purchase a license for the app to be made available from within the TextOS multitask toolbar/keyboard and, the app developer may have to license the textOS interface as well as implement it within the app through a Software Development Kit as an example.

FIGS. 22-29 are exemplary screens that may be presented on a mobile device, smartphone or the like by and application that is currently running on such a platform. These figures, as well as the descriptions presented for each, illustrate how the messaging application becomes a centralized focus of the user interface of the device. It should be appreciated that as previously described, the textOS can exist in many forms within the mobile device. Two such forms are delineated here with regards to the user interface in the form of the textOS toolbar presented in FIGS. 22-29. In one configuration, as previously mentioned, the textOS can operate similar to an operating system and thus, other apps, functions and features are invoked through the textOS system, such as through the toolbars presented in FIGS. 21A and 21B. In such an embodiment, the apps represented by each of the screen shots in FIGS. 22-29 have been launched through the textOS and thus, the textOS toolbar is displayed along with the standard interface for the launched application. Further, in such embodiments the textOS toolbar can be configured to float onto every screen of the mobile device and within every application of the mobile device, thus always ensuring that the textOS functionality is available and readily accessed—centralized. Further, the configuration settings may also be used to disable the textOS toolbar, hide the toolbar in certain apps or situations, require a gesture or particular screen touch (i.e. 3 finger slide) to bring up the toolbar, etc. In another configuration, the textOS is attached to particular applications as an add-on or feature. Thus, when the textOS is loaded into the mobile device, the user can select which apps are to include the functionality of the textOS. Then, when the various apps are launched, then the textOS toolbar is made available to the user. Similarly, apps loaded into a mobile device may include a preference selection that allows a user to enable or disable the textOS functionality for the application. It should be appreciated that these embodiments are just provided as non-limiting examples of the textOS.

Figure 22:
FIG. 22 is an exemplary user interface that could be presented on the screen of a mobile device.

FIG. 22 is an exemplary user interface that could be presented on the screen of a mobile device. More particularly, the illustrated screen presents a typical or resident messaging interface that has been augmented by the textOS capabilities. In the illustrated embodiment, the textOS is active and either the resident or default text messaging app is actively engaged in a text session or, a textOS messaging functionality is active. In either case, the textOS features are available to the user. As illustrated, a multitask toolbar is presented under the text input window that is labeled search. The window actually could be labeled search/message as the user can either enter text to search for content to include in the text body or insert additional text to send. Presently the search feature is active which could be the result of a user actuating the SEARCH icon in FIG. 21B. The user can then commence to enter text in the text box and the textOS will begin to search for relevant content based on the entered text in this example. As text is entered and searching commences, the items presented in the multitask toolbar can be switched in and out. For instance, in a non-limiting example, a user could type the following "pictures Christmas 2005" and the textOS may invoke a search of pictures stored locally on the device and/or web accessible pictures such as on the iCloud, Verizon storage, Shutterfly etc., or a combination of all stored photo accounts that are linked together by the user and then populate the screen with any thumbnails of pictures that meet the search criteria. It should be appreciated that the searching can be conducted contextually based on what is typed into the search box and/or based on text exchanged between the parties or other elements as presented within this disclosure. Contextual searching can look for local content on the device or may be used for cloud based content (pictures, videos, websites, etc.) like google searching but within the text messaging environment.

Thus, the toolbar in a textOS enabled mobile device may include not just the illustrated icons, but a wide variety of additional icons for accessing additional features. For example, the multitask toolbar or keyboard may include symbols, emoticons, applications, searching and other functionality. In addition, the multitask toolbar and keyboard may include greeting cards, invitations, gift cards, memos, GIFS, sending lottery tickets, etc. An additional inventive aspect of the present disclosure is an emovicon (Trademarked). The emovicon, similar to an emoticon, conveys a particular mood, feeling or message through the use of a movie clip or video clip rather than a graphic image. Further, an ephoticon may similarly be utilized (utilizing photos or videos to place you in a video clip). Thus, the textOS multitask toolbar and keyboard may include access to a library of emoticons, emovicons and ephoticons that a user can select and embed within a text message from a voice activated command (MIC) or accessed through the search engine or database menuing of the textOS.

Single Click Injection (Trademarked).

Various embodiments of the messaging platform may include and API for Single Click Injection of content. With this functionality, a user can click on various content and the content can be immediately injected into the keyboard window for inclusion within the text message. In addition, Single Click Injection will allow a textOS licensee to add an alert or a message while the user downloads a new app or updates an existing app to "ADD APP ICON TO YOUR TOOLBAR" which a "YES" answer would instantly load the application icon within the textOS toolbar and keyboard and the user would then be able to use all the functionality and access that licensee allows access to within within the textOS.

Further, a user can actually select any of the icons in the multitask toolbar at any time to invoke other activities. For instance, if the user actuates the PINTREST icon, the LinkedIn app (FIG. 27) can be activated as normal with the exception that the textOS toolbar would be present and the features may be enabled. For instance, the LinkedIn user interface may be modified to include one or more buttons that invoke textOS actions or, a gesture (such as a swipe down) can be used to pull up the textOS multitask toolbar for invoking various textOS actions. As a non-limiting example, a user may "swipe" upwards while in the textOS environment and enable the LinkedIn displayed content to be copied, stored in the clipboard memory, which when invoked will send a currently viewed or selected LinkedIn screenshot or displayed item to another party via text. In addition, and EXIT icon may be presented to allow the user to exit back outside of an application and in some embodiments may exit out of the textOS environment.

As another non-limiting example, a user can select the AMAZON icon to open the AMAZON store and gain access to all the features of the AMAZON store but, enhanced with the features of the textOS as once again, the AMAZON app is running on top of the textOS. Thus, the user can then take action to invoke textOS features such as purchasing an AMAZON gift card and texting it to a user, or making a purchase and embedding a URL to text to another user so that the user can enter shipping information for receiving the purchase as non-limiting examples. In some embodiments, AMAZON or other apps or companies may license only certain aspects of the textOS system, such as the gift card texting API (as a non-limiting example) which may be added as a stand-alone feature that is added to their own application, with or without the textOS toolbar.

It should also be appreciated that the textOS can operate in the background of a mobile device operating system and simply look for particular actions or gestures to invoke textOS features into various apps. In addition, the settings for the textOS may include a list of apps that can be selected to include the textOS functions and/or the various apps may include a configuration setting to enable the invocation of textOS features.

Figure 23:
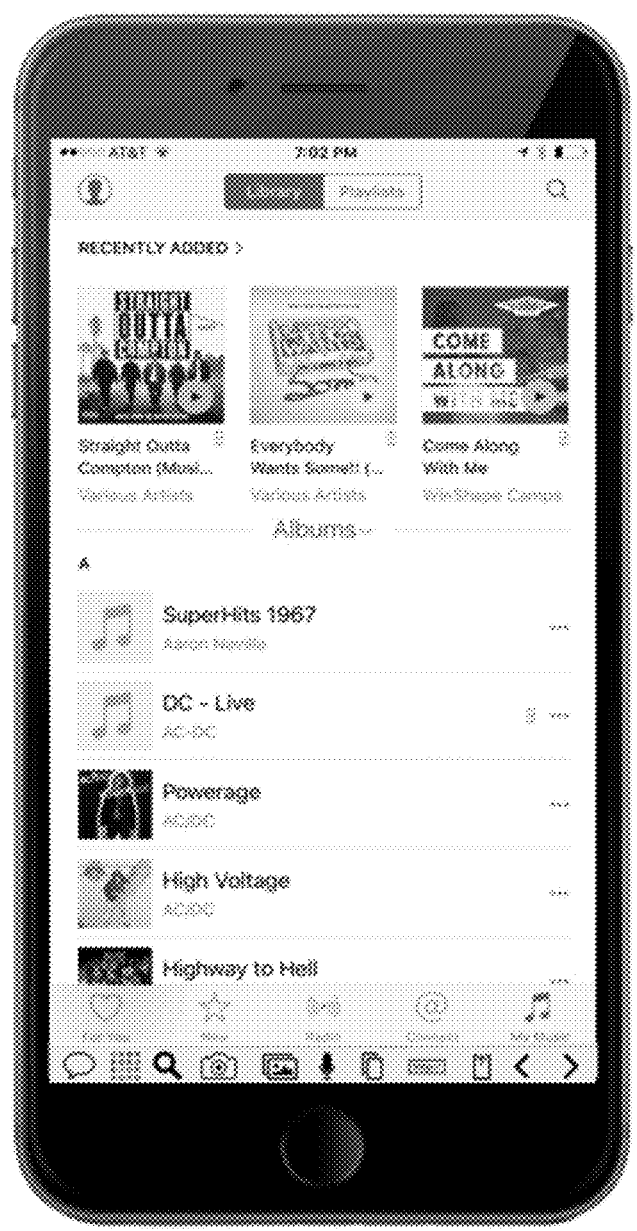
FIG. 23 is an example of the operation of the textOS with a launched application. In the illustrated example, the launched application is iTunes.

FIG. 23 is an example of the operation of the textOS with a launched application. In the illustrated example, the launched application is iTunes. The lower bar of the screen shows that the textOS is active and thus, the user can then gain access to textOS functions. Again, the various functions available and the methodology for accessing and invoking such functions can vary from embodiment to embodiment but in general, the textOS enables text related features to be invoked. For instance, a user can select a song from the play list, a currently playing song, artwork from an album, etc. and initiate the inclusion of such into a text message. In addition, the user could initiate the purchase of a song or an iTunes gift card and then include the same into the body of a text message. The user may also send a greeting card and/or a gift card. Each card may also include an audio clip, and audio clip of a vide clop or a video clip. At the end of the clip, the TOUCH TO CUE or CUE TO VIEW features can be invoked to direct the user to a subscription at iTUNES, Spotify, etc. and cue that song or video into the user's playlist if the subscription and the textOS feature is linked together through the application developer.

Figure 24:
FIG. 24 illustrates a user interface screen for the telephone application of an iphone.

FIG. 24 illustrates a user interface screen for the telephone application of an iphone. However, looking at the bottom bar it is evident that the textOS is active. In the illustrated screen as well as the screens of FIGS. 22 and 23, the bottom bar includes a text messaging icon (bubble) and a backspace icon. Selecting the text messaging icon can invoke different actions that are contextually dependent. For instance, in FIG. 22, the text messaging icon could toggle between search mode and text entering mode. Likewise, the backspace button can operate to delete text in the text entry mode or can be used to exit the current app and return to the texting environment.

Figure 25:
FIG. 25 illustrates another capability for invoking features of the textOS.

FIG. 25 illustrates another capability for invoking features of the textOS. In the illustrated environment, a user is accessing CNN using a browser or a CNN app. The textOS toolbar is shown as being fully accessible. The user can then make a gesture or select the text ionc to bring up the textOS texting environment. An active texting session is displayed along with the another toolbar while still maintaining the text toolbar at the bottom of the screen to enable all of the textOS functions. Another gesture, such as tapping on the text icon again, can be used to hide the entire environment to continue interfacing with CNN.

Figure 26:
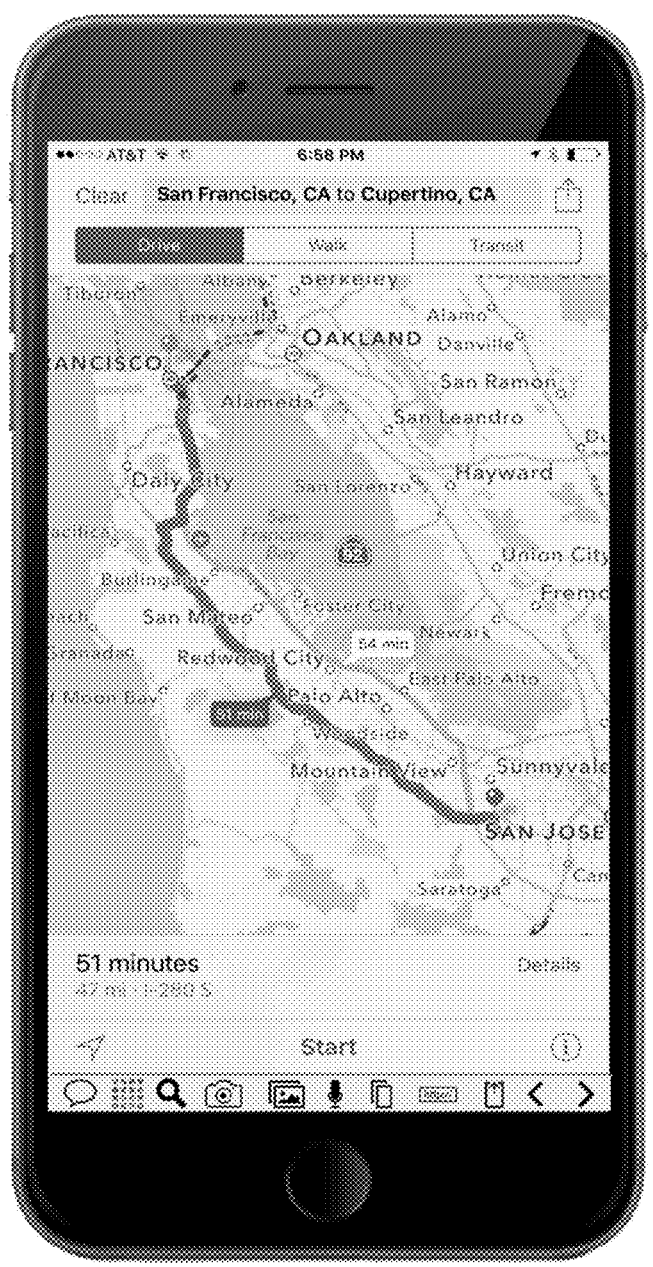
FIG. 26 illustrates a mapping or navigation application with the textOS bar presented on the bottom of the screen.

FIG. 26 illustrates a mapping or navigation application with the textOS bar presented on the bottom of the screen. The user can select the TEXT icon to initiate a text message. The textOS may augment the list of suggested recipients based on the destination and/or current location of the mobile device. But also, the user can maintain within the navigation application while constructing and sending a text message. Other features are also useful, such as instantly sending a screen shot to SNAPCHAT or in a message to let others know where you are and when you can be expected to arrive.

Figure 27:
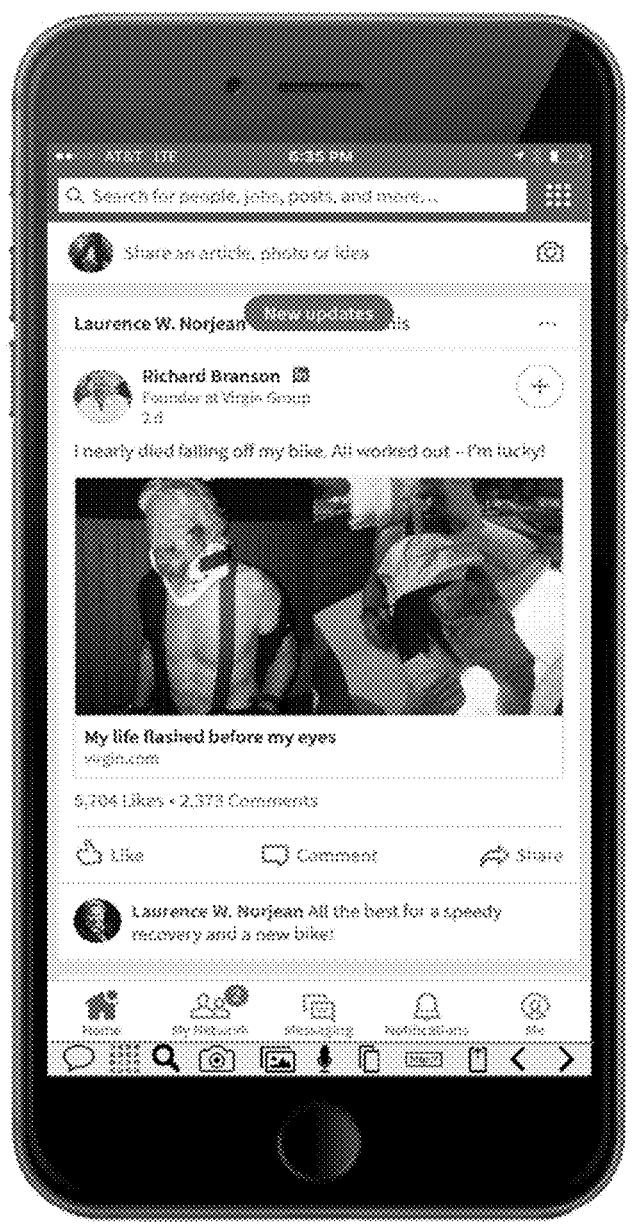
FIG. 27 illustrates the textOS functionality available within the FACEBOOK application.

FIG. 27 illustrates the textOS functionality available within the FACEBOOK application. Here again, the user can gain full access to the textOS texting functionality all within the LinkedIn application. Thus, the textOS capabilities for including multimedia content, gift cards, greeting cards, invitations, etc. can be accessed for LinkedIn postings and direct messages and, the use also has the ability to bring up the text messaging environment to author and send a text without having to leave the LinkedIn environment.

Figure 28:
FIG. 28 is another illustration of the textOS functionality being made available in another app, which here is the CNN app.

FIG. 28 is another illustration of the textOS functionality being made available in another app, which here is the CNN app. As illustrated in FIG. 25, a texting environment can be activated within the CNN application environment. Similarly, the textOS icons for URL or SCREEN SHOT can be selected to initiate a text including such information.

Figure 29:
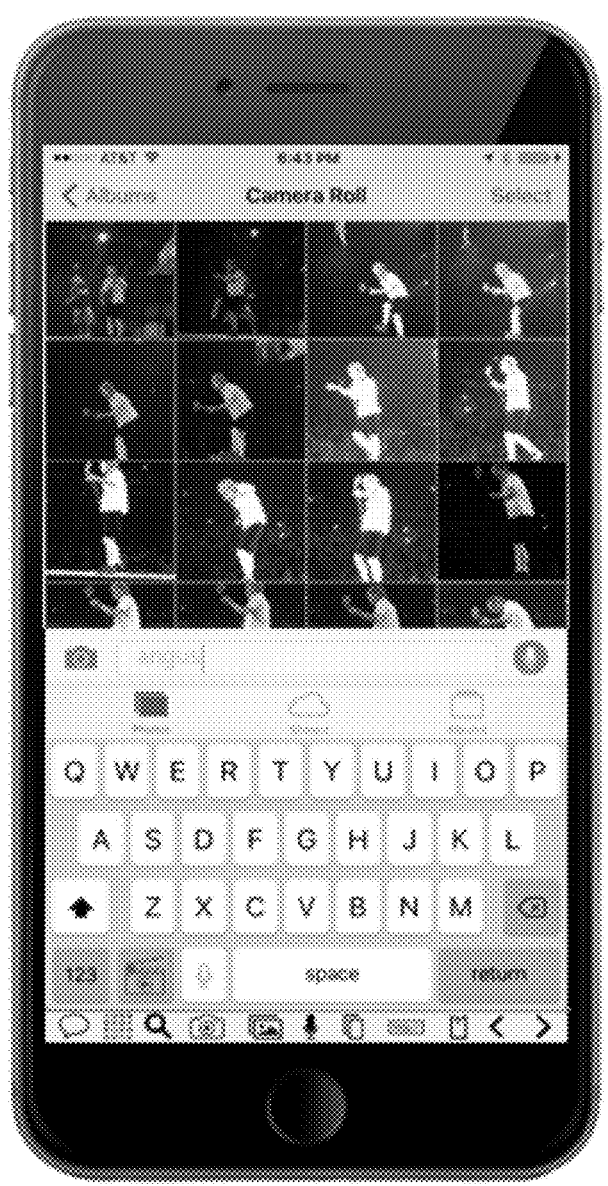
FIG. 29 is a screen shot of a camera roll that shows that textOS is enabled.

FIG. 29 is a screen shot of a cameral roll that shows that textOS is enabled. Thus, hitting the PHOTO GALLERY icon of FIG. 21 can result in landing on this screen where a user can select pictures and/or video to include in a text message. In addition, the textOS search function is available. Entering search criteria after activation of the photo gallery search icon can enable a user to contextually enter text, terms and parameters for searching on pictures and/or videos. The search can look at resident content as well as content available on the cloud or other third party sources.

Multiple user sources may be linked together to access all photo and video locations into one centralized window within the textOS.

Thus, it should be appreciated that the textOS can operate as the operating system for a mobile device, ride on top of the base operating system, run as a stand-alone app (via toolbar and keyboard utility), built-in a application by a developer SDK or otherwise maintain accessibility to a user. For instance, in some embodiments the functionality of the textOS can be made available in any state simply be performing a hand gesture. As a non-limiting example, the functionality of the textOS could be accessed by pulling the edge of a screen similar to the SAMSUNG EDGE products, or hand gesturing or "swiping" up from the bottom of an iPhone to locate the flashlight, Bluetooth settings, calculator etc. Other gestures or actions can also be used to activate or access the functionality. Thus, even when no apps are running and a mobile device is at its home screen, the textOS functionality can be accessed.

Various embodiments may include a picture recognition processor to help facilitate searching of pictures and/or videos and/or audio. For instance, facial recognition can be performed on pictures and then compared with other information sources to identify people in a picture and "tag" a portion or all of the people present in the picture that it may identify through this process. As a non-limiting example, a user's FACEBOOK, LINKEDIN, GOOGLE+ and contacts system can be accessed to see if there is a facial match for entities in a new picture. In addition, the time, location, date and other parameters may also be identified. Further, structures and other background information may be processed to identify recognizable elements such as the Statute of Liberty, Sears Tower, Fox Theatre, etc. Similarly for audio, various words or frequency identifiers in the audio can be recognized or processors such as SOUNDHOUND, SHAZAM, MYLYRICS etc. can be used to identify the name of the song, the artist, the album, etc. All of the information gathered by the recognition processors can be stored as searchable meta data and/or be incorporated into the file name of the element. Thus, when a user activates the search function for the textOS, the search can include or identify picture elements as hits. The pictures may be stored locally on the mobile device or available through a network such as being on iCloud, Dropbox or other remote storage locations.

Figure 30:
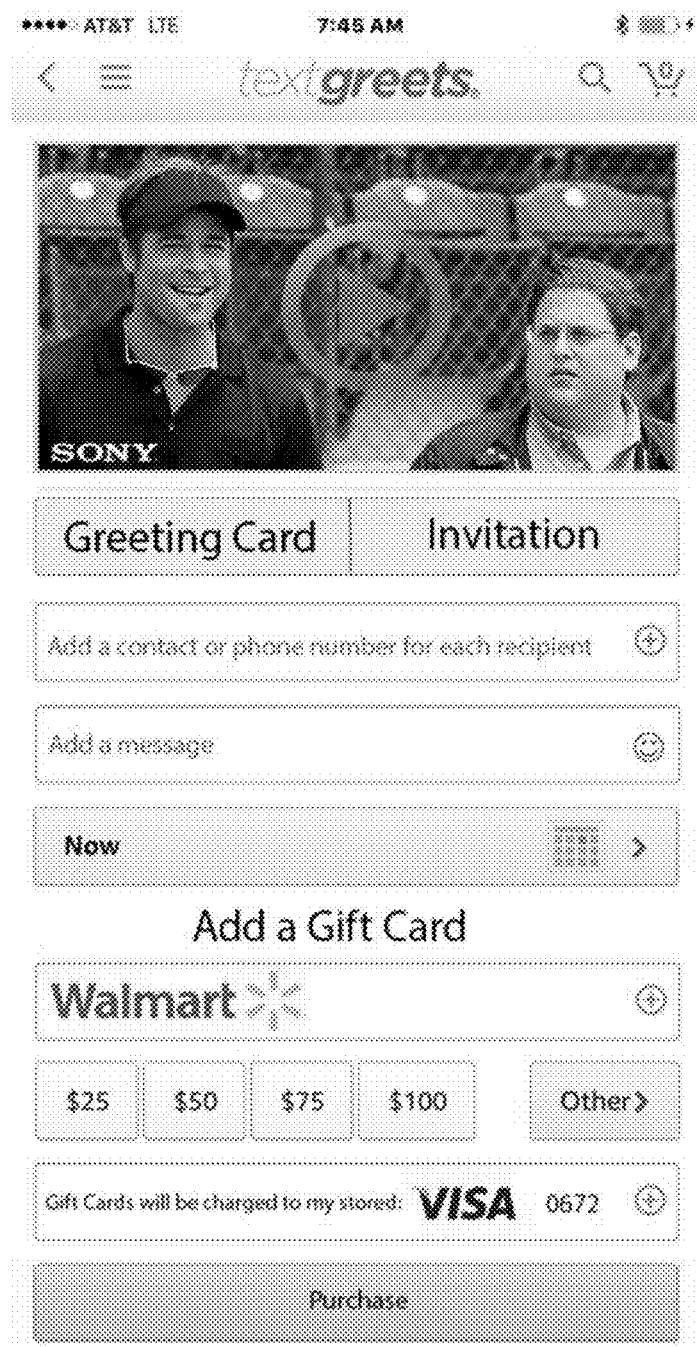
FIG. 30 illustrates an exemplary screen in which a user is creating a TEXTGREETS message with an embedded video clip and has the ability to add a gift card or send a greeting card, invitation or gift card independently.

The various embodiments have been described as enabling the transmission of gift cards to a user. Thus, a gift card can be selected and purchased from a third party, incorporated into the body of a text and then sent to another user. FIG. 30 illustrates an exemplary screen in which a user is creating a TEXTGREETS message with an embedded video clip and has the ability to add a gift card or send a greeting card, invitation or gift card independently.

Figure 31:
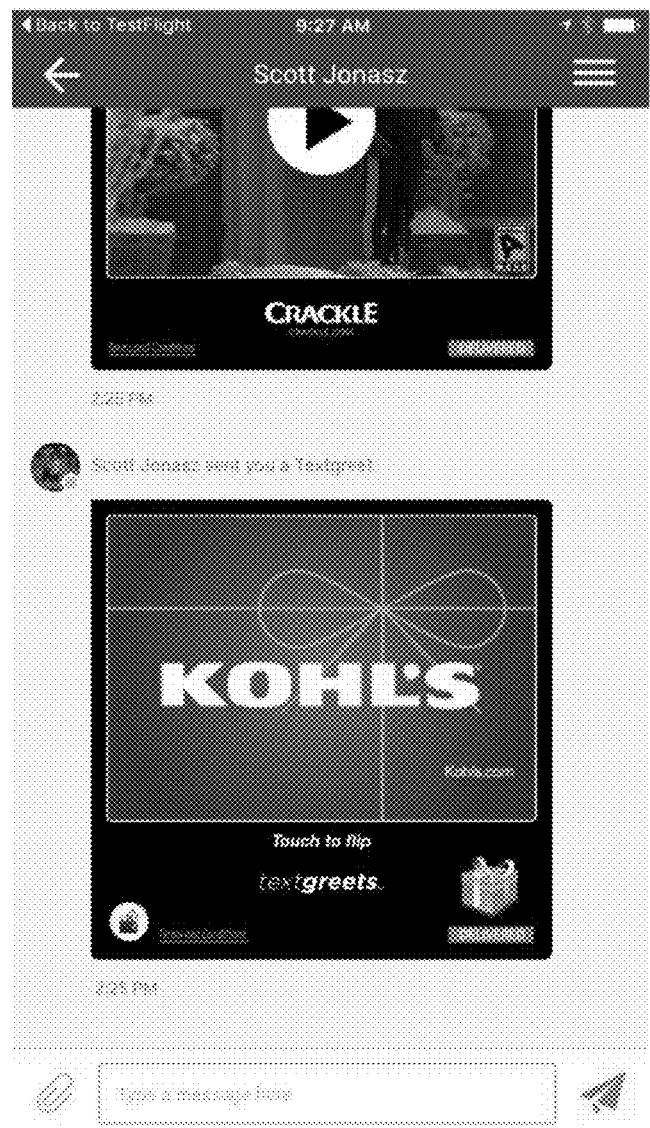
FIG. 31 illustrates an exemplary text screen for a user that has received a gift card sent through embodiments of the messaging platform.
Figure 32:
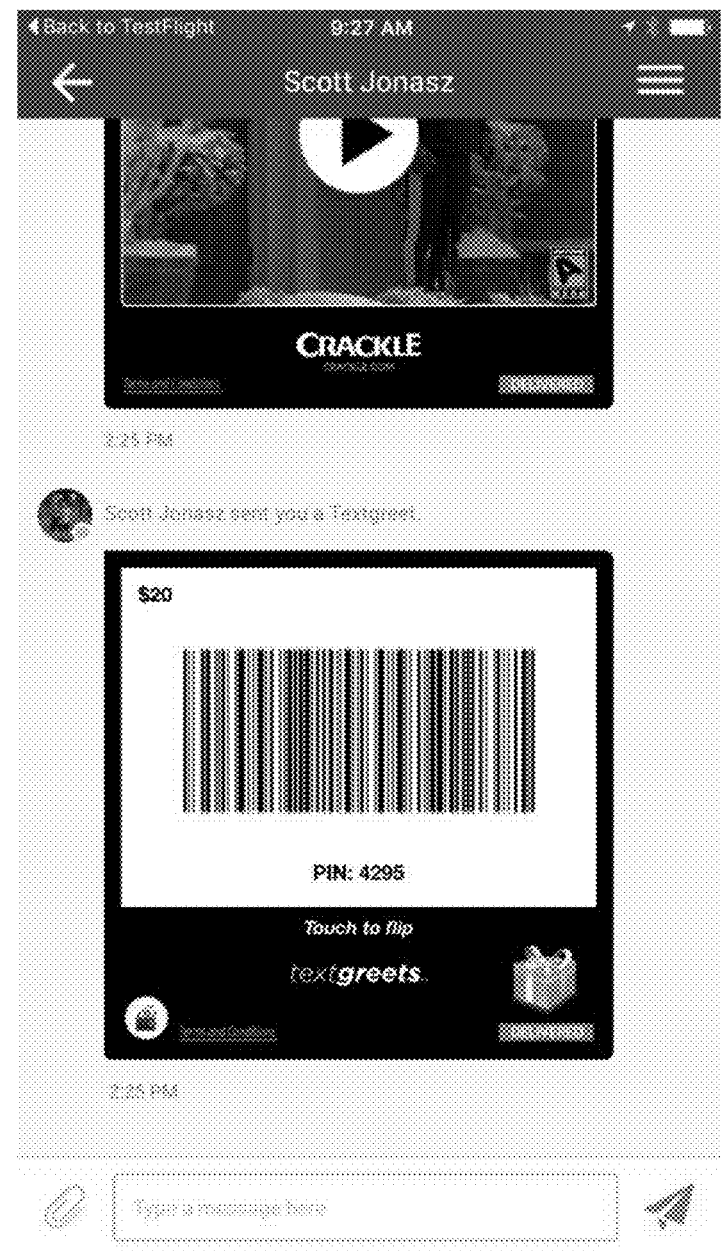
FIG. 32 illustrates an exemplary view of the back of the gift card or the redeeming information such as a bar code and PIN, etc.

FIG. 31 illustrates an exemplary text screen for a user that has received a gift card sent through embodiments of the messaging platform. The front of the greeting card identifies the type of gift card. FIG. 32 illustrates an exemplary view of the back of the gift card or the redeeming information such as a bar code and PIN, etc. To gain access to this information, the user can touch the gift card to flip over to the bar code for redeeming the value of the gift card. The card may also be stored in a mobile wallet within the application. Although the present figure shows the use of a bar code and a PIN, it will be appreciated that a wide variety of techniques can be used for redemption of the gift card include mobile action codes such as QR codes and other techniques.

The textOS may also be integrated with other financial transaction apps such as APPLE pay, mobile wallet, SAMSUNG pay, Banking Apps etc. Thus, a received gift card can be transitioned into the appropriate app for payment of items.

In addition, although the illustrated embodiments focus on the delivery of gift cards, the various embodiments can actually deliver any form of financial transaction. For example, an individual could receive their Government provided EBT credits via a textOS enabled mobile device text. In addition, users may purchase lottery tickets and receive their ticket payout through a textOS enable text message. Further, rather than having to go to a local store to redeem lottery winnings, a user can simply retrieve the lottery winnings via a text message that includes a general credit card, such as a VISA card, that is preloaded with the winnings. Further, a doctor could utilize the textOS enabled platform to send prescriptions to pharmacists and/or patients.

Similarly, the textOS system can be utilized for public transportation. For instance, a user can order a transit card with a particular value and the transit system can send a text with a preloaded value for transport. The user can then utilize the received text card for boarding and paying for transport.

Streaming Video within Body of Text Message

Figure 33:
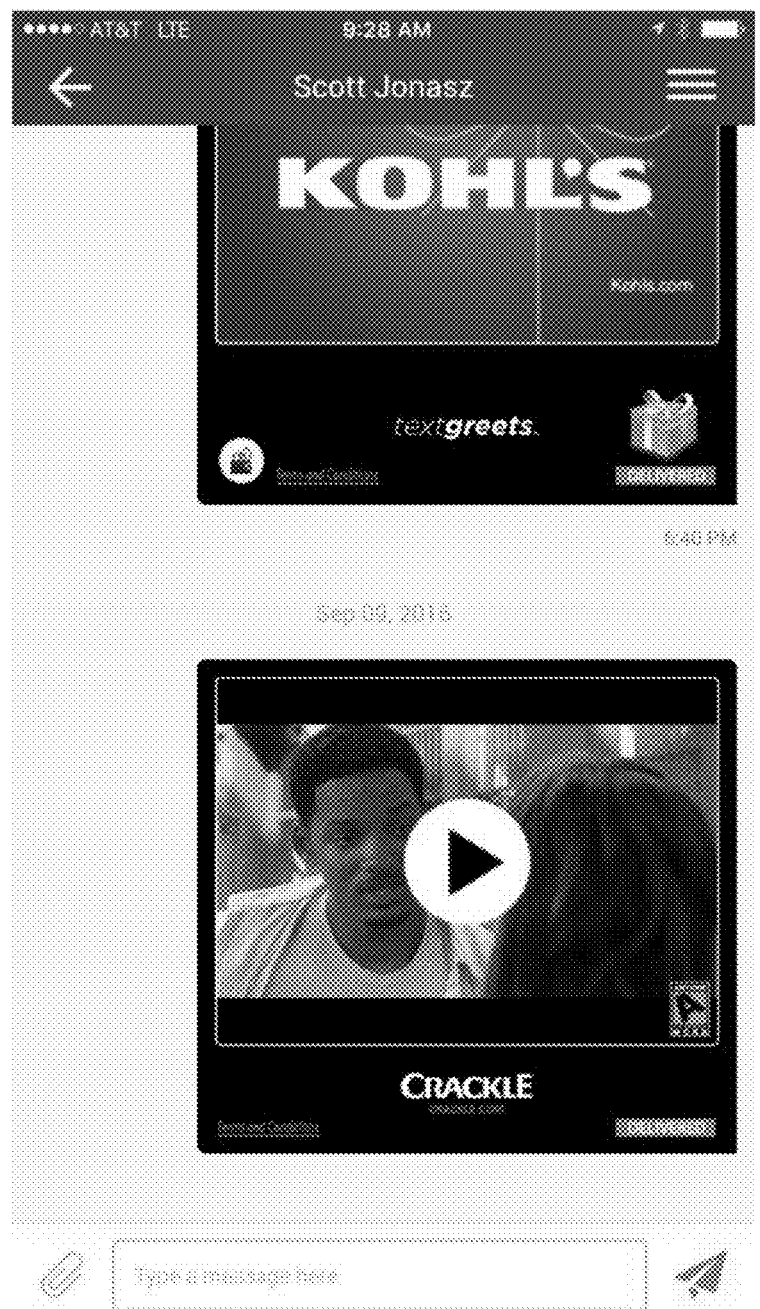
FIG. 33 illustrates another novel concept that is enabled through the various embodiment of the textOS.

FIG. 33 illustrates another novel concept that is enabled through the various embodiment of the textOS. The illustrated screen is a text message interface showing messages that have been sent between the parties to the text conversation. As typical, a user can scroll up and down to look at past messages. In the present screen, an embedded video clip is included in the body of the text message. The video clip had previously been inserted into a text message to send as has been previously described. But on the recipient side, the video clip is embedded right within the body of the text message. Thus, what is illustrated is not a thumbnail with a URL to point to a website for retrieving and playing the clip but rather, the clip is embedded within the body of the text. In other embodiments, the text simply includes a window and when the window is displayed on the screen the video clip is automatically streamed into to the window, such as the equivalent of an F-Frame. In such an embodiment the user can pause and resume the video.

In addition, the graphic displayed to the user may also include embedded URLS. For instance, an icon may be used to indicate that the clip or the source of the clip (such as a movie) is available for purchase and thus, the user can actuate the icon to imitate a purchase and/or down load of the entire work. Further, a user can access the source website, such as CRACKLE to look at other options available for purchase by actuating the CRACKLE icon.

Figure 34:
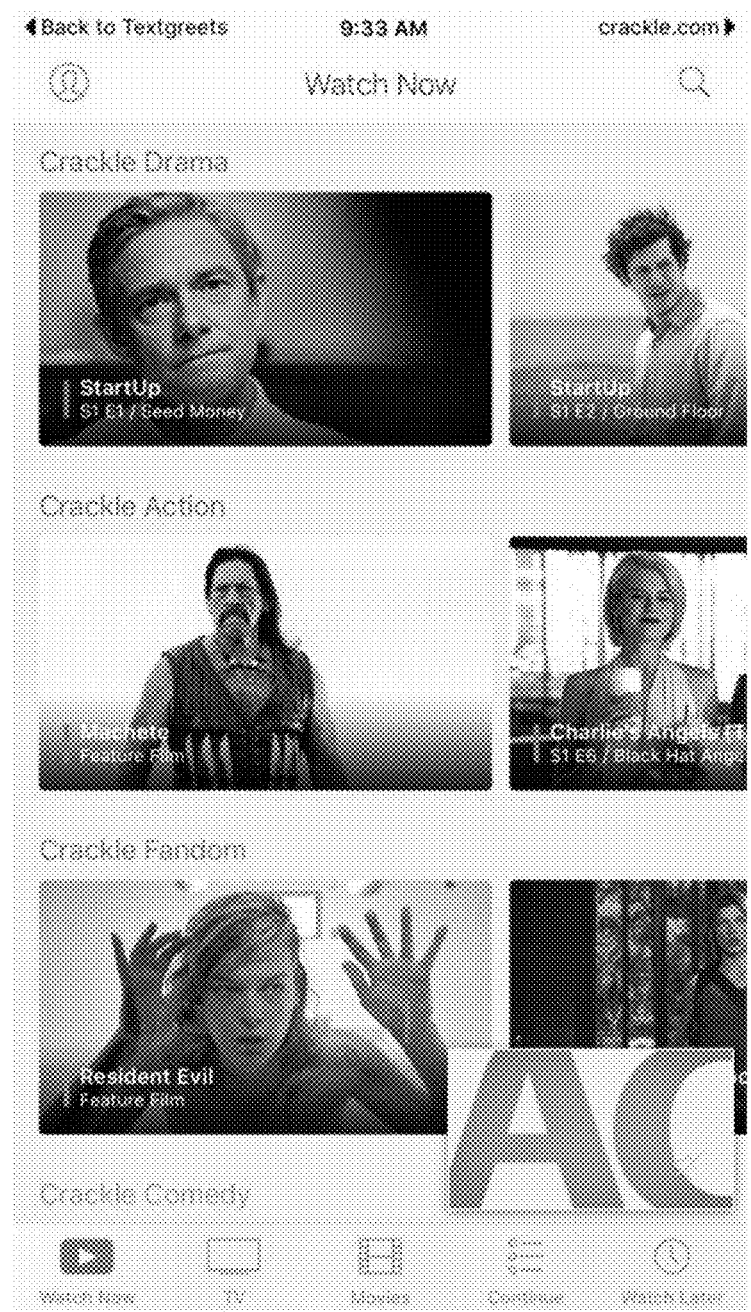
FIG. 34 illustrates an exemplary embodiment of a screen presented to a user after actuating the CRACKLE icon in FIG. 33.

In an exemplary embodiment, actuating the CRACKLE icon may take the user to the screen as presented in FIG. 34. Here, the user is presented with a typical CRACKLE interface for searching, playing and purchasing content. In addition, the user is presented with a "BACK TO TEXTGREETS" link to exit CRACKLE and return back to the texting environment.

Micro-Clips Rating

Various embodiments of the messaging platform include a micro-clip rating system. The Motion Picture Association has established criteria for rating films and content based on various criteria. Thus, a G rated movie meets certain criteria and parents can feel secure in allowing their children to watch it. However, the rating of the movie is based on the entirety of the work. Thus, a clip of a work may actually have a different rating than an entire work. For instance, a clip from an R rated move may be perfectly suitable for children, whereas the entire work is not.

Figure 35:
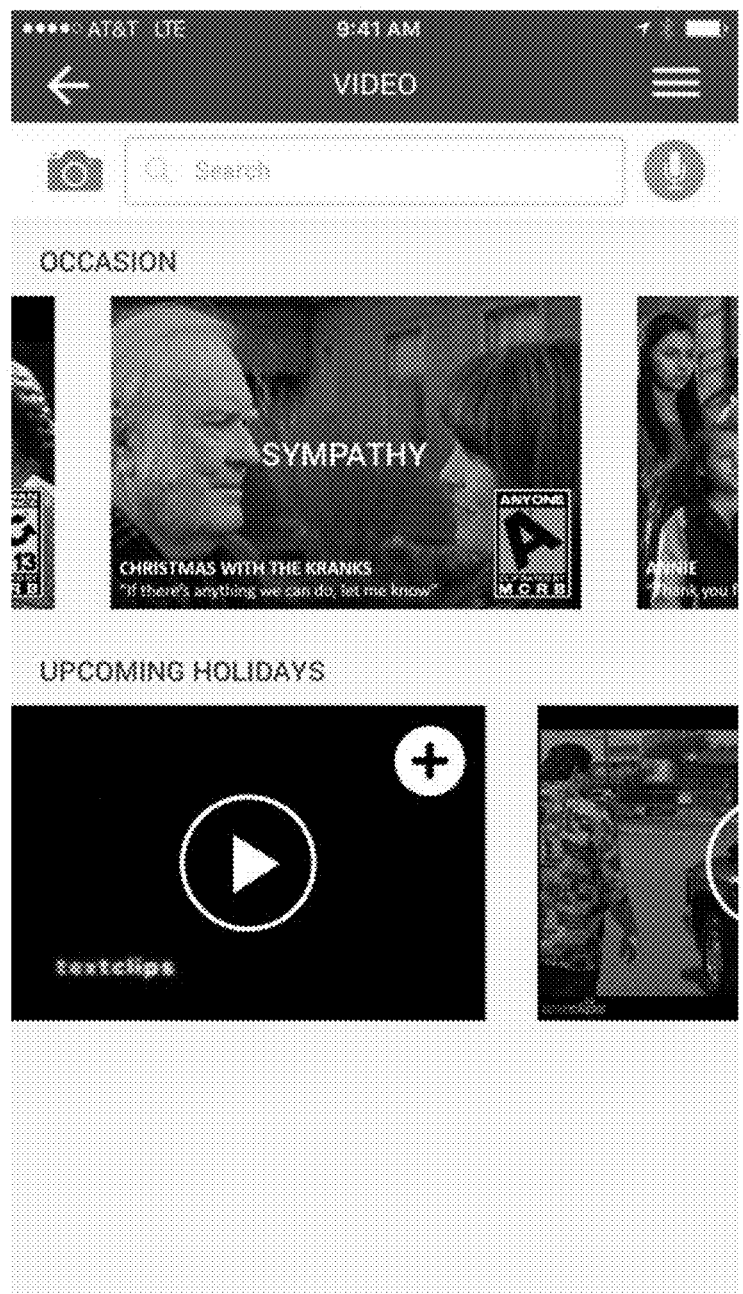
FIG. 35 illustrates a clip from the movie Christmas with the Kranks that has a Motion Picture Association rating of PG but, the micro-clip rating is A for "anyone".

The various embodiments provide a micro-clip rating system that provides a rating based on the content of only the clip of the underlying work. FIG. 35 illustrates a clip from the movie Christmas with the Kranks that has a Motion Picture Association rating of PG but, the micro-clip rating is A for "anyone".

Internet of Things

The concept being referred to in the market as "the internet of things" or IoT can be summarized as basically connecting any device with an on and off switch to the Internet (and/or to each other). This includes everything from cellphones, coffee makers, washing machines, headphones, lamps, wearable devices and almost anything else you can think of. This also applies to components of machines, for example a jet engine of an airplane or the drill of an oil rig. Thus, any electronic device has the potential of being pulled into and included within the IoT. Further, even traditional non-electronic devices can be pulled into the IoT simply by use of a small, inexpensive electronic tag, such as an RFID or the like. Thus, any item you purchase may include a small electronic tag embedded within it thus enabling the item to be pulled into the IoT. As a non-limiting example, a user could have a refrigerator full of tagged items and it can easily be inventoried of what is in the refrigerator, including expiration dates, freshness analysis etc. This information could also be augmented by monitored use of the refrigerator such as the internal temperature over time, the number of times the door has been opened and how long, etc. Some have predicted that by the year 2020 there will be over 26 billion connected devices and some estimate that there will be much more. Thus, the IoT is a giant network of connected "things" (which also includes people). The relationship will be between people-people, people-things, and things-things.

Within the context of the textOS, the IoT could be incorporated to provide additional functionality. For instance, in composing a text message to your spouse, the text may indicate that your spouse is going to stop by the grocery store. The textOS could then automatically invoke an app or function to access various devices on the IoT and gather useful information. As a non-limiting example, the user's refrigerator could be accessed to determine its inventory and what would need to be purchased.

Textvites

The textOS also enables the provision of invitations to events such as what is available in evites with the exception that it is performed in the text environment. Thus, within the text environment, a user can select a calendar icon from the trey and then migrate to the calendar app, create an event and then text an invitation or TEXTVITE to the event. Similarly, the user can access this through other activities as well. For instance, if the user is purchasing tickets to a concert, game, etc., the user can then actuate the text icon and an invitation can be sent to others or to oneself via a text message. When the text message arrives, the textOS can be integrated with the calendar system to automatically populate the user's calendar with the event and allow the user to accept, decline or consider.

Touch to Cue

The various embodiments of the messaging platform may also include a touch to forward or touch to cue feature. This feature can be enabled in a variety of manners and those skilled in the art will be aware of techniques such as a double tap, a prolonged tap, etc. to enable a tapped element to be forwarded to another party. Thus, when actuated, the user can forward a TEXTGREET, a gift card, a video clip, etc. to another party. However, it will be appreciated that some of the items may be restricted from being sent to others. For instance, a clip or photo may have attached copyrights and the owner may not grant the right to forward such items to others. In such situations, the content items can include metadata or other techniques to earmark the item as one that cannot be forwarded to others.

Cached and Containers

A great advantage of the textOS is that it can be implanted as a stand-alone container similar to what was referred to back in the early days of MS-DOS as a terminate and stay resident app. Basically, the functionality is always present and running. In addition, the textOS can be web based and then cached to ensure perpetual availability. For instance, in today's world of apps that are web based, it is problematic when a user does not have an internet connection for a period of time. For such web apps, if you cannot access a website, then the app is simply not available to the user. This can be true even if the app or the intended use of the app does not even require internet connectivity. Thus, the textOS can have the critical portions cached into the mobile device such that it is stored locally and made accessible even without a signal or wireless connectivity.

Further, as previously described, the textOS includes an interface to and access to hardware or functional features of the mobile device such as basic location data and camera access. However, the textOS may actually include expanded access to many other hardware and functional aspects of the mobile device. As previously mentioned, the textOS can integrate with mobile payments (i.e. Apple Pay) and advanced media support (i.e microphone and low level camera functionality).

Operating at the operating system level, the textOS is able to access all of the hardware and functional features of the mobile device and leverage them for enhanced functionality in the messaging platform. Some of functionality may be autonomous. For instance, if the battery level is low, the textOS can autonomously generate a text message to the user or other user's (such as a parent) to notify that the mobile device should be recharged. Further, the location information for the mobile device can be periodically transmitted via text to the owner or responsible party so that the location of the mobile device is updated. Further, keywords can be identified within the textOS environment and if a text is received with one or more keywords, the textOS can implement certain functionality. For instance, a user can send a text to a mobile device to remotely turn on the LED light or to make a sound such as a ring tone. Further, the keyword may trigger the textOS to identify the location of the mobile device and then send a text to indicate the current location.

With a non-forwarding lock within the content; and a touch to forward "cue" (to a url or any other actionable location), content can be sent to a first user but not forwarded onward.

Figure 36:
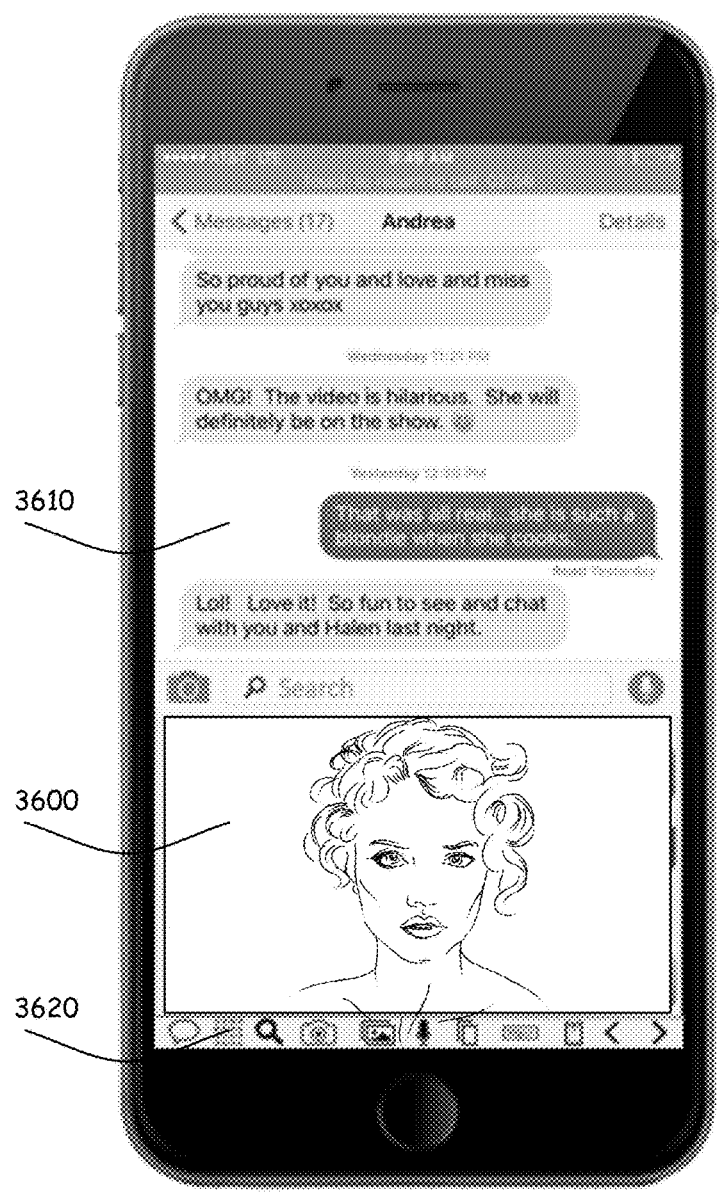
FIG. 36 is a screen shot of a mobile device with the messaging platform that includes the video call feature.

FIG. 36 is a screen shot of a mobile device with the messaging platform that includes the video call feature. In general, this aspect or feature is directed towards enabling a video chat within the messaging application. In the illustrated embodiment, a user can select an icon on the toolbar (not illustrated) to invoke the video chat or to answer a video chat invoked by another user or the currently engaged user in the messaging interface. Once initiated, the messaging interface opens a window, such as window 3600 in which the live video of the video chat can be displayed. The box 3600 can simply be a portal for receiving the streaming video and the streaming audio can be directed to the speaker or headphones. Those skilled in the art will appreciate that a wide variety of techniques can be used to accomplish this feature including iframes, VPN technology, etc. In addition, it should be appreciated the being implemented within the messaging environment, the video calls can be implemented in a device agnostic manner. Thus, the video and audio streaming feed from FACETIME, SKYPE, GOOGLE PLUS, etc. can all be received by the messaging platform and formatted for presentment within the video call window 3600 and the speaker/headphones. When the session is active, the user can engage in the video session using audible voice and/or messaging. All of the features of the messaging platform are still available to the user and as such, the user can send videos, prepaid gift cards, text, etc. all while the video call is live. It should be appreciated that the same box 3600 may also be utilized for other video feeds including YOUTUBE videos, TWITTER feeds, FACEBOOK feeds, etc.

In addition, the user can swap between messaging flows of other users while still maintaining the video call screen 3600 visible to the user even though the user may be messaging with other users not engaged in the video call.

On technique to implement the video chat interface be the use of iframes or a similar technology. An iframe or inline frame can be defined with HTML tag <iframe>. Thus, the messaging environment could be defined using HDML or a similar markup language thus enabling the use of ifr24. The <iframe> tag is not somehow related to <frameset> tag, instead, it can appear anywhere in the document. The <iframe> tag defines a rectangular region within the document or window in which the browser can display a separate document or content source, such as a video stream.

The src attribute is used to specify the URL of the document or content that is to occupy or populate the inline frame.

Example

Following is the example to show how to use the <iframe>:
  <!DOCTYPE html>
  <html>
  <head>
  <title>HTML Iframes</title>
  </head>
  <body><p>Content Goes Here . . . </p>
  <iframe src="/html/menu.htm" width="555" height="200">
  Sorry your browser does not support inline frames.
  </iframe>
  <p>Document content also go here . . . </p>
  </body>
  </html>

Thus similar to using this structure to include a document in a webpage of a browser, the content source can point to a live video feed and display the video stream within the defined box. Other technology solutions may also be employed such a DACAST and USTREAM Another capability of the textOS and messaging platform is that some embodiments can operate independent of what the user on the other end of a messaging session is using. Thus, a user that is running the textOS can communicate in the messaging environment with text and/or the video stream with another user regardless of what that other user is utilizing to communicate. Thus, a user with textOS loaded into their iphone can receive text messages from another user that is utilizing an iphone and the resident messaging application or FACETIME. Similarly, that same user can interface with another user using an ANDROID phone, such as a SAMSUNG phone or a BLACKBERRY or other device, and running another text messaging application such as TEXTNOW, TEXT PLUS, TEXTME, etc. And further, a user can interface with another user that is utilizing the textOS. Further, the user with the textOS can message with multiple simultaneous users varying platforms.

In FIG. 36, the video call window 3600 is shown as being located and docked on the bottom of the screen and the text messaging area 3610 is located above the video call window 3600 and active for receiving and sending text messages as well as accessing the other features of the messaging platform and the tool bar 3620.

Figure 37:
FIG. 37 is a screen shot of a mobile device with the messaging platform that includes the video call feature.

FIG. 37 is a screen shot of a mobile device with the messaging platform that includes the video call feature. In this embodiment the video call box 3600 is located above the trey and takes up more space of the messaging window 3610. However, in both FIG. 36 and FIG. 37, the video call window is persistently on the screen during the video call rather than being hidden, covered up, etc.

Figure 38:
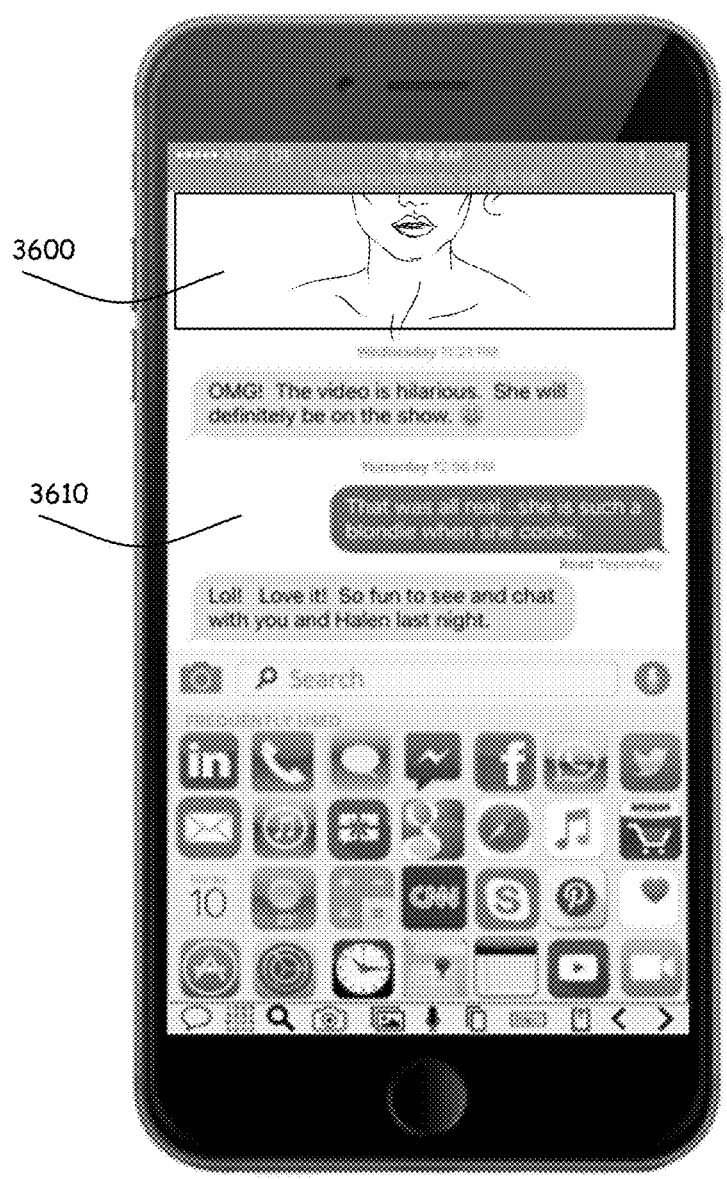
FIG. 38 is a screen shot of a mobile device with the messaging platform that includes the video call feature.

FIG. 38 is a screen shot of a mobile device with the messaging platform that includes the video call feature. In FIG. 8, the video call window 3600 is shown as actually scrolling of the screen as additional text messages are received. Thus, in this embodiment as additional text messages arrive, the video call window is shifted off the screen and the user can either scroll up to see the video, or drag and drop the window or a new window can automatically open. It will be appreciated that various embodiments may include preferences settings to choose between these variations.

Figure 39:
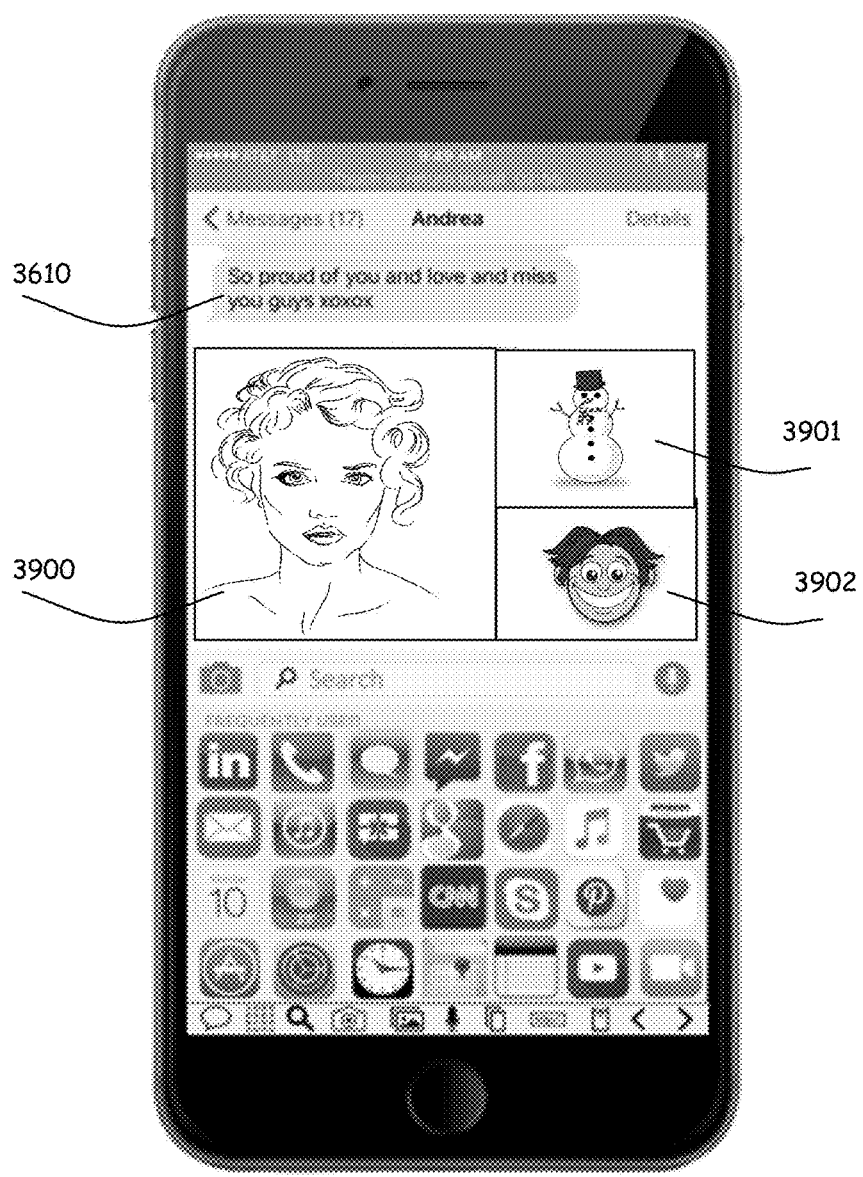
FIG. 39 is a screen shot of a mobile device with messaging platform that depicts multi-party video chats.
Figure 40A:
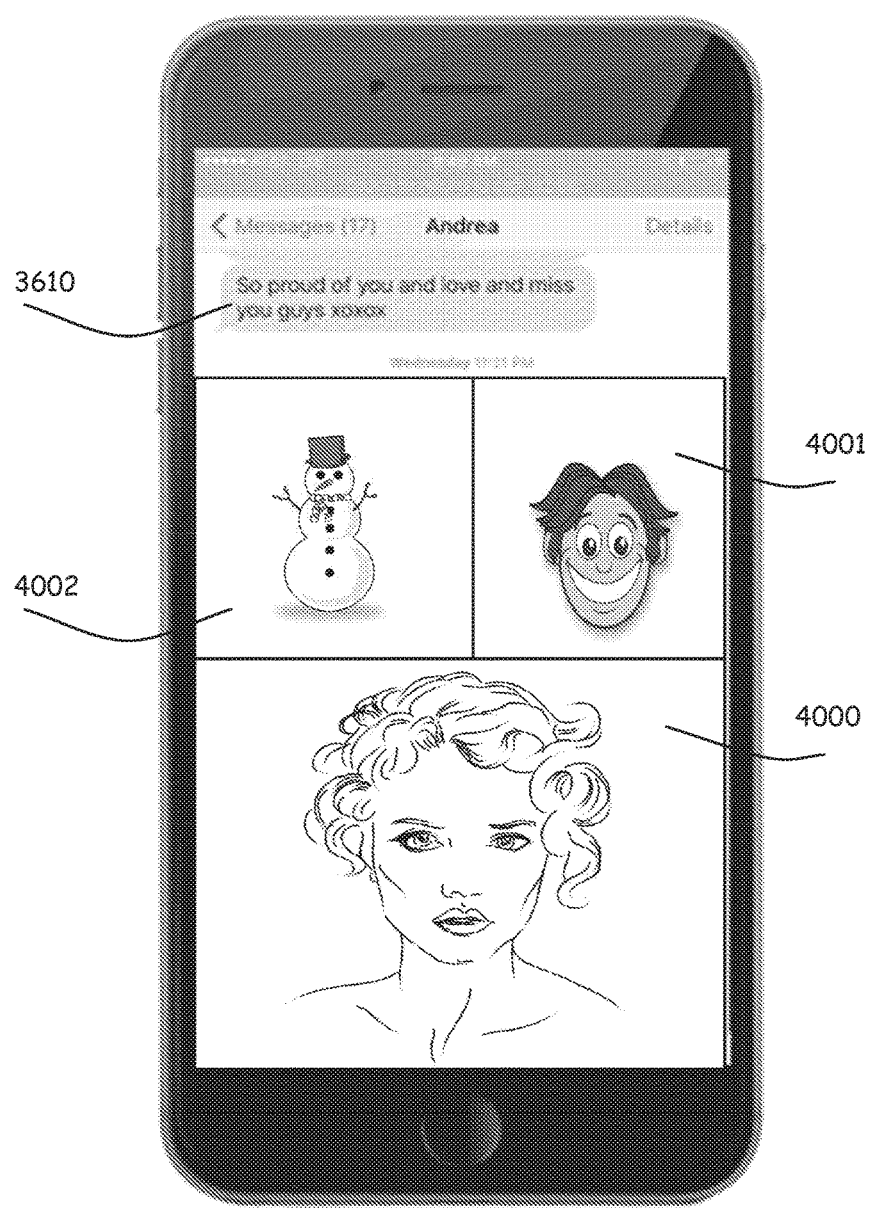
FIG. 40A and FIG. 40B are screen shots of a mobile device with messaging platform that depict multi-party video chats and take up a larger portion of the screen.
Figure 40B:
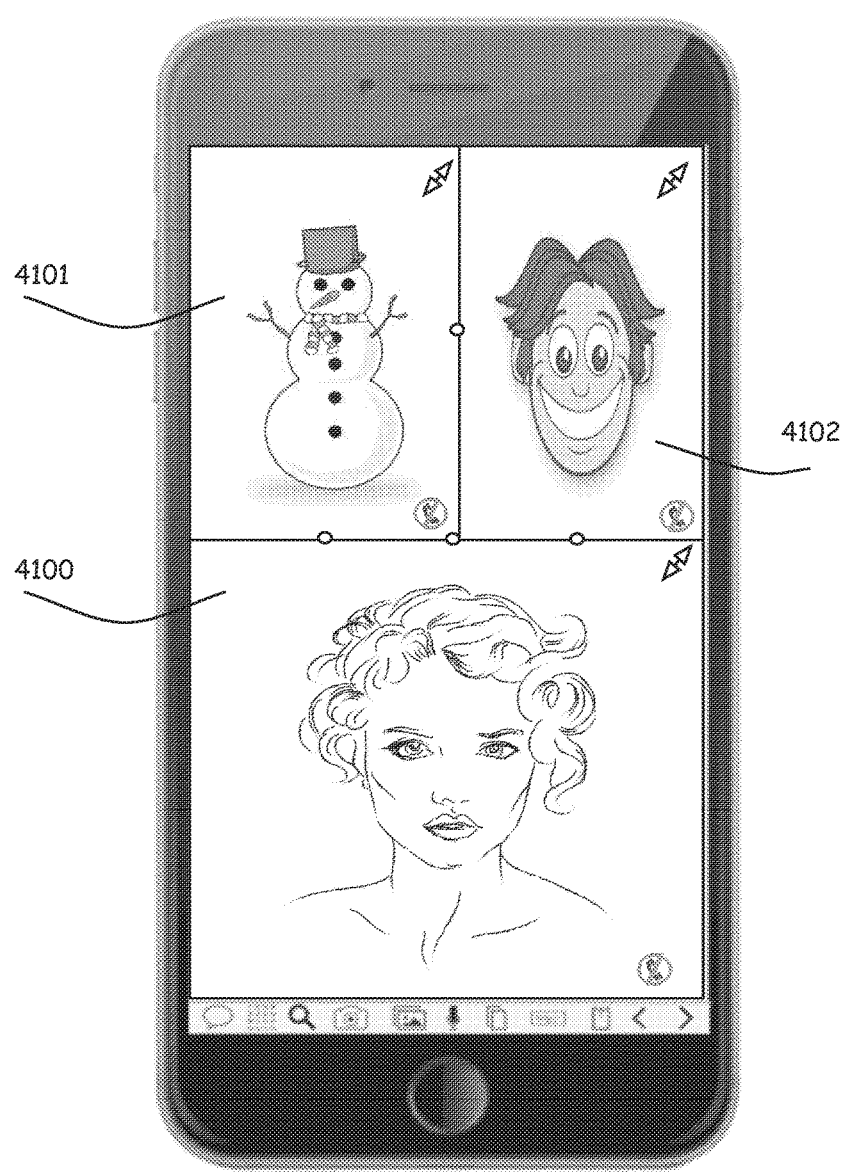

FIG. 39, FIG. 40A, and FIG. 40B illustrate exemplary screen shots for multi-party video conferencing within a texting environment. The placement of the windows for each participant can be automatic or user configurable. For instance, in FIG. 39, the user can tap on one window to make it the dominant window. In other embodiments, a party speaking may take the dominant window. In other embodiments, the user can drag the window around and resize them as desired. FIG. 40B shows full screen expansion of the video chat session. Tapping the display or an icon can cause the screen to revert to a partial mode such as depicted in FIG. 39 and FIG. 40A. The windows may include drag points for adjusting and moving the windows around and may include dedicated hang-up icons to drop certain parties from the video conference, as well as mute buttons, etc.

In addition, the screen may also include a window that the calling party can view themselves and/or another app available through the tool bar. For instance, the user can select apps and then the FACEBOOK app to have his or her FACEBOOK feed displayed to for his or her own viewing as well as sharing with one or more of the other participants. In addition, each of the user screens may also include a small window to display texts that are sent from the respective party or, the texts from a party can scroll over the parties window for viewing. For instance, if the text included a transparency option, the text could be viewed without totally blocking the view of the participants. Thus, a user could pull up a video, such as a movie or a live television feed or other streaming video and have it displayed in one window while the video chat participants are displayed in the other windows, thus creating a video chat session in which the participants can watch the video feed together and observe each other's reactions to the video. Thus, you can actually watch a movie with your friends from around the world.

It should be appreciated that the messaging platform can receive and display, as well as send any type of media, including but not limited to live or pre-recorded audio, video, multimedia, 3-D or Holographic Image content.

It should also be appreciated that the messaging platform allows for the delivery and display of content inside of the text video player environment or the user can tap to launch and play within a standard video player or to queue the content to his standard video player for later playback.

Although the terms text messages and instant messages have been used, the system and method disclosed herein can be used to decode and/or encode and transmit any suitable communication by any suitable means.

Although a particular embodiment of the invention is disclosed, variations thereof may occur to an artisan and the scope of the invention should only be limited by the scope of the appended claims.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A system for chatting within a messaging environment between mobile devices, the system comprising:
    a memory element within a first mobile device configured to maintain the storage of instructions; and
    a processor embedded within the first mobile device and coupled to the memory element, the processor facilitates execution of the instructions to perform operations comprising:
        within a display interface within a messaging application being executed on the first mobile device, presenting a matrix of available apps that can be accessed from the messaging environment;
        receiving a selection of a chatting app;
        presenting a chat window within the messaging environment for conducting a chat, wherein:
            the chatting app is configured to receive electronic message content from a second mobile device and further configured to present the received electronic message content in the chat window,
            the messaging application is configured to present the received electronic message content within the chat window, and
            while the chat is active, the messaging application supporting multiple messaging sessions independent of the chat;
        within the interface within the messaging application being executed on the first mobile device, presenting a gift card screen on a display of the first mobile device, the gift card screen presenting options for the selection of a gift card to be sent within a message to the second mobile device;
        receiving a selection of the gift card, and in response to receiving the selection:
            presenting one or more indicia of merchants to be associated with the gift card;
            presenting a user interface to select a monetary value to be associated with the gift card; and
            receiving a selection of a merchant and a monetary value; and
        embedding a graphical representation of an electronic gift card for the selected merchant at the selected monetary value into the message such that the gift card is received at the second mobile device and directly displayed in a messaging application being executed on the second mobile device such that a machine readable code can be read at a point of sale terminal for utilizing the electronic gift card in a purchase.

2. The system of claim 1, wherein the action of presenting one or more indicia of merchants to be associated with the gift card further comprises presenting the one or more indicia on a screen of the messaging application such that a user can select an indicia to automatically cause the gift card to be associated with a merchant identified in the indicia.

3. The system of claim 1, wherein upon receiving a selection to add a gift card further comprising parsing the content of the message to identify triggers to use as search criteria for presenting indicia for particular gift cards.

4. The system of claim 1, further comprising the action of presenting an interface to enable a user to select an interval for resending of the gift card at the selected interval of time.

5. A computer-implemented method for chatting within a messaging environment between mobile devices, the method comprising:
    presenting, within a display interface within a messaging application being executed on the first mobile device, a matrix of available apps that can be accessed from the messaging environment;
    receiving a selection of a chatting app;
    presenting a chat window within the messaging environment for conducting a chat, wherein:
        the chatting app is configured to receive electronic message content from a second mobile device and further configured to present the received electronic message content in the chat window,
        the messaging application is configured to present the received electronic message content within the chat window, and
        while the chat is active, the messaging application supporting multiple messaging sessions independent of the chat;
    presenting, within the interface within the messaging application being executed on the first mobile device, a gift card screen on a display of the first mobile device, the gift card screen presenting options for the selection of a gift card to be sent within a message to the second mobile device;

receiving a selection of the gift card, and in response to receiving the selection:
presenting one or more indicia of merchants to be associated with the gift card;
presenting a user interface to select a monetary value to be associated with the gift card; and
receiving a selection of a merchant and a monetary value; and
embedding a graphical representation of an electronic gift card for the selected merchant at the selected monetary value into the message such that the gift card is received at the second mobile device and directly displayed in a messaging application being executed on the second mobile device such that a machine readable code can be read at a point of sale terminal for utilizing the electronic gift card in a purchase.

6. The computer-implemented method of claim 5, wherein the action of presenting one or more indicia of merchants to be associated with the gift card further comprises presenting the one or more indicia on a screen of the messaging application such that a user can select an indicia to automatically cause the gift card to be associated with a merchant identified in the indicia.

7. The computer-implemented method of claim 5, wherein upon receiving a selection to add a gift card further comprising parsing the content of the message to identify triggers to use as search criteria for presenting indicia for particular gift cards.

8. The computer-implemented method of claim 5, further comprising the action of presenting an interface to enable a user to select an interval for resending of the gift card at the selected interval of time.

9. A non-transitory computer-readable storage medium storing computer executable instructions that, when executed by one or more computing devices, configure the one or more computing devices to perform operations comprising:
presenting, within a display interface within a messaging application being executed on the first mobile device, a matrix of available apps that can be accessed from the messaging environment;
receiving a selection of a chatting app;
presenting a chat window within the messaging environment for conducting a chat, wherein:
the chatting app is configured to receive electronic message content from a second mobile device and further configured to present the received electronic message content in the chat window,
the messaging application is configured to present the received electronic message content within the chat window, and
while the chat is active, the messaging application supporting multiple messaging sessions independent of the chat;
presenting, within the interface within the messaging application being executed on the first mobile device, a gift card screen on a display of the first mobile device, the gift card screen presenting options for the selection of a gift card to be sent within a message to the second mobile device;
receiving a selection of the gift card, and in response to receiving the selection:
presenting one or more indicia of merchants to be associated with the gift card;
presenting a user interface to select a monetary value to be associated with the gift card; and
receiving a selection of a merchant and a monetary value; and
embedding a graphical representation of an electronic gift card for the selected merchant at the selected monetary value into the message such that the gift card is received at the second mobile device and directly displayed in a messaging application being executed on the second mobile device such that a machine readable code can be read at a point of sale terminal for utilizing the electronic gift card in a purchase.

10. The non-transitory computer-readable storage medium of claim 9, wherein the action of presenting one or more indicia of merchants to be associated with the gift card further comprises presenting the one or more indicia on a screen of the messaging application such that a user can select an indicia to automatically cause the gift card to be associated with a merchant identified in the indicia.

11. The non-transitory computer-readable storage medium of claim 9, wherein upon receiving a selection to add a gift card further comprising parsing the content of the message to identify triggers to use as search criteria for presenting indicia for particular gift cards.

12. The non-transitory computer-readable storage medium of claim 9, further comprising the action of presenting an interface to enable a user to select an interval for resending of the gift card at the selected interval of time.

* * * * *